United States Patent
Nagahara et al.

(10) Patent No.: US 7,061,163 B2
(45) Date of Patent: Jun. 13, 2006

(54) ULTRASONIC TRANSDUCER AND ULTRASONIC FLOWMETER

(75) Inventors: Hidetomo Nagahara, Kyoto (JP); Masahiko Hashimoto, Shijonawate (JP); Masaaki Suzuki, Osaka (JP); Kazuhiko Hashimoto, Moriguchi (JP); Takashi Hashida, Osaka (JP); Seigo Shiraishi, Neyagawa (JP); Norihisa Takahara, Ibaraki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/473,752

(22) PCT Filed: Jan. 27, 2003

(86) PCT No.: PCT/JP03/00742

§ 371 (c)(1),
(2), (4) Date: Oct. 1, 2003

(87) PCT Pub. No.: WO03/064979

PCT Pub. Date: Aug. 7, 2003

(65) Prior Publication Data

US 2004/0113522 A1 Jun. 17, 2004

(30) Foreign Application Priority Data

| Jan. 28, 2002 | (JP) | ............................. 2002-018047 |
| Feb. 5, 2002 | (JP) | ............................. 2002-027834 |
| Jul. 3, 2002 | (JP) | ............................. 2002-194203 |

(51) Int. Cl.
*H01L 41/08* (2006.01)

(52) U.S. Cl. ...................................... 310/334; 310/327
(58) Field of Classification Search ................ 310/325, 310/326, 334–336; 73/644, 642
See application file for complete search history.

(56) References Cited

U.S. PATENT DOCUMENTS

| 3,891,869 A * | 6/1975 | Scarpa ........................ 310/325 |
| 4,130,018 A * | 12/1978 | Adams et al. ............. 73/290 V |
| 4,523,122 A * | 6/1985 | Tone et al. .................. 310/334 |

(Continued)

FOREIGN PATENT DOCUMENTS

JP          10-281831       * 10/1988

*Primary Examiner*—Mark Budd
(74) *Attorney, Agent, or Firm*—Akin Gump Strauss Hauer & Feld, LLP

(57) ABSTRACT

An ultrasonic transducer according to the present invention includes: a piezoelectric body 4 to set up ultrasonic vibrations; an acoustic matching layer 3 made of a material with a density of 50 kg/m³ to 1,000 kg/m³ and an acoustic impedance of $2.5 \times 10^3$ kg/m²/s to $1.0 \times 10^6$ kg/m²/s; a lower acoustic matching layer 9 provided between the piezoelectric body 4 and the acoustic matching layer 3; and a structure supporting member 6 that supports the lower acoustic matching layer 9 and the piezoelectric body 4 thereon and shields the piezoelectric body 4 from a fluid that propagates the ultrasonic vibrations. The ultrasonic transducer includes a protective portion, which contacts with at least a portion of a side surface of the acoustic matching layer 4. This protective portion is defined by a portion of the lower acoustic matching layer 9 and forms an integral part of the lower acoustic matching layer 9.

12 Claims, 27 Drawing Sheets

U.S. PATENT DOCUMENTS

| | | | |
|---|---|---|---|
| 4,556,814 A | * 12/1985 | Ito et al. | 310/334 |
| 4,651,568 A | * 3/1987 | Reich et al. | 73/612 |
| 4,698,541 A | * 10/1987 | Bar-Cohen | 310/326 |
| 4,976,150 A | * 12/1990 | Deka | 73/644 |
| 5,093,810 A | 3/1992 | Gill | |
| 6,243,178 B1 | 6/2001 | Suemura et al. | |
| 6,788,620 B1 | * 9/2004 | Shiraishi et al. | 367/152 |
| 2002/0124662 A1 | 9/2002 | Suzuki et al. | |

* cited by examiner

9

9

Z1、Z3 < Z2

*FIG.18(a)*
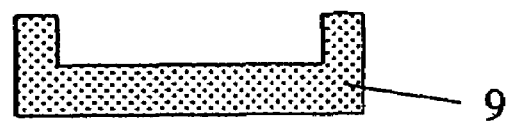
*FIG.18(b)*
*FIG.18(c)*
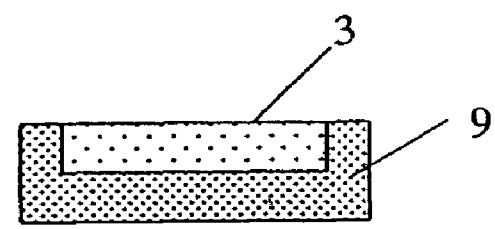
*FIG.18(d)*
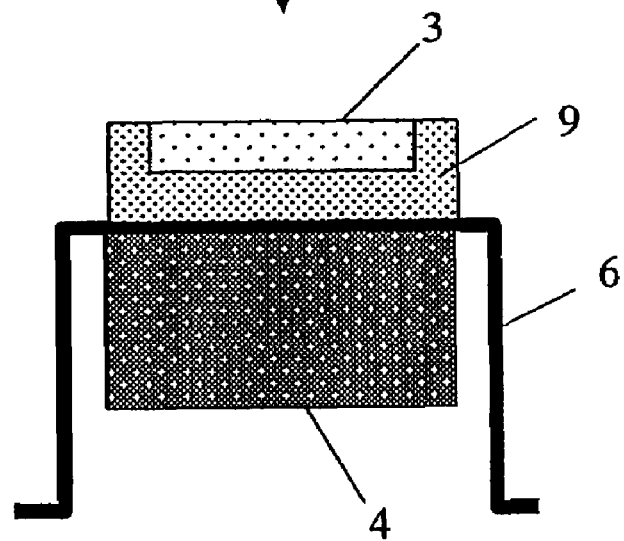

ULTRASONIC TRANSDUCER AND ULTRASONIC FLOWMETER

CROSS-REFERENCE TO RELATED APPLICATION

This application is a Section 371 of International Application No. PCT/JP03/00742, filed Jan. 27, 2003, the disclosure of which is incorporated herein by reference.

TECHNICAL FIELD

The present invention relates to an ultrasonic transducer having an acoustic matching layer and a method for fabricating such a transducer, and also relates to an ultrasonic flowmeter including such an ultrasonic transducer.

BACKGROUND ART

In recent years, an ultrasonic flowmeter has been used as a gas meter, for example. The ultrasonic flowmeter measures the time that it takes for an ultrasonic wave to go a predetermined distance within a tube in which a fluid is flowing, and calculates the flow velocity of the fluid, thereby obtaining its flow rate based on the flow velocity.

FIG. 35 illustrates a cross-sectional structure for a main portion of an ultrasonic flowmeter of that type. The ultrasonic flowmeter is arranged such that a fluid under measurement, of which the flow rate needs to be measured, can flow through a tube. A pair of ultrasonic transducers 101a and 101b is provided on the tube wall 102 so as to face each other. Each of the ultrasonic transducers 101a and 101b includes a piezoelectric vibrator, made of a piezoceramic, for example, as an electromechanical energy converter, and exhibits a resonance characteristic just like a piezoelectric buzzer or a piezoelectric oscillator.

In the state illustrated in FIG. 35, the ultrasonic transducer 101a is used as an ultrasonic transmitter and the ultrasonic transducer 101b is used as an ultrasonic receiver.

If an alternating current voltage, having a frequency in the vicinity of the resonant frequency of the ultrasonic transducer 101a, is applied to the piezoelectric body (i.e., piezoelectric vibrator) in the ultrasonic transducer 101a, then the ultrasonic transducer 101a functions as an ultrasonic transmitter to radiate an ultrasonic wave into the fluid. The ultrasonic wave radiated is propagated along a path L1 and reaches the ultrasonic transducer 101b. In this case, the ultrasonic transducer 101b functions as a receiver, which receives the ultrasonic wave and transforms it into a voltage.

Then, the ultrasonic transducer 101b functions as an ultrasonic transmitter and the ultrasonic transducer 101a functions as an ultrasonic receiver in turn. Specifically, when an alternating current voltage, having a frequency in the vicinity of the resonant frequency of the ultrasonic transducer 101b, is applied to the piezoelectric body in the ultrasonic transducer 101b, the ultrasonic transducer 101b radiates an ultrasonic wave into the fluid. The ultrasonic wave radiated is propagated along a path L2 and reaches the ultrasonic transducer 101a. The ultrasonic transducer 101a receives the ultrasonic wave propagated, and transforms it into a voltage.

In this manner, each of the ultrasonic transducers 101a and 101b alternately functions as a transmitter and as a receiver. Thus, these transducers 101a and 101b are normally called "ultrasonic transducers" or "ultrasonic transmitters-receivers" collectively.

In the ultrasonic flowmeter shown in FIG. 35, if the alternating current voltage is applied to one of the ultrasonic transducers continuously, then the ultrasonic transducer radiates an ultrasonic wave continuously, thereby making it difficult to measure the propagation time. For that reason, a burst voltage signal, which uses a pulse signal as a carrier, is normally used as a drive voltage.

Hereinafter, the measuring principle of this ultrasonic flowmeter will be described in further detail.

If an ultrasonic burst signal is radiated from the ultrasonic transducer 101a by applying the burst voltage signal to the ultrasonic transducer 101a for driving purposes, then the ultrasonic burst signal will be propagated along the path L1 and reach the ultrasonic transducer 101b in a time t. The distance of the path L1, as well as the path L2, is supposed to be L.

The ultrasonic transducer 101b can transform only the ultrasonic burst signal propagated into an electric burst signal at a high SNR. This electric burst signal is amplified electrically and then applied to the ultrasonic transducer 101a again, thereby making the ultrasonic transducer 101a radiate another ultrasonic burst signal. An apparatus performing such an operation is called a "sing-around type apparatus". Also, a period of time it takes for an ultrasonic pulse, radiated from the ultrasonic transducer 101a, to reach the ultrasonic transducer 102b is called a "sing-around period". The inverse number of the "sing-around period" is called a "sing-around frequency".

In FIG. 35, the flow velocity of the fluid flowing through the tube is supposed to be V, the velocity of the ultrasonic wave in the fluid is supposed to be C, and the angle defined between the direction in which the fluid is flowing and the direction in which the ultrasonic pulse is propagated is supposed to be θ. If the ultrasonic transducers 101a and 101b are used as an ultrasonic transmitter and an ultrasonic receiver, respectively, then the following Equation (1) is satisfied:

$$f1 = 1/t1 = (C + V\cos\theta)/L \quad (1)$$

where t1 is the sing-around period (i.e., the time it takes for the ultrasonic pulse, radiated from the ultrasonic transducer 101a, to reach the ultrasonic transducer 101b) and f1 is the sing-around frequency.

Conversely, if the ultrasonic transducers 101b and 101 are used as an ultrasonic transmitter and an ultrasonic receiver, respectively, then the following Equation (2) is satisfied:

$$f2 = 1/t2 = (C - V\cos\theta)/L \quad (2)$$

where t2 is the sing-around period and f2 is the sing-around frequency in that situation.

The difference Δf between these two sing-around frequencies is given by:

$$\Delta f = f1 - f2 = 2V\cos\theta/L \quad (3)$$

According to Equation (3), the flow velocity V of the fluid can be obtained from the distance L of the ultrasonic wave propagation path and the frequency difference Δf. And the flow rate can be determined by the flow velocity V.

Such an ultrasonic flowmeter is required to exhibit high precision. To increase the precision, it is important to appropriately adjust the acoustic impedance of the acoustic matching layer that is provided on the ultrasonic wave transmitting/receiving surface of the piezoelectric body in the ultrasonic transducer. Particularly when the ultrasonic transducer radiates (i.e., transmits) an ultrasonic wave into a gas or receives an ultrasonic wave that has been propagated through a gas, the acoustic matching layer plays an important role.

Hereinafter, the role of the acoustic matching layer will be described with reference to FIG. 36. FIG. 36 shows a cross-sectional structure of a conventional ultrasonic transducer 103.

The ultrasonic transducer 103 shown in FIG. 36 includes a piezoelectric body 106, which is secured to an inside surface of a sensor case 105, and an acoustic matching layer 104, which is secured to an outside surface of the sensor case 105. Specifically, the acoustic matching layer 104 is bonded to the sensor case 105 with an adhesive such as an epoxy resin, and the piezoelectric body 106 is also bonded to the sensor case 105 by the same technique.

The ultrasonic vibrations of the piezoelectric body 106 are transmitted to the sensor case 106 by way of the adhesive layer and then to the acoustic matching layer 104 by way of the second adhesive layer. After that, the ultrasonic vibrations are radiated as acoustic waves into a gas that contacts with the acoustic matching layer 104 (which will be referred to herein as an "ultrasonic wave propagating medium").

It is the role of the acoustic matching layer 104 to propagate the vibrations of the piezoelectric body to the gas efficiently. This point will be described in further detail below.

The acoustic impedance Z of a substance is defined by the following Equation (4):

$$Z = \rho \times C \quad (4)$$

where C is the sonic velocity in the substance and σ is the density of the substance.

The acoustic impedance of a gas into which the ultrasonic wave is radiated is greatly different from that of the piezoelectric body. A piezoceramic such as lead zirconate titanate (PZT), which is a normal material for a piezoelectric body, has an acoustic impedance Z1 of about $30 \times 10^6$ kg/m²/s. On the other hand, the air has an acoustic impedance Z3 of about 400 kg/m²/s.

An acoustic wave is easily reflected from the boundary surface between two substances with mutually different acoustic impedances. Also, after having been transmitted through the boundary surface, the acoustic wave will have a decreased intensity. For that reason, a substance, of which the acoustic impedance Z2 is given by the following Equation (5), is inserted between the piezoelectric body and the gas:

$$Z2 = (Z1 \times Z3)^{1/2} \quad (5)$$

If a substance having such an acoustic impedance Z2 is inserted, then the reflection from the boundary surface is decreased significantly and the transmittance of the acoustic wave increases.

If the acoustic impedance Z1 is $30 \times 10^6$ kg/m²/s and the acoustic impedance Z3 is 400 kg/m²/s, then the acoustic impedance Z2 that satisfies Equation (5) is about $11 \times 10^4$ kg/m²/s. The substance having the impedance of $11 \times 10^4$ kg/m²/s must satisfy Equation (4) (i.e., $Z2 = \rho \times C$). However, it is very difficult to find such a substance in solid materials. This is because such a substance is a solid but must have a sufficiently low density ρ and a low sonic velocity C.

A material obtained by solidifying a glass balloon or a plastic balloon with a resin material is currently used extensively as a material for the acoustic matching layer. Also, a technique of thermally compressing a hollow glass sphere and a technique of foaming a molten material are disclosed as exemplary methods for preparing such a material preferred for the acoustic matching layer in Japanese Patent No. 2559144, for example.

However, the acoustic impedance of each of these materials is greater than $50 \times 10^4$ kg/m²/s and cannot be regarded as satisfying Equation (5). To obtain a high-sensitivity ultrasonic transducer, the acoustic matching layer thereof needs to be made of a material with even smaller acoustic impedance.

To meet such a demand, the applicant of the present application invented an acoustic matching material satisfying Equation (5) fully and disclosed it in Japanese Patent Application No. 2001-056051. That material is made of a dry gel with durability and has a low density ρ and a low sonic velocity C.

An ultrasonic transducer, including an acoustic matching layer made of such a material with very low acoustic impedance (such as a dry gel), can transmit or receive an ultrasonic wave into/through a gas with high efficiency and sensitivity. As a result, an apparatus that can measure the flow rate of the gas with high precision is realized.

However, a material such as a dry gel with very low acoustic impedance normally has a low mechanical strength. In particularly, the dry gel is relatively strong with respect to a stress applied in the compressing direction but is extremely weak to a stress applied in the pulling or bending direction and is easily broken even under a weak impact.

Also, such a material has a very low sonic velocity. Accordingly, a preferred thickness of the acoustic matching layer (i.e., about a quarter of the transmission or reception wavelength) to achieve the maximum transmission or reception sensitivity becomes very small. For example, if an ultrasonic wave with a frequency of about 500 kHz is transmitted or received through a material with a sonic velocity of 60 m/s to 400 m/s, then the preferred thickness of the acoustic matching layer will be about 30 μm to about 200 μm. If the acoustic matching layer is so thin, it is extremely difficult to handle the acoustic matching layer as one member. In that case, it may be almost impossible to make an ultrasonic transducer by bonding such an acoustic matching layer to a sensor case or a piezoelectric body. Or even if it happened to be possible, it should be hard to use such an ultrasonic transducer actually in view of its production yield and cost.

Furthermore, since the acoustic matching layer has a low mechanical strength, the ultrasonic vibrations of the ultrasonic transducer in operation might cause peeling of the acoustic matching layer, thus possibly resulting in decreased reliability.

In order to overcome the problems described above, an object of the present invention is to provide an ultrasonic transducer, which includes an acoustic matching layer made of a material with a low mechanical strength and a low sonic velocity such as a dry gel but which can still be produced at a good yield and ensures high reliability, and also provide a method for fabricating such an ultrasonic transducer.

Another object of the present invention is to provide an ultrasonic flowmeter including such an ultrasonic transducer.

DISCLOSURE OF INVENTION

An ultrasonic transducer according to the present invention includes: a piezoelectric body; an acoustic matching layer, which is provided on the piezoelectric body; and a protective portion, which contacts with at least a portion of a side surface of the acoustic matching layer and which is provided at a fixed position with respect to the piezoelectric body.

In a preferred embodiment, the protective portion is raised from a plane, which is defined at the same level as the principal surface of the piezoelectric body, toward a direction in which an ultrasonic wave is radiated, and the height of the protective portion as measured from the principal surface of the piezoelectric body defines the thickness of the acoustic matching layer.

In another preferred embodiment, the height of the protective portion is 5 μm to 2,500 μm.

In another preferred embodiment, the thickness of the acoustic matching layer is approximately equal to the height of the protective portion.

In another preferred embodiment, the thickness of the acoustic matching layer is about a quarter of the wavelength of an ultrasonic wave to be transmitted from, and/or received at, the piezoelectric body.

In another preferred embodiment, the acoustic matching layer is made of a material with a density of 50 kg/m$^3$ to 1,000 kg/m$^3$.

In another preferred embodiment, the acoustic matching layer is made of a material with an acoustic impedance of $2.5 \times 10^3$ kg/m$^2$/s to $1.0 \times 10^6$ kg/m$^2$/s.

In another preferred embodiment, the acoustic matching layer is made of an inorganic material.

In another preferred embodiment, the inorganic material is a dry gel of an inorganic oxide.

In another preferred embodiment, the inorganic oxide has a hydrophobized skeleton.

In another preferred embodiment, the acoustic matching layer has been solidified from a fluid state on the piezoelectric body that has already been provided with the protective portion.

In another preferred embodiment, the ultrasonic transducer further includes a lower acoustic matching layer between the principal surface of the piezoelectric body and the acoustic matching layer. The protective portion is raised from the principal surface of the second acoustic matching layer, and the height of the protective portion as measured from the principal surface of the acoustic matching layer defines the thickness of the uppermost acoustic matching layer.

In another preferred embodiment, the protective portion is defined by a portion of the lower acoustic matching layer and forms an integral part of the lower acoustic matching layer.

In another preferred embodiment, the height of the protective portion is 5 μm to 2,500 μm.

In another preferred embodiment, the height of the protective portion is approximately equal to the thickness of the uppermost acoustic matching layer.

In another preferred embodiment, the first acoustic matching layer and the lower acoustic matching layer have a thickness that is about a quarter of the wavelength of an ultrasonic wave to be transmitted from, or received at, the piezoelectric body.

In another preferred embodiment, the first acoustic matching layer has a density of 50 kg/m$^3$ to 1,000 kg/m$^3$.

In another preferred embodiment, the acoustic impedance of the lower acoustic matching layer is greater than that of the first acoustic matching layer and is $2.5 \times 10^3$ kg/m$^2$/s to $3.0 \times 10^7$ kg/m$^2$/s.

In another preferred embodiment, the protective portion is provided around the outer periphery of the uppermost acoustic matching layer.

In another preferred embodiment, the protective portion covers the entire outer peripheral side surface of the uppermost acoustic matching layer.

In another preferred embodiment, the protective portion is located outside of the principal surface of the piezoelectric body.

In another preferred embodiment, the protective portion is provided on the principal surface of the piezoelectric body.

In another preferred embodiment, the protective portion is provided on the lower acoustic matching layer.

In another preferred embodiment, the protective portion is defined by a portion of the lower acoustic matching layer and forms an integral part of the lower acoustic matching layer.

In another preferred embodiment, the ultrasonic transducer further includes a structure supporting member that supports the piezoelectric body thereon.

In another preferred embodiment, the ultrasonic transducer further includes a structure supporting member that supports the piezoelectric body thereon, and the protective portion is provided on the structure supporting member.

In another preferred embodiment, the structure supporting member is formed by pressing and compacting a metal, and the protective portion is defined by a pressed, compacted and folded portion of the structure supporting member.

In another preferred embodiment, the height of the protective portion is 5 μm to 2,500 μm.

In another preferred embodiment, the thickness of the acoustic matching layer is approximately equal to the height of the protective portion.

In another preferred embodiment, the thickness of the acoustic matching layer is about a quarter of the wavelength of an ultrasonic wave to be transmitted from, or received at, the piezoelectric body.

In another preferred embodiment, the acoustic matching layer has a density of 50 kg/m$^3$ to 1,000 kg/m$^3$.

In another preferred embodiment, the acoustic matching layer has an acoustic impedance of $2.5 \times 10^3$ kg/m$^2$/s to $1.0 \times 10^6$ kg/m$^2$/s.

In another preferred embodiment, the ultrasonic transducer further includes a rear loading member, which is provided in the rear of the piezoelectric body, and the protective portion is provided on the rear loading member.

In another preferred embodiment, the protective portion is defined by a portion of the rear loading member and forms an integral part of the rear loading member.

In another preferred embodiment, at least a portion of a surface of the acoustic matching layer, which contacts with the protective portion, has been subjected to a surface treatment that adds a hydroxide group thereto.

In another preferred embodiment, at least a portion of a surface of the acoustic matching layer, which contacts with the protective portion, has been subjected to a roughening treatment.

In another preferred embodiment, at least a portion of a surface of the acoustic matching layer, which contacts with the protective portion, is porous.

In another preferred embodiment, a portion of the ultrasonic transducer, with which the acoustic matching layer contacts, has been permeated by, and combined with, a portion of the acoustic matching layer.

Another ultrasonic transducer according to the present invention includes: a piezoelectric body, which sets up ultrasonic vibrations; an upper acoustic matching layer, which is made of a material with a density of 50 kg/m$^3$ to 1,000 kg/m$^3$ and with an acoustic impedance of $2.5 \times 10^3$ kg/m$^2$/s to $1.0 \times 10^6$ kg/m$^2$/s;

a lower acoustic matching layer, which is provided between the piezoelectric body and the upper acoustic matching layer; and a structure supporting member, which supports the lower acoustic matching layer and the piezoelectric body thereon and which shields the piezoelectric body from a fluid that propagates the ultrasonic vibrations. The ultrasonic transducer includes a protective portion, which contacts with at least a portion of a side surface of the upper acoustic matching layer.

The protective portion is defined by a portion of the lower acoustic matching layer and forms an integral part of the lower acoustic matching layer.

In a preferred embodiment, the elastic modulus of the protective portion is approximately equal to that of the acoustic matching layer.

An ultrasonic flowmeter according to the present invention includes: a flow rate measuring portion, through which a fluid under measurement flows; a pair of ultrasonic transducers, which is provided for the flow rate measuring portion and which transmits and receives an ultrasonic signal; a time-measurement portion for measuring time that it takes to propagate an ultrasonic wave between the pair of ultrasonic transducers; and a flow rate calculating portion for calculating the flow rate of the fluid based on a signal supplied from the time-measurement portion. Each of the ultrasonic transducers is the ultrasonic transducer according to any of the preferred embodiments of the present invention described above.

In a preferred embodiment, the piezoelectric bodies of the ultrasonic transducers are shielded from the fluid under measurement.

In another preferred embodiment, the fluid under measurement is a gas.

An apparatus according to the present invention is characterized by including the ultrasonic transducer according to any of the preferred embodiments of the present invention described above.

An inventive method for fabricating an ultrasonic transducer includes the steps of: (a) providing a piezoelectric body with a first surface and a second surface, which is opposed to the first surface, and with electrodes provided on the first and second surfaces; (b) forming a second acoustic matching portion on at least one of the first and second surfaces of the piezoelectric body; (c) supplying a gel material into a space that is defined by the piezoelectric body and the second acoustic matching portion; (d) gelling the gel material solution to obtain a wet gel; and (e) drying the wet gel.

In a preferred embodiment, the step (c) includes the steps of: (c1) supplying a first gel material into the space; (c2) gelling the first gel material solution to define a first wet gel layer; (c3) supplying a second gel material onto the first wet gel layer; and (c4) gelling the second gel material solution to define a second wet gel layer. The step (e) includes the step of drying the first and second wet gel layers, thereby defining a first acoustic matching layer and a second acoustic matching layer out of the first and second wet gel layers, respectively.

In another preferred embodiment, the step (c4) includes the step of modifying the first wet gel layer so as to change the acoustic impedance of the first acoustic matching layer.

Another ultrasonic transducer according to the present invention includes a piezoelectric body having a principal surface that transmits and/or receives an ultrasonic wave and an acoustic matching member provided on the principal surface of the piezoelectric body. The acoustic matching member includes a first acoustic matching portion and a second acoustic matching portion having a lower mechanical strength than the first acoustic matching portion. The first acoustic matching portion contacts with a side surface of the second acoustic matching portion.

BRIEF DESCRIPTION OF DRAWINGS

FIGS. 18(*a*) through 18(*d*) are cross-sectional views showing another set of process steps for fabricating the ultrasonic transducer shown in FIG. 12.

BEST MODE FOR CARRYING OUT THE INVENTION

Hereinafter, embodiments of the present invention will be described with reference to the accompanying drawings.

EMBODIMENT 1

Figure 1:
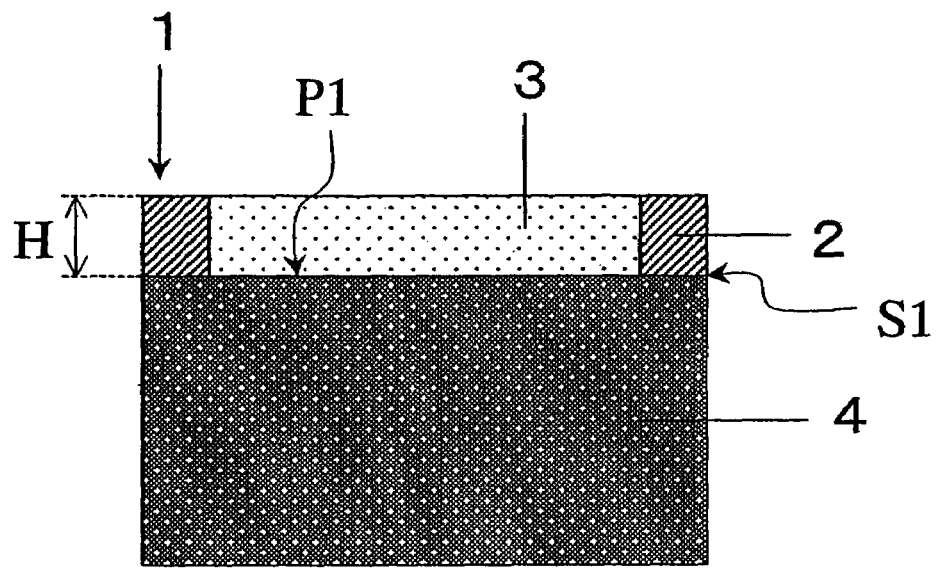
FIG. 1 is a cross-sectional view illustrating an ultrasonic transducer according to a first embodiment of the present invention.

FIG. 1 shows a cross section of an ultrasonic transducer (or ultrasonic oscillator) according to a first embodiment of the present invention. The ultrasonic transducer 1 shown in FIG. 1 includes a piezoelectric body 4, an acoustic matching layer 3 provided on the piezoelectric body 4, and a protective portion 2 secured to the piezoelectric body 4.

The piezoelectric body 4 is made of a material with piezoelectricity, and is polarized in the thickness direction thereof. The upper and lower surfaces of the piezoelectric body 4 are provided with electrodes (not shown), and the piezoelectric body 4 radiates an ultrasonic wave in response to signals applied to those electrodes. On receiving an ultrasonic wave on the other hand, the piezoelectric body 4 generates a voltage signal between the electrodes. According to the present invention, the piezoelectric body 4 may be made of any known material.

The height H of the protective portion 2 as measured from the principal surface (i.e., ultrasonic wave transmitting/receiving surface) S1 of the piezoelectric body 4 defines the thickness of the acoustic matching layer 3. In a preferred embodiment, the height of the protective portion 2 is approximately equal to the thickness of the acoustic matching layer 3.

Figure 2:
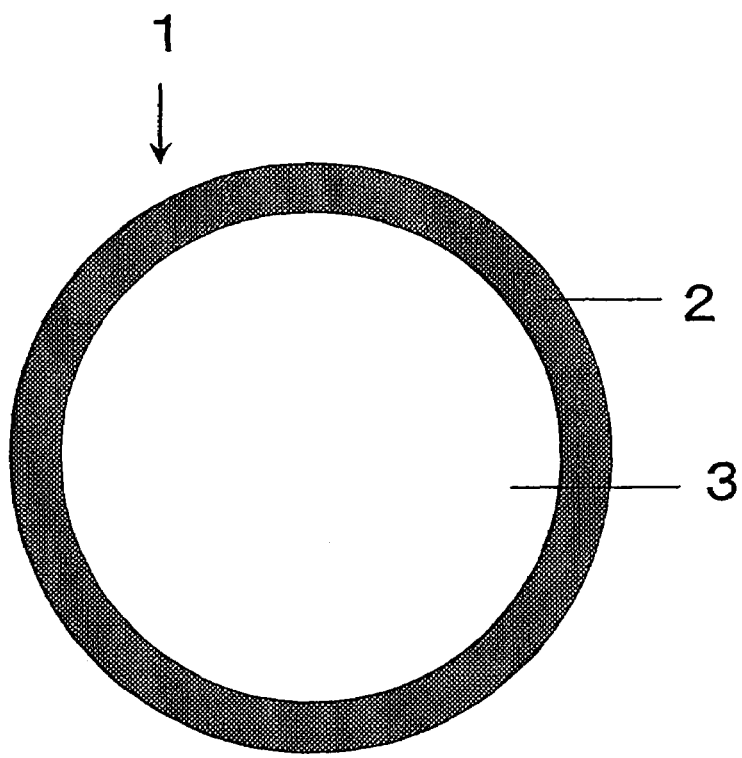
FIG. 2 is a top view of the ultrasonic transducer of the first embodiment of the present invention.

FIG. 2 illustrates the top of the ultrasonic transducer 1 shown in FIG. 1. As can be seen from FIG. 2, in the ultrasonic transducer 1 of this embodiment, a ringlike protective portion 2 surrounds the acoustic matching layer 3 and the entire outer peripheral surface (or side surface) of the acoustic matching layer 3 contacts with the inner peripheral surface of the protective portion 2. If such a protective portion 2 is provided on the upper surface of the piezoelectric body 4, then the acoustic matching layer 3 will not peel off the piezoelectric body 4 easily or damaged. As a result, the reliability of the ultrasonic transducer 1 significantly increases both during the manufacturing process and actual use thereof.

According to the manufacturing method to be described later, the thickness of the acoustic matching layer 3 can be controlled highly precisely by adjusting the height H of the protective portion 2. Thus, the acoustic matching layer 3 can be formed with high precision and stability, and therefore, quality ultrasonic transducers can be produced at a good yield. It is important to deposit the acoustic matching layers 3 to a predetermined thickness with good reproducibility. This is because if the thickness of the acoustic matching layer 3 changes from one ultrasonic transducer to another, then the characteristic (e.g., sensitivity) of the ultrasonic transducers will be inconsistent. As described above, to achieve the highest transmission or reception sensitivity, the thickness of the acoustic matching layer is preferably about a quarter of the wavelength of the ultrasonic wave to be transmitted or received. Accordingly, when an ultrasonic wave with a frequency of about 500 kHz is transmitted or received by using a dry gel, which propagates sound at a velocity of about 280 m/s, as a material for the acoustic matching layer, the acoustic matching layer made of the dry gel preferably has a thickness of about 140 μm. If this thickness varies by about 10%, then the transmission or reception sensitivity may change by about 20%. In this manner, the transmission or reception sensitivity is variable significantly even if the thickness of the acoustic matching layer 3 has changed just slightly. According to this preferred embodiment, however, the acoustic matching layers 3 can be deposited to the desired thickness with good reproducibility.

The ultrasonic transducer 1 of this embodiment may be fabricated in the following manner, for example.

First, an appropriate piezoelectric body 4 is prepared according to the wavelength of an ultrasonic wave to be transmitted or received. The piezoelectric body 4 is preferably made of a material with high piezoelectricity such as a piezoceramic or a piezoelectric single crystal material. Examples of preferred piezoceramics include lead zirconate titanate, barium titanate, lead titanate and lead niobate. Examples of preferred piezoelectric single crystal materials include single crystalline lead zirconate titanate, lithium niobate and quartz.

In this embodiment, the piezoelectric body 4 is made of lead zirconate titanate as a piezoceramic and the frequency of the ultrasonic wave to be transmitted or received is defined at 500 kHz. The ultrasonic transducer is designed to have a resonant frequency of 500 kHz such that the piezoelectric body 4 can transmit or receive such an ultrasonic wave efficiently. For that purpose, in this embodiment, a cylindrical piezoceramic with a diameter of 12 mm and a thickness of about 3 mm is used as the piezoelectric body 4.

A ringlike protective portion 2 with an outside diameter of 12 mm, an inside diameter of 11 mm and a thickness of 140 μm is bonded to such a piezoelectric body 4. In this embodiment, a metal ring made of a stainless steel is used as the protective portion 2. The stainless steel protective portion 2 may be bonded to the piezoelectric body 4 with an adhesive. For example, an epoxy resin may be used as the adhesive and may be cured by leaving the resin in an isothermal vessel at 150° C. for two hours with a pressure of 0.2 MPa applied thereto.

In this embodiment, the acoustic matching layer 3 is made of a dry gel. The acoustic matching layer 3 made of a dry gel has a sonic velocity of about 280 m/s, and therefore, the ultrasonic wave propagated through the acoustic matching layer 3 has a wavelength of about 640 μm. Accordingly, the thickness of the acoustic matching layer 3 is defined at 140 μm so as to be approximately equal to a quarter of the wavelength of the ultrasonic wave being propagated through the acoustic matching layer 3. To deposit the acoustic matching layer 3 to this thickness, the thickness of the protective portion 2 is defined at 140 μm in this embodiment.

The prime role to be filled by the protective portion 2 is to protect the acoustic matching layer 3 from mechanical or thermal shock that is externally applied to the ultrasonic transducer 1 during the manufacturing process or actual use thereof. It is a secondary but equally important function thereof to protect the ultrasonic transducer 1 from the ultrasonic vibrations to be transmitted from, or received at, the ultrasonic transducer 1 during its operation (or use).

To make the acoustic matching layer 3 fulfill these functions, it is very important to maintain close contact between the piezoelectric body 4 and the acoustic matching layer 3. In other words, once even a very small gap has been created between the piezoelectric body 4 and the acoustic matching layer 3, the acoustic matching layer 3 cannot perform its expected functions anymore.

The present inventors discovered that this structure, including the protective portion 2 around the outer periphery of the acoustic matching layer 3 as shown in FIG. 2, could be used very effectively to keep up good contact between the piezoelectric body 4 and the acoustic matching layer 3. Were it not for the protective portion 2, the characteristic of the ultrasonic transducer 1 would deteriorate significantly during the manufacturing process or actual use thereof. Then, no high-performance ultrasonic transducer 1 could be achieved.

The acoustic matching layer 3 of this embodiment is made of a material with very small acoustic impedance, which is defined by ρ×C (i.e., the product of density ρ and sonic velocity C). Thus, the ultrasonic wave can be transmitted or received through a gas such as the air with very high efficiency. In this embodiment, a dry gel is used as described above as an exemplary material with very small acoustic impedance.

If the acoustic matching layer 3 is made of a dry gel, then acoustic matching between the gas and the piezoelectric body can be improved greatly compared to a situation where the acoustic matching layer is made of a conventional material (e.g., a glass or plastic balloon solidified with a resin material). As a result, the ultrasonic wave transmission or reception efficiency can be increased significantly.

As used herein, the "dry gel" is a porous body to be produced by a sol-gel process. Specifically, the dry gel is obtained by forming a solid skeleton through a reaction of a gel material solution, dissolving the skeleton in a solvent to obtain a wet gel, and then drying the wet gel to remove the solvent. This dry gel is a nano-porous body in which continuous pores with average pore diameters of several nm to several μm are defined by the nanometer-scale solid skeleton.

Since the dry gel is a porous body with such a fine structure, the velocity of sound being propagated through the solid portion thereof is extremely low. In addition, the velocity of sound being propagated through the gas portion of the porous body is also extremely low due to the presence of those micropores. Accordingly, this acoustic matching layer has as low a sonic velocity as about 500 m/s or less, thus achieving low acoustic impedance quite differently from the conventional acoustic matching layer. Furthermore, the pressure loss of the gas is significant at the nanometer-scale micropores. For that reason, even when such a porous body is used as the acoustic matching layer, the porous body can also radiate acoustic waves at a high sound pressure.

Such a dry gel may be made of any of various materials including inorganic materials and organic polymer materials. The inorganic solid skeleton may be made of silicon dioxide (silica), aluminum oxide (alumina) or titanium oxide, for example. Also, the organic solid skeleton may be made of a normal thermosetting resin or thermoplastic resin such as polyurethane, polyurea and phenol resins, polyacrylamide and polymethyl methacrylate.

In this embodiment, the acoustic matching layer 3 of the dry gel is formed inside of a recessed space P1 (see FIG. 1) that has been defined in advance by the piezoelectric body 4 and the protective portion 2. Specifically, a liquid gel material is poured into the recessed space P1 that has been defined by the piezoelectric body 4 and the protective portion 2, gelled, hydrophobized and then dried, thereby obtaining a dry gel to be the acoustic matching layer 3. It should be noted that a dry gel including a solid skeleton of silicon dioxide is used as the acoustic matching layer 3.

More specifically, the acoustic matching layer 3 can be formed by sequentially performing the following process steps Nos. 1 to 4:

1. Prepare a gel material solution (i.e., sol) by mixing tetraethoxysilane, ethanol and ammonia water (with a normality of 0.1) together at a mole ratio of 1 to 3 to 4;
2. Drip this gel material solution into the recessed space, defined by the piezoelectric body and the protective portion, with a syringe. In this process step, the gel material solution is dripped to a volume exceeding that of the recessed space P1. Next, the excessive gel material solution is shaken off with a Teflon™ flat plate (not shown) such that the top of the gel material solution remaining in the recessed space P1 is leveled with that of the protective portion. Thereafter, the recessed space filled with the gel material solution is capped with the Teflon™ plate;

3. Leave the gel material solution at room temperature for approximately one day and then remove the Teflon™ cap when the material solution is gelled (i.e., when a wet gel is produced). Thereafter, subject the wet gel to a hydrophobization treatment in a hexane solution including 5 wt % of trimethylethoxysilane; and 4. Introduce the hydrophobized wet gel into a supercritical drying vessel and subject it to a supercritical drying process at 12 MPa and 50° C. within a carbon dioxide atmosphere. A dry gel is obtained in this manner.

As a result of these process steps Nos. 1 through 4, an acoustic matching layer 4 with a density $\rho$ of $0.3 \times 10^3$ kg/m$^3$, a sonic velocity C of 280 m/s and a thickness of 140 µm can be formed.

The present invention is particularly effective when the acoustic matching layer is made of a material with a density of 50 kg/m$^3$ to 1,000 kg/m$^3$ and an acoustic impedance of $2.5 \times 10^3$ kg/m$^2$/s to $1.0 \times 10^6$ kg/m$^2$/s. Such an acoustic matching layer can be easily obtained by the method described above.

According to this method, the thickness of the acoustic matching layer 3 can be substantially equalized with the height H of the protective portion 2. Thus, the thickness of the acoustic matching layer 3 is precisely controllable by the protective portion 2. That is to say, at a stage of the manufacturing process, the protective portion 2 functions as a guide for the gel material solution so to speak.

Also, according to the method described above, the acoustic matching layer 3 can be formed with the variation in the thickness thereof minimized and at a good yield. Thus, the variation in the performance of ultrasonic transducers can also be minimized. It should be noted that to equalize the height of the protective portion 2 with the thickness of the acoustic matching layer 3 is not indispensable to the present invention. If the height of the protective portion 2 is greater than the thickness of the acoustic matching layer 3, then the expected functions of minimizing the shrinkage of the acoustic matching layer 3 and protecting the acoustic matching layer 3 from mechanical shocks are achieved fully. Conversely, even if the height of the protective portion 2 is smaller than the thickness of the acoustic matching layer 3, the functions of minimizing the shrinkage of the acoustic matching layer 3 and protecting it from mechanical shocks are still achieved to a higher degree compared with a structure with no protective portion 2.

Figure 3A:
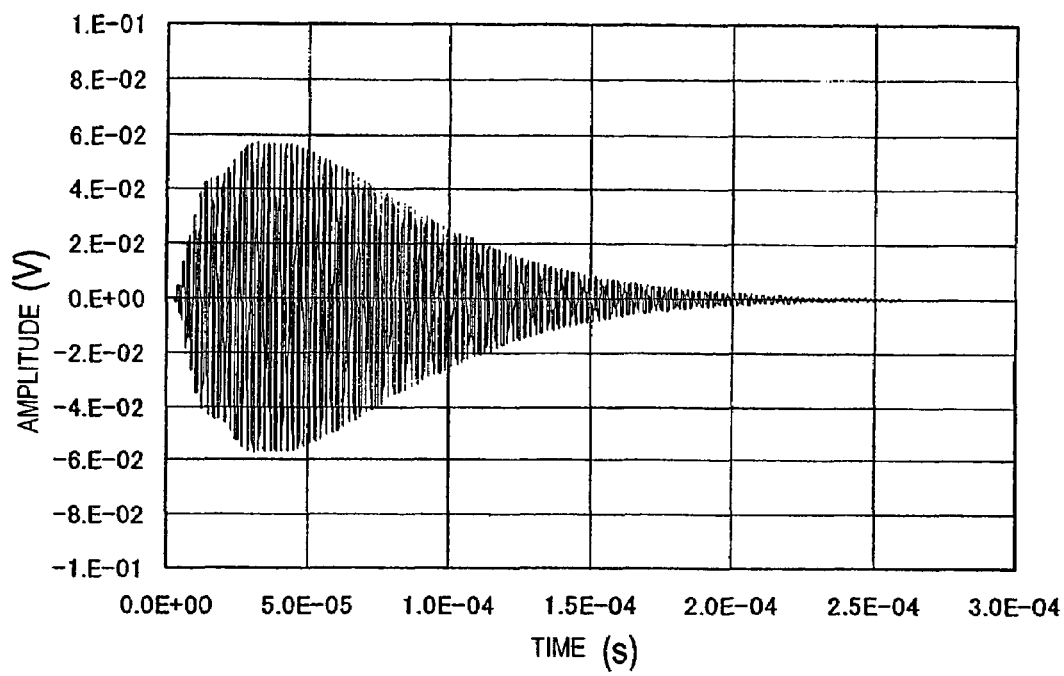
FIG. 3(a) is a graph showing a waveform to be transmitted from, or received at, the ultrasonic transducer of the first embodiment of the present invention.
Figure 3B:
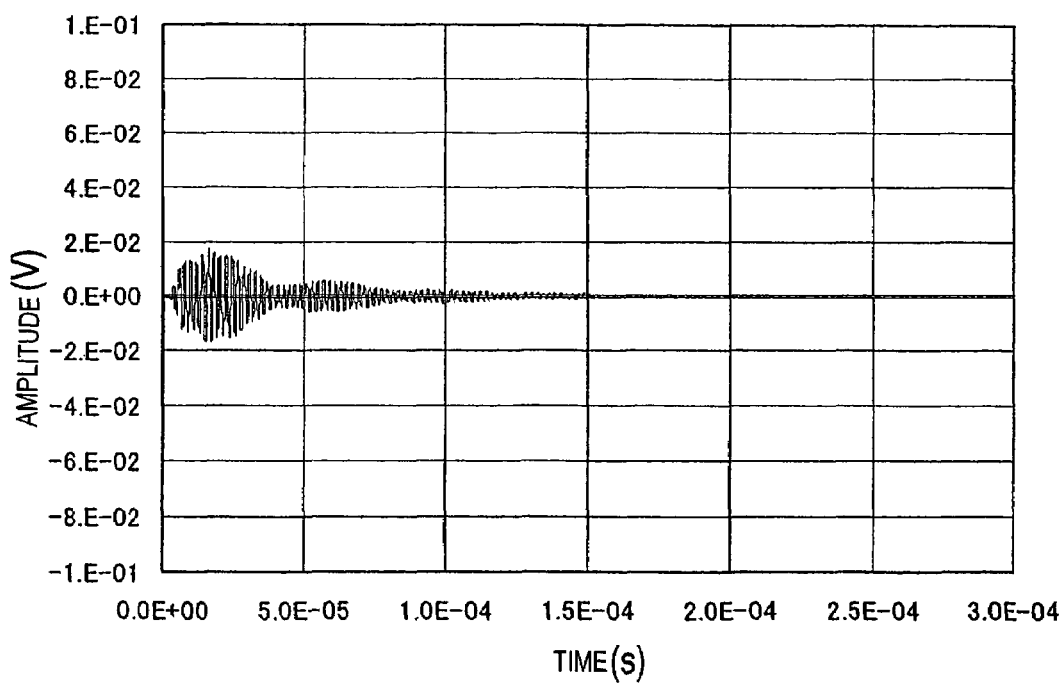
FIG. 3(b) is a graph showing a waveform to be transmitted from, or received at, a conventional ultrasonic transducer.

The waveform of ultrasonic waves to be transmitted from, or received at, the ultrasonic transducer including the acoustic matching layer 4 made by the method described above was measured. The waveform measured is shown in FIG. 3(a). For the purpose of comparison, a transmitted/received waveform representing a situation where the acoustic matching layer was made of a material obtained by solidifying a glass balloon with an epoxy resin is shown in FIG. 3(b). In this case, the glass balloon acoustic matching layer used had a density of 0.52 g/cm$^3$, a sonic velocity of 2,500 m/s and a thickness of 1.25 mm.

As already described for the prior art, the acoustic matching layer preferably has an acoustic impedance that is defined by Equation (5). In this preferred embodiment, the piezoelectric body 4 is made of a piezoceramic such as lead zirconate titanate and the ultrasonic wave propagating medium is the air. Accordingly, since the piezoelectric body 4 has a density of $7.7 \times 10^3$ kg/m$^3$ and a sonic velocity of 3,800 m/s, the acoustic impedance thereof will be about $29 \times 10^6$ kg/m$^2$/s. On the other hand, since the air has a density of 0.00118 kg/m$^3$ and a sonic velocity of 340 m/s, the acoustic impedance thereof will be about $0.0004 \times 10^6$ kg/m$^2$/s. Consequently, a preferred acoustic impedance of the acoustic matching layer given by Equation (5) will be about $0.1 \times 10^6$ kg/m$^2$/s theoretically.

In the ultrasonic transducer 1 of this embodiment, the acoustic matching layer 3 thereof has a density of $0.3 \times 10^3$ kg/m$^3$ and a sonic velocity of 280 m/s, and therefore, has an acoustic impedance of about $0.084 \times 10^6$ kg/m$^2$/s, which is very close to the theoretical ideal value.

As can be seen from FIG. 3, the ultrasonic transducer of this embodiment achieves a transmission/reception sensitivity which is at least three times as high as that of the conventional sensor. Also, in this embodiment, the protective portion 2 is provided. Accordingly, even an ultrasonic transducer, including an acoustic matching layer that is made of a dry gel with so low a mechanical strength as to be broken easily, can be produced at a good yield. In addition, the ultrasonic transducer can also operate reliably enough for a sufficiently long time even during actual use. The ultrasonic transducer was subjected to an external vibration test, a thermal shock test, a continuous vibration test and so on to determine whether or not the acoustic matching layer 3 peeled off the piezoelectric body 4 under strict conditions. As a result, it was confirmed that the ultrasonic transducer never exhibited deteriorated performance but continued extremely stabilized operation.

Figure 4:
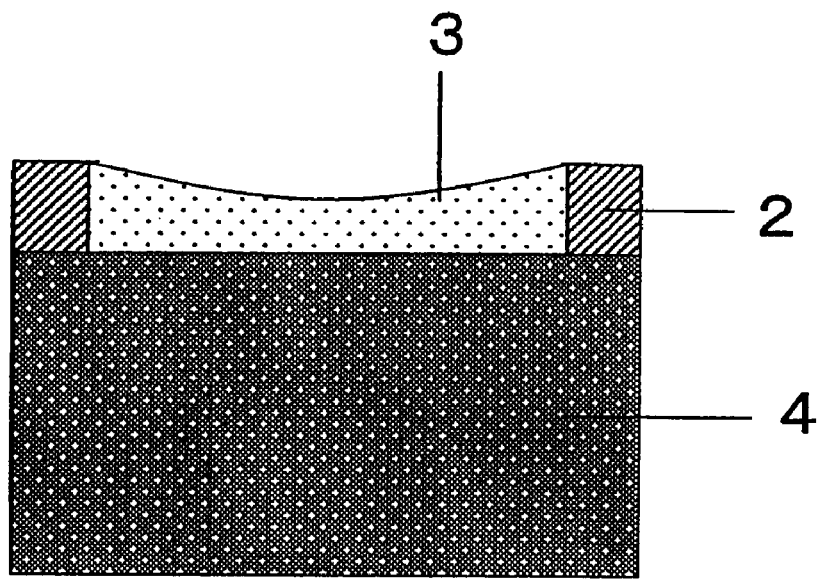
FIG. 4 is a cross-sectional view schematically showing a situation where the acoustic matching layer has shrunk in the first embodiment of the present invention.

In the preferred embodiment described above, the process step No. 4 of obtaining a dry gel by drying the wet gel is carried out by a supercritical drying technique. Alternatively, the wet gel may also be dried in the normal air. In that case, while the wet gel is turning into the dry gel, the gel shrinks to lose about 10% to about 20% of its volume. When the volume decreases to such a degree, the acoustic matching layer 3 will peel off the piezoelectric body 4 in the conventional structure. In this embodiment, however, the protective portion 2 is provided, and therefore, the dry gel mainly shrinks only in the thickness direction as shown in FIG. 4. That is to say, almost no stress is created horizontally on the interface between the piezoelectric body 4 and the acoustic matching layer 3 and peeling of the acoustic matching layer 3 can be prevented effectively. Accordingly, even if the air drying technique, which is more convenient than the supercritical drying technique, is adopted, the high-sensitivity, high-reliability ultrasonic transducer 1 can also be obtained and the manufacturing cost can also be reduced.

It should be noted that the height of the protective portion 2 is preferably defined with the shrinkage of the dry gel taken into account such that the acoustic matching layer 3 eventually has the best thickness. If the dry gel shrank so much that the thickness of the thinnest portion of the acoustic matching layer 3 has decreased to 90% or less of the average thickness thereof, then the property of the acoustic matching layer 3 would deteriorate unintentionally. According to the supercritical drying technique, the thickness of the thinnest portion of the acoustic matching layer 3 can also be kept 98% or more of the average thickness thereof.

The upper surface of the piezoelectric body 4 to contact with the lower surface of the acoustic matching layer 3 and the inner side surface of the protective portion 2 to contact with the side surface of the acoustic matching layer 3 are preferably subjected to some surface treatment (such as plasma cleaning or acid processing) in advance. If a hydroxide group is produced on the contact surfaces through such a treatment, the chemical bond between the dry gel and the piezoelectric body 4 or between the dry gel and the protective portion 2 can be further consolidated.

To realize a strong bond between the acoustic matching layer 3 and the piezoelectric body 4 or between the acoustic matching layer 3 and the protective portion 2, portions of the surfaces of the piezoelectric body 4 and the protective portion 2, which will contact with the acoustic matching layer 3, may be roughened. As the roughening technique, a normal sandpaper treatment, a blast treatment or a physical or chemical etching process may be used effectively.

To increase the degree of adhesion of the acoustic matching layer 3 to the protective portion 2, it is also effective to use a porous material as the material for the protective portion 2. When the protective portion 2 is made of a porous material, a portion of the acoustic matching layer 3 permeates, and is combined with, the protective portion 2, thus realizing a more firmly adhered state.

Preferred porous materials that can be used for the protective portion 2 may be metals, ceramics and resins that are produced by a foaming technique, for instance. Examples of preferred porous metals include stainless steel, nickel and copper. Examples of preferred ceramics include alumina and barium titanate. And examples of preferred resins include epoxy and urethane resins.

As used herein, "to protect the acoustic matching layer" means not only protecting the acoustic matching layer from mechanical vibrations or shocks but also minimizing peeling of the acoustic matching layer in the process step of making the acoustic matching layer of a shrinkable material. By adopting the member that protects the acoustic matching layer in this manner, even if the acoustic matching layer is made of a shrinkable material with low mechanical strength, the acoustic matching layer can still maintain its expected function (i.e., transmitting or receiving an ultrasonic wave efficiently between the piezoelectric body and the ultrasonic wave propagating medium through acoustic matching) at a practical level.

EMBODIMENT 2

Figure 5:
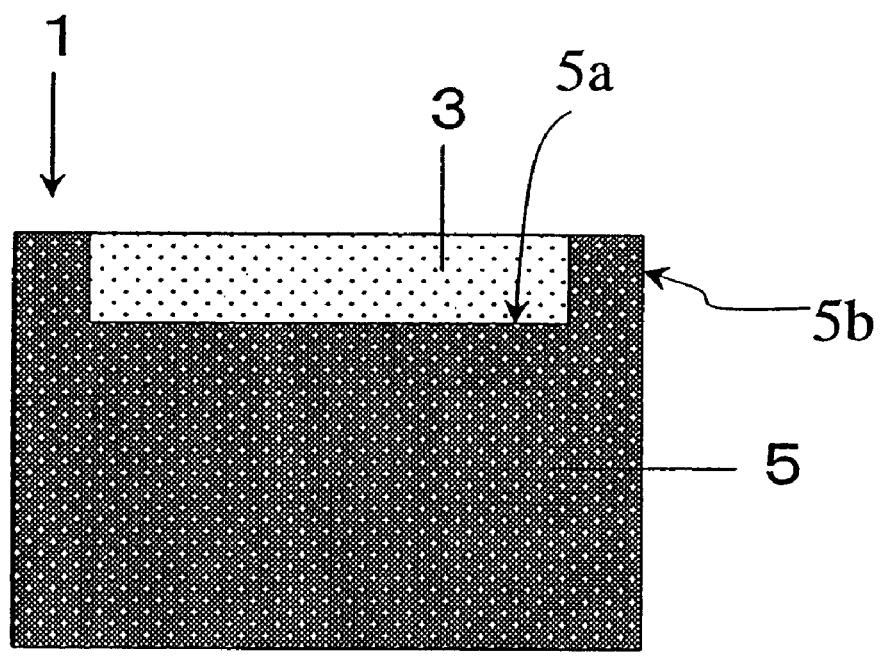
FIG. 5 is a cross-sectional view illustrating an ultrasonic transducer according to a second embodiment of the present invention.

Hereinafter, a second embodiment of the present invention will be described with reference to FIG. 5.

In this preferred embodiment, the protective portion and the piezoelectric body are combined together. Specifically, a concave portion 5a is defined at the center of the principal surface of the piezoelectric body 5 such that a portion of the piezoelectric body 5 may be used as the protective portion. In other words, the portion 5b of the piezoelectric body 5 functions as the protective portion and the protective portion and the piezoelectric body are combined together.

The ultrasonic transducer shown in FIG. 5 may be fabricated in the following manner.

First, a piezoelectric body 5 that has already been subjected to a polarization process is provided, and has one of its principal surfaces patterned into the concave portion 5a. The patterning process to define the concave portion 5a may be carried out by an end mill or a sandblast. The depth of the concave portion 5a corresponds with the height of the protective portion 5b. Thereafter, an electrode is formed on the surface with the concave portion 5a and another electrode is formed on the opposite surface of the piezoelectric body so as to face the concave portion. These electrodes may be formed by depositing a metal film of gold or nickel by a plating or sputtering process, for example.

In this preferred embodiment, the piezoelectric body 5 is patterned such that the periphery of its principal surface functions as the protective portion. Thus, there is no need to carry out the process step of bonding a separately provided protective portion to the piezoelectric body. If the protective portion is bonded with an adhesive, then it is necessary to consider a change in the height of the protective portion due to the presence of the adhesive layer. In contrast, according to this preferred embodiment, the thickness of the acoustic matching layer 3 can be adjusted highly precisely by the protective portion of which the height is defined with high precision. Thus, a high-performance ultrasonic transducer can be provided constantly.

In this preferred embodiment, a portion of the surface of the piezoelectric body 5, which will contact with the acoustic matching layer 3, is also preferably subjected to a process of producing a hydroxide group. Also, if the piezoelectric body 5 is roughened during the process step of defining the concave portion 5a in the piezoelectric body 5, then the degree of adhesion of the acoustic matching layer 3 to the piezoelectric body 5 can be further increased.

Figure 6:
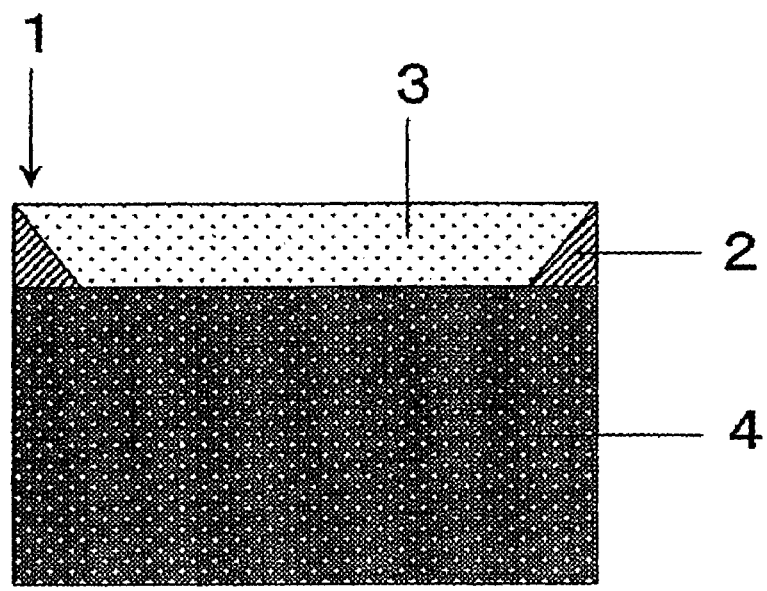
FIG. 6 is a cross-sectional view showing another configuration for the protective portion in the second embodiment of the present invention.
Figure 7:
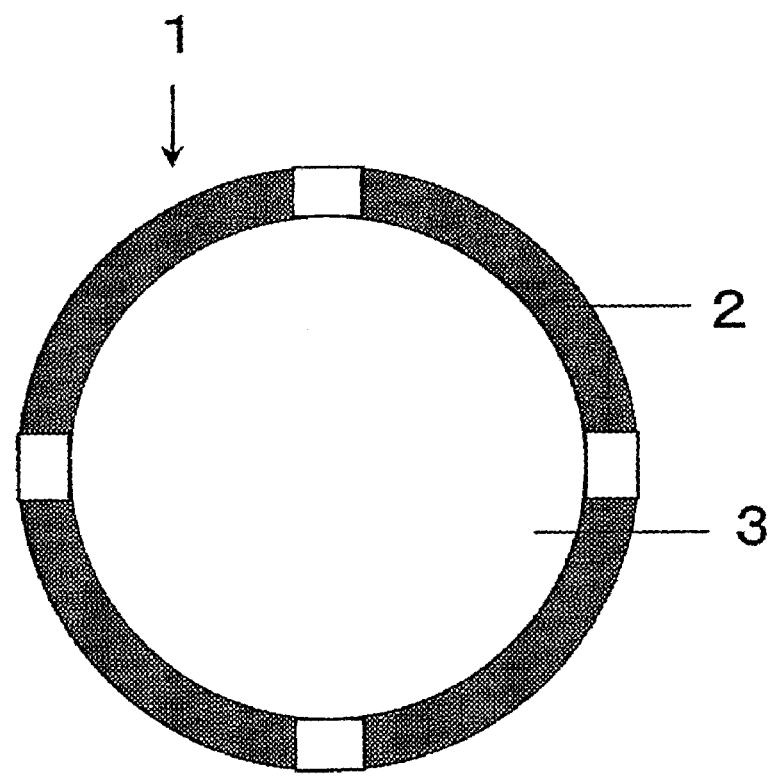
FIG. 7 is a top view showing still another configuration for the protective portion in the second embodiment of the present invention.

In the first and second preferred embodiments described above, the portion functioning as the protective portion is defined as a ring that has a side surface extending perpendicularly to the principal surface of the piezoelectric body 5. Alternatively, the side surface of the protective portion may also be tapered as shown in FIG. 6. Also, the side surface of the protective portion does not have to contact with the entire outer side surface of the acoustic matching layer 3 but may be divided into a number of portions or partially notched as shown in FIG. 7.

In the structure of the first or second preferred embodiment described above, even if the acoustic matching layer thereof is made of a material with a low density and a low sonic velocity such as a dry gel, the protective portion consolidates the bond between the acoustic matching layer and the piezoelectric body, thereby achieving high transmission/reception sensitivity. In addition, the ultrasonic transducer can also be handled more easily during the manufacturing process thereof, and a high-performance ultrasonic transducer can be produced at a good yield. Furthermore, even if the ultrasonic transducer is subject to mechanical shocks during the actual use or vibrations at the time of ultrasonic wave transmission or reception, the ultrasonic transducer will exhibit hardly deteriorated performance and good reliability.

EMBODIMENT 3

Hereinafter, a third embodiment of the present invention will be described with reference to FIG. 8.

This embodiment is characterized by including a structure supporting member 6. The structure supporting member 6 shown in FIG. 8 includes a disklike supporting portion 6a, on which the acoustic matching layer 3 and so on are fixed, and a cylindrical portion 6b that extends continuously from the disklike supporting portion in the axial direction. The end of the cylindrical portion has an L-cross section such that the structure supporting member 6 can be easily secured to a shielding plate 60 or another apparatus.

The acoustic matching layer 3 and the protective portion 2 are arranged on the surface of the supporting portion 6a of the structure supporting member 6, while the piezoelectric body 4 is provided on the back surface of the supporting portion 6a. That is to say, the piezoelectric body 4 and the acoustic matching layer 3 are provided so as to face each other with the structure supporting member 6 interposed between them. By using such a structure supporting member 6, the ultrasonic transducer (or ultrasonic transmitter-receiver) can be handled very easily.

The structure supporting member 6 may be a sealable container (e.g., sensor case). In that case, if the open end of the cylindrical portion 6b of the structure supporting member 6 is closed with the shielding plate 60 or any other suitable member and if the inner space of the structure supporting member 6 is filled with an inert gas, then the piezoelectric body 4 can be shielded from the fluid under measurement. A voltage is applied to the piezoelectric body 4. Accordingly, if the piezoelectric body 4 is surrounded with a combustible gas, then the combustible gas might fire. However, such firing can be avoided by using a sealed container as the structure supporting member 6 such that the inside space thereof is shielded from the outside atmosphere. Thus, the ultrasonic wave can be radiated safely even toward a combustible gas. Also, even if the external gas toward which the ultrasonic wave is radiated is not combustible, the piezoelectric body 4 is also preferably shielded from such an external gas, because the gas may still react with the piezoelectric body 4 and deteriorate the property of the piezoelectric body 4. Then, the deterioration of the piezoelectric body 4 can be minimized and highly reliable operation can be maintained for a sufficiently long time.

Figure 8:
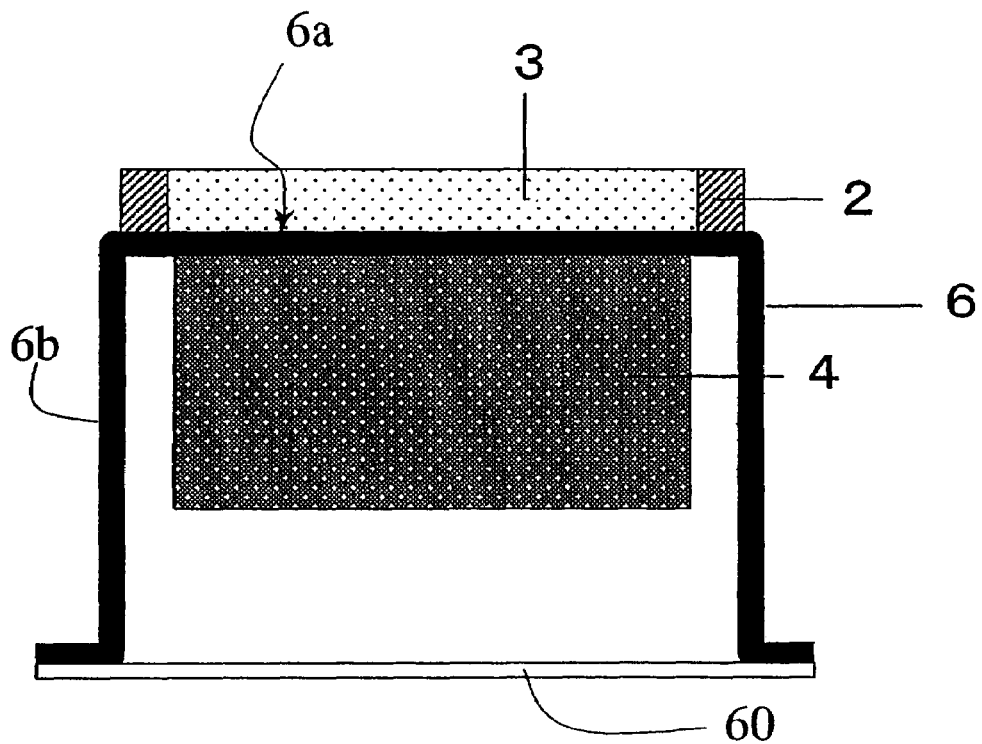
FIG. 8 is a cross-sectional view illustrating an ultrasonic transducer according to a third embodiment of the present invention.

In the example illustrated in FIG. 8, the protective portion 2 is arranged so as to surround the outer periphery of the ultrasonic wave transmitting/receiving surface of the piezoelectric body 4. Normally, the protective portion 2 does not function as the acoustic matching layer 4. Accordingly, if the protective portion 2 was located on the principal surface of the piezoelectric body 4, then that portion would never contribute to transmitting or receiving the ultrasonic wave, thus decreasing the transmission or reception sensitivity unintentionally.

To prevent the structure supporting member 6 from constituting any acoustic obstacle, the thickness of the disklike supporting portion 6a to contact with the piezoelectric body 4 is preferably at most equal to one eighth of the wavelength of the ultrasonic wave to be transmitted or received. If that thickness is set equal to about one eighth of the wavelength, the structure supporting member 6 will no longer interfere with the propagation of the ultrasonic wave.

In this preferred embodiment, the structure supporting member 6 is made of a stainless steel and has a thickness of 0.2 mm. Since the sonic velocity in the stainless steel is about 5,500 m/s, 0.2 mm is equivalent to about one fifty-fifth of the wavelength of an ultrasonic wave with a frequency of 500 kHz. As the structure supporting member 6 is made of such thin stainless steel, the presence of the structure supporting member 6 on the ultrasonic wave propagation path would constitute almost no acoustic obstacle.

The material of the structure supporting member 6 does not have to be a metal but may also be selected from the group consisting of ceramics, glasses and resins according to the specific purpose. In this preferred embodiment, to isolate the piezoelectric body from the external fluid just as intended and to make the structure supporting member 6 strong enough to prevent the piezoelectric body and the external fluid from contacting with each other even when the structure supporting member 6 is subject to any mechanical shock, the structure supporting member 6 is made of a metal material. Thus, even if the ultrasonic wave is transmitted or received through a gas with combustibility or explosiveness, a high degree of safety is still ensured.

However, if the ultrasonic wave is transmitted or received through a safe gas, the structure supporting member 6 may also be made of a resin or any other material to cut down the cost.

To increase the degree of contact between the structure supporting member 6 and the acoustic matching layer 3, a portion of the surface of the structure supporting member 6, which will contact with the acoustic matching layer 3, is preferably subjected to a plasma or acid pretreatment to add a hydroxide group thereto. Alternatively, that portion may also be roughened by a sandpaper treatment, a sandblast treatment or chemical and/or physical etching process, for example.

EMBODIMENT 4

Hereinafter, a fourth embodiment of the present invention will be described with reference to FIG. 9.

In the ultrasonic transducer of this embodiment, a portion 7a of the structure supporting member 7 thereof functions as the protective portion, and the structure supporting member 7 and the protective portion are integrated together. While the structure supporting member 7 is formed by pressing and compacting a metal material such as a stainless steel, a concave portion 7b may be defined on the disklike supporting portion thereof. Then, the periphery of the concave portion 7b (i.e., the portion 7a of the structure supporting member 7 that has been folded by the pressing and compacting process) may be used as the protective portion.

By adopting such a structure, the process step of bonding the protective portion onto the structure supporting member can be omitted. Also, as in the first embodiment, the height of the protective portion is not changeable with the thickness of the adhesive layer, and high-sensitivity ultrasonic transducers can be produced at a good yield.

Figure 9:
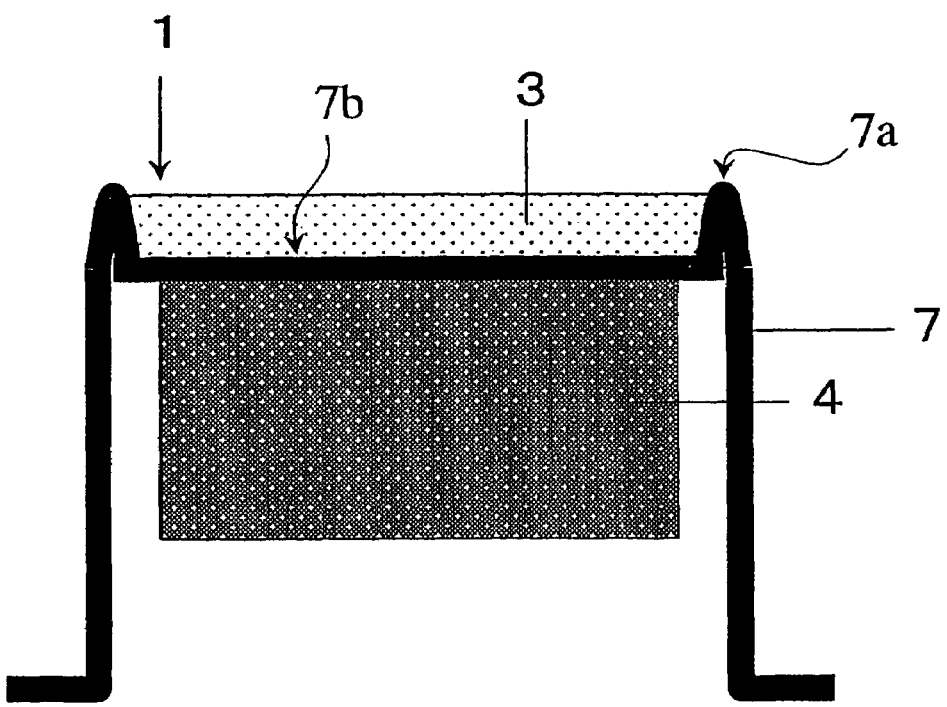
FIG. 9 is a cross-sectional view illustrating an ultrasonic transducer according to a fourth embodiment of the present invention.

In FIG. 9, no plate for sealing the structure supporting member 7 is illustrated. However, such a plate may be adhered to, or form an integral part of, the structure supporting member 7 if necessary. This statement will apply to any of various other embodiments to be described below.

EMBODIMENT 5

Hereinafter, a fifth embodiment of the present invention will be described with reference to FIGS. 10 and 11.

The ultrasonic transducer of this embodiment further includes another acoustic matching layer (which will be referred to herein as a "lower acoustic matching layer") 8, which is provided between the acoustic matching layer 3 and the piezoelectric body 4. Except for the lower acoustic matching layer 8 added, the arrangement of this preferred embodiment is the same as that of the second preferred embodiment described above.

Generally speaking, an acoustic matching layer performs the function of getting an ultrasonic wave radiated from a piezoelectric body toward a medium (i.e., ultrasonic wave propagating medium) efficiently by minimizing the internal reflection of the acoustic wave due to a mismatch between acoustic impedances. In transmitting or receiving an ultrasonic wave with a single frequency (i.e., a continuous ultrasonic wave), one acoustic matching layer would be enough.

In contrast, a normal ultrasonic transducer transmits or receives a pulsed or burst ultrasonic wave, which includes multiple frequency components over a broad range, not a single frequency component. To transmit or receive such an ultrasonic wave at a high sensitivity, the acoustic impedance of the acoustic matching layer is preferably changed gradually between the piezoelectric body and the ultrasonic wave propagating medium. And to change the acoustic impedance gradually, the acoustic matching layer may consist of multiple layers with gradually shifting acoustic impedances.

Figure 10:
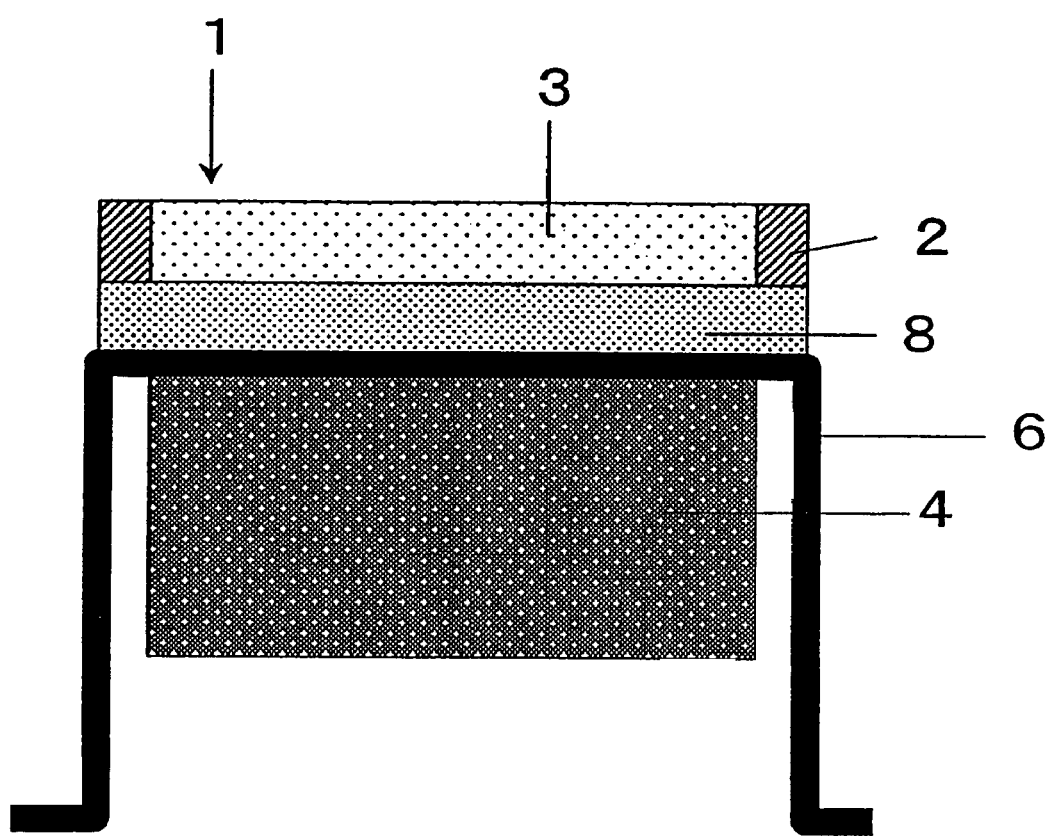
FIG. 10 is a cross-sectional view illustrating an ultrasonic transducer according to a fifth embodiment of the present invention.

In this preferred embodiment, the acoustic matching layer consists of two layers as shown in FIG. 10. Specifically, a porous sintered body of a ceramic is used as the lower acoustic matching layer 8. This acoustic matching layer 8 has an apparent density of about $0.64 \times 10^3$ kg/m$^3$, a sonic velocity of 2,000 m/s and an acoustic impedance of about $1.28 \times 10^6$ kg/m$^2$/s. A barium titanate based material is used as the ceramic.

The "apparent density" is calculated with respect to the entire porous body including the void portion thereof. About 80 vol % of the porous ceramic is the void portion (i.e., pores) and the substantive portion of the ceramic is just about 20 vol % thereof. Such a porous ceramic may be formed by mixing resin balls with a ceramic powder, pressing and compacting the mixture, and then heating and burning the resin balls away while sintering the ceramic. If the resin balls were heated too rapidly during the sintering process, then the resin balls would expand or gasify so quickly as to destroy the ceramic structure. For that reason, the resin balls are preferably heated gently.

In this preferred embodiment, after such a lower acoustic matching layer 8 has been fixed (onto the structure supporting member 6) with respect to the piezoelectric body 4, the protective portion 2 is bonded onto another surface of the acoustic matching layer 8, which is opposite to the piezoelectric body 4. Just like the protective portion 2 for use in the first preferred embodiment, a stainless steel ring may also be used as the protective portion 2. Any bonding process may be carried out with an epoxy resin adhesive.

Inside of the concave portion that has been defined by the lower acoustic matching layer 8 and the protective portion 2 in this manner, a dry gel layer to be the acoustic matching layer 3 is provided as in the first preferred embodiment.

In this preferred embodiment, the concentration of ammonia to be a gelling reaction catalyst in the process step No. 1, which is equivalent to the process step No. 1 of the first preferred embodiment, is changed to adjust the density of the dry gel, thereby forming a dry gel layer with a density of $0.2 \times 10^3$ kg/m$^3$, a sonic velocity of 160 m/s and an acoustic impedance of about $0.032 \times 10^6$ kg/m$^2$/s as the acoustic matching layer. Since the acoustic matching layer has a sonic velocity of 160 m/s, the height of the protective portion 2 is defined at 80 μm so as to be a quarter of the wavelength of the ultrasonic wave in the acoustic matching layer. The inner side surface of the protective portion 2 is preferably subjected to some treatment to add a hydroxide group by a plasma etching process, for example.

Figure 11A:
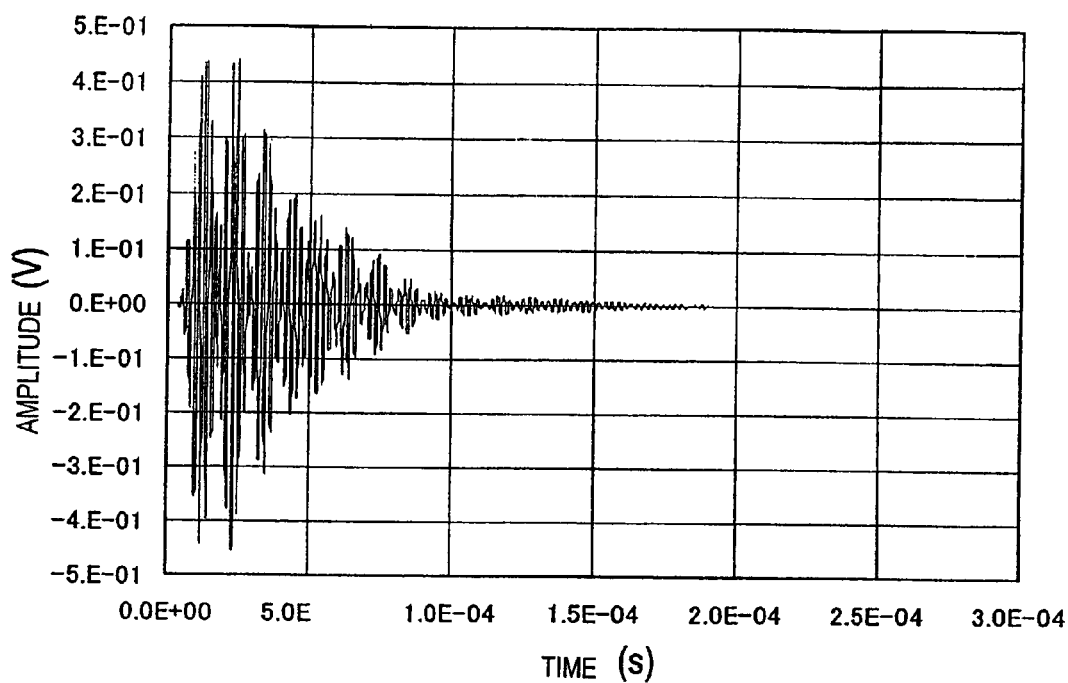
FIG. 11(a) is a graph showing a waveform to be transmitted from, or received at, the ultrasonic transducer of the fifth embodiment of the present invention.

FIG. 11(a) shows the waveform of an ultrasonic wave to be transmitted from, or received at, the ultrasonic transducer of this preferred embodiment. In the graphs shown in FIG. 11, the ordinate represents the signal amplitude and the abscissa represents the time. The numerical values as the ordinates and abscissas are exponential representations. For example, "2.0E-04" represents $2.0 \times 10^{-4}$. The same statement will apply to the other graphs.

In the ultrasonic transducer under measurement, the porous ceramic as the lower acoustic matching layer 8 had a thickness of 1 mm, and the protective portion 2 and the first acoustic matching layer (i.e., dry gel layer) 2 had a thickness of 80 μm.

Figure 11B:
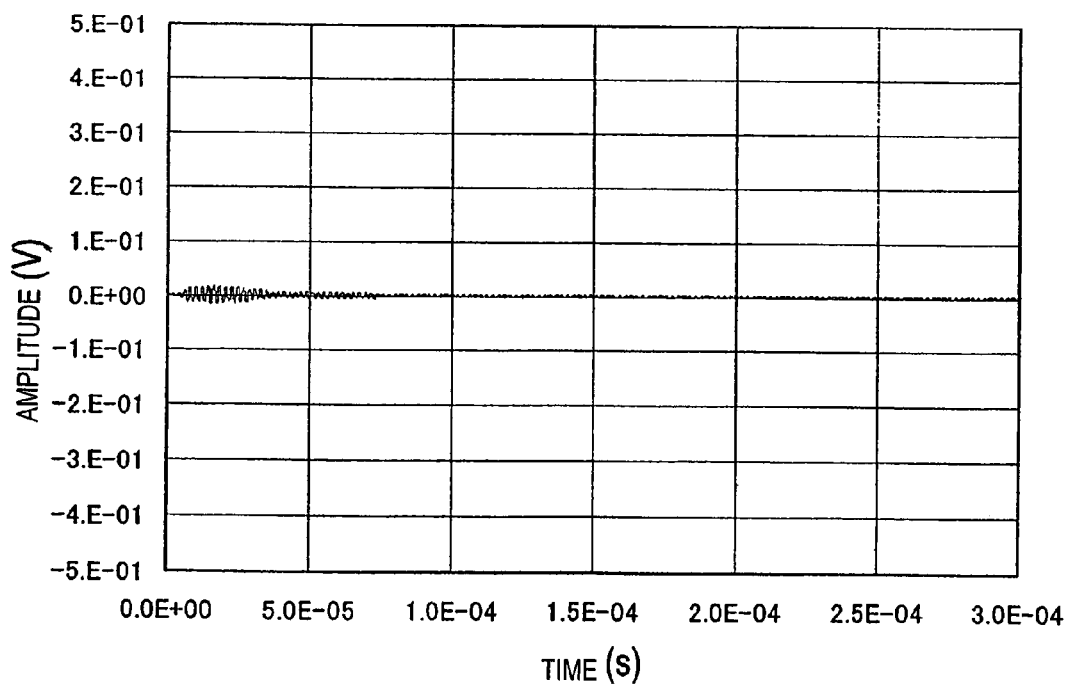
FIG. 11(b) is a graph showing a waveform to be transmitted from, or received at, a conventional ultrasonic transducer.

For the purpose of comparison, the two acoustic matching layers 3 and 8 of the ultrasonic transducer shown in FIG. 10 were replaced with a conventional acoustic matching layer (obtained by solidifying a glass balloon with an epoxy resin), thereby making a comparative ultrasonic transducer. And the waveform of the ultrasonic wave to be transmitted from, or received at, the ultrasonic transducer was measured. The results are shown in FIG. 11(b).

By providing the two acoustic matching layers, the sensitivity achieved was about 20 times as high as that of the conventional ultrasonic sensor. Also, even if this ultrasonic transducer is compared with the ultrasonic sensor of the first preferred embodiment, it can be seen that this ultrasonic transducer achieves sufficiently high sensitivity and broadened frequency range (shortened pulses). In this manner, by using the dual acoustic matching layers, an ultrasonic transducer that can transmit or receive pulsed or burst waves very effectively is provided.

EMBODIMENT 6

Figure 12:
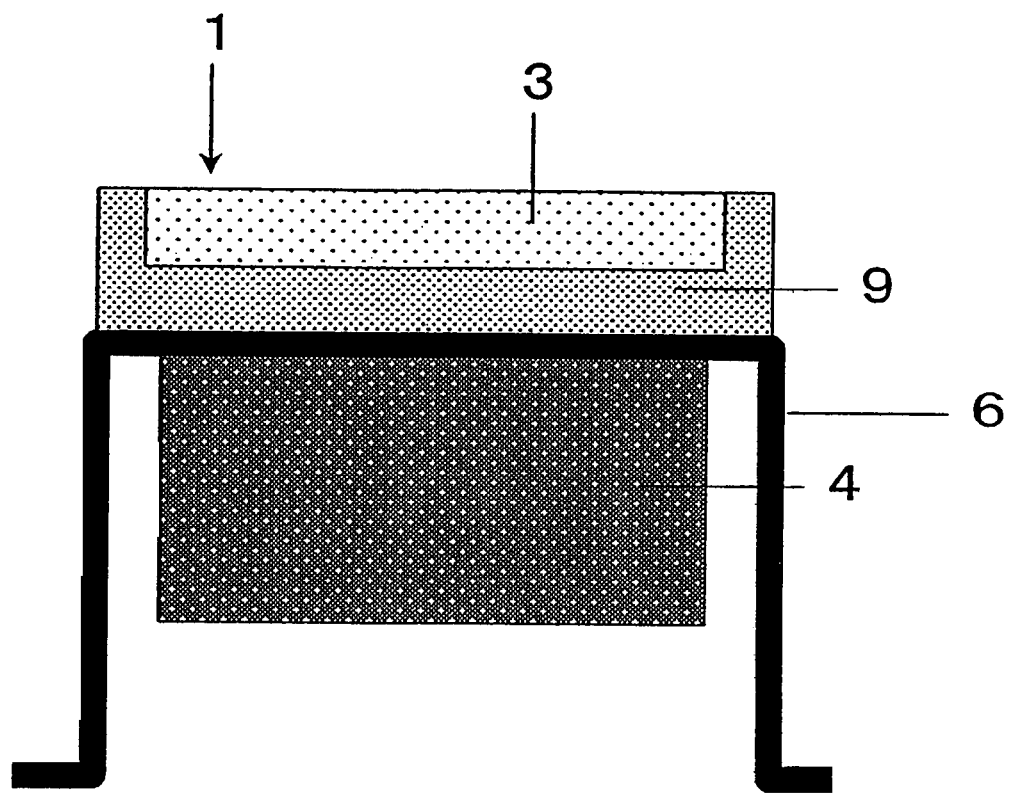
FIG. 12 is a cross-sectional view showing another configuration for a lower acoustic matching layer according to a sixth embodiment of the present invention.

Hereinafter, a sixth embodiment of the present invention will be described with reference to FIG. 12.

In this preferred embodiment, a portion of the lower acoustic matching layer 9 functions as the protective portion and the acoustic matching layer 9 and the protective portion are integrated together. In this example, a concave portion is defined on the principal surface of the acoustic matching layer 9 by patterning the acoustic matching layer 9. The dry gel layer to be the upper acoustic matching layer 3 is provided inside of the concave portion of the lower acoustic matching layer 9.

By adopting such a structure, the process step of bonding the protective portion onto the acoustic matching layer 9 can be omitted. Also, it is possible to overcome the problem that the height of the protective portion is changeable with the thickness of the adhesive layer, and ultrasonic transducers, operating at a high sensitivity in a broad frequency range, can be produced at a good yield.

In this preferred embodiment, the lower acoustic matching layer 9 is made of a porous body. Thus, the lower acoustic matching layer 9 can be strongly bonded to the upper acoustic matching layer 3, and high sensitivity and high stability are ensured. To further increase the degree of adhesion, the contact surfaces of the upper and lower acoustic matching layers 3 and 8 are preferably subjected to a plasma or acid pretreatment to add a hydroxide group thereto.

In this embodiment and the previous fifth embodiment, the acoustic matching layer has the dual layer structure. However, the ultrasonic vibrator of the present invention is not limited to such a structure, but may have a multilayer structure consisting of three or more acoustic matching layers. By providing an increased number of acoustic matching layers in this manner, the sensitivity can be further increased and the operating frequency range can be further broadened. It should be noted, however, that to increase the sensitivity with such a multilayer structure, the outermost acoustic matching layer needs to be made of a material with extremely low acoustic impedance. For that reason, the dual layer structure would be a practical choice in actuality.

EMBODIMENT 7

Hereinafter, a seventh embodiment of the present invention will be described with reference to FIGS. 13 through 15.

Figure 13:
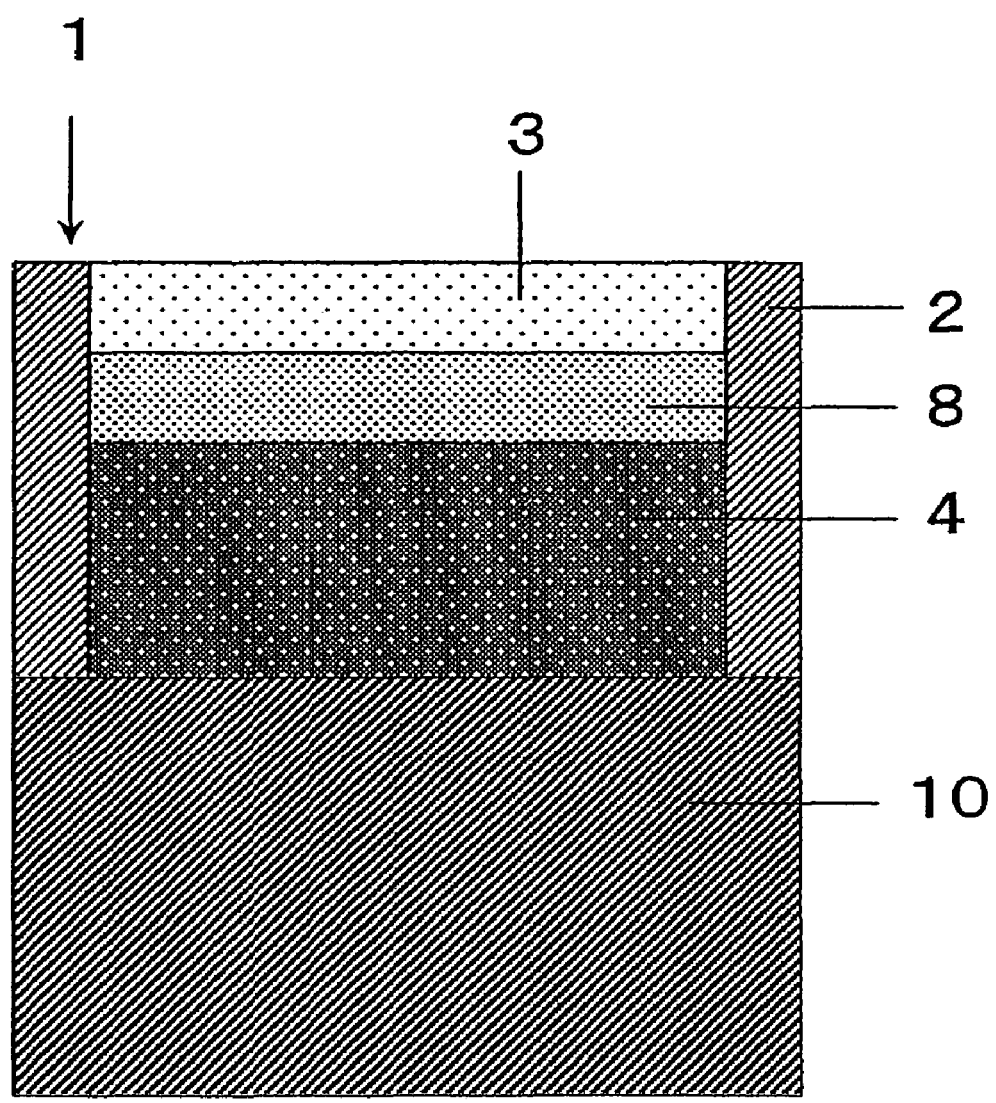
FIG. 13 is a cross-sectional view illustrating an ultrasonic transducer according to a seventh embodiment of the present invention.

In the ultrasonic transducer of this preferred embodiment, a rear loading member 10 is bonded to the back surface of the piezoelectric body 4, and the protective portion 2 is provided on the rear loading member 10 as shown in FIG. 13. In the other respects, the ultrasonic transducer of this preferred embodiment has the same structure as the counterpart of the third preferred embodiment described above.

The rear loading member 10 has the function of attenuating an ultrasonic wave that has been radiated backward from the piezoelectric body 4. The rear loading member 10 may be made of any material as long as the material achieves such a function.

The protective portion 2 is a cylindrical metal member and is bonded to the principal surface of the rear loading member 10. The thickness of the protective portion 2 is equal to the total thickness of the piezoelectric body 4, the lower acoustic matching layer 8 and the upper acoustic matching layer 3. In this preferred embodiment, the piezoelectric body 4 has a thickness of 3 mm, the acoustic matching layer 8 has a thickness of 1 mm and the acoustic matching layer 3 has a thickness of 0.08 mm. Accordingly, the protective portion 2 has a thickness of 4.08 mm.

In this preferred embodiment, the rear loading member 10 is made of ferrite rubber, which is a material obtained by dispersing an iron powder in rubber and which can attenuate an acoustic wave at a high attenuation factor. By bonding such a rear loading member 10 to the back surface of the piezoelectric body 4, the ultrasonic wave that has been radiated backward from the piezoelectric body 4 can be attenuated and a broad-band (i.e., short-pulse-width) ultrasonic wave can be transmitted or received.

Figure 14:
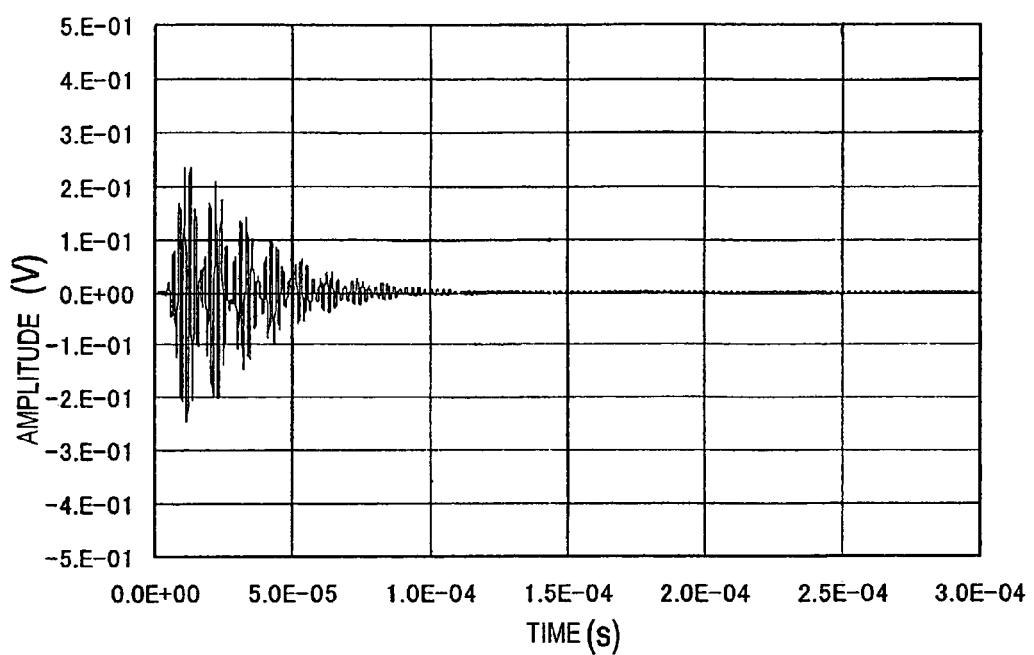
FIG. 14 is a graph showing a waveform to be transmitted from, or received at, the ultrasonic transducer of the seventh embodiment of the present invention.

FIG. 14 shows the waveform of an ultrasonic wave that was transmitted from, or received at, an ultrasonic transducer having the configuration shown in FIG. 13. The transmission or reception sensitivity of the ultrasonic transducer of this preferred embodiment is lower than that of the ultrasonic transducer of the third preferred embodiment described above. However, the ultrasonic transducer of this preferred embodiment can operate in a broader frequency range and can transmit or receive pulses with a shorter width effectively.

Figure 15:
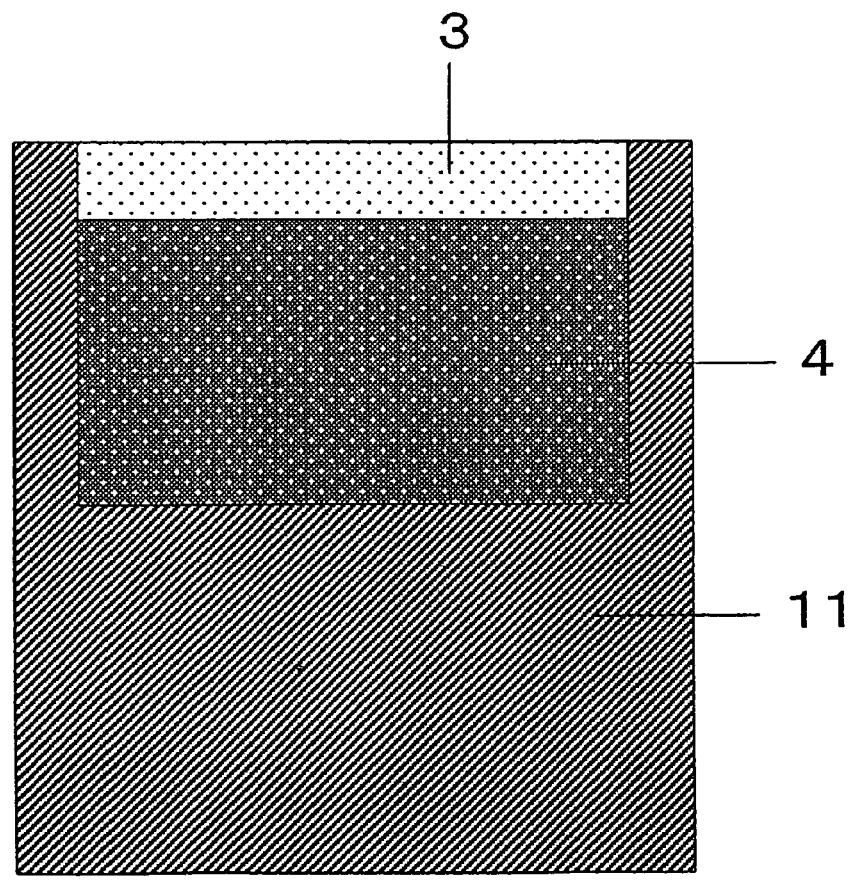
FIG. 15 is a cross-sectional view illustrating another ultrasonic transducer with a different configuration according to the seventh embodiment of the present invention.

The rear loading member 10 shown in FIG. 13 may be replaced with the rear loading member 11 shown in FIG. 15. A portion of the rear loading member 11 shown in FIG. 15 functions as the protective portion, and the protective portion forms an integral part of the rear loading member. The rear loading member 11 has a structure in which a concave portion is defined on the principal surface thereof except for its outer periphery. The piezoelectric body 4 is inserted into the concave portion and bonded to the inside surfaces of the concave portion of the rear loading member 11. The depth of the concave portion in the rear loading member 11 is greater than the height of the piezoelectric body 4. Accordingly, if a dry gel layer to be the acoustic matching layer is provided on the upper surface of the piezoelectric body 4 inserted, the structure shown in FIG. 15 is obtained. By adopting the rear loading member 11, the operating frequency range can also be broadened as in the ultrasonic transducer shown in FIG. 13.

EMBODIMENT 8

Hereinafter, an embodiment of a method for fabricating the ultrasonic transducer shown in FIG. 12 will be described with reference to FIG. 16.

Figure 16A:
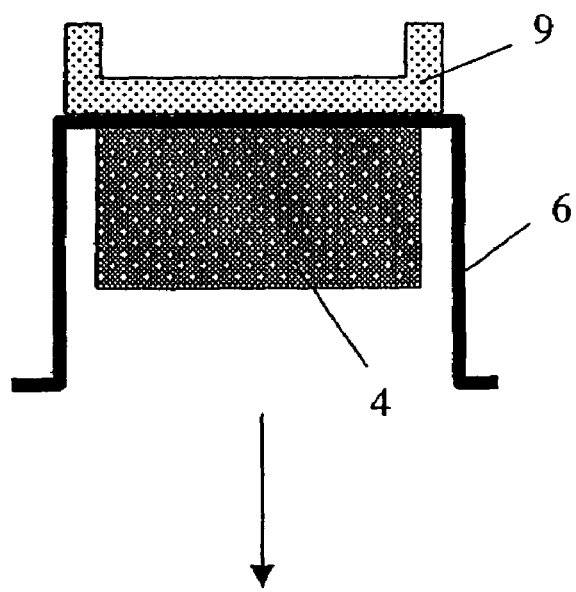
FIGS. 16(a) through 16(c) are cross-sectional views showing respective process steps for fabricating the ultrasonic transducer shown in FIG. 12.
Figure 16B:
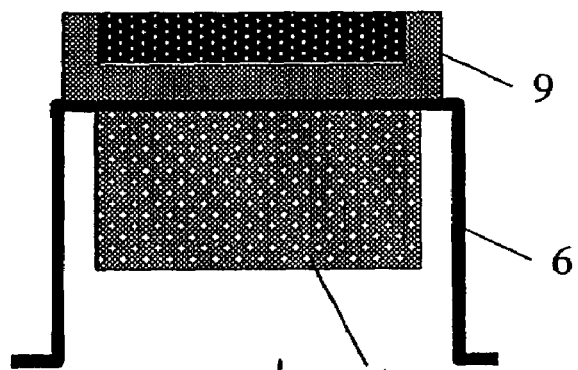
Figure 16C:
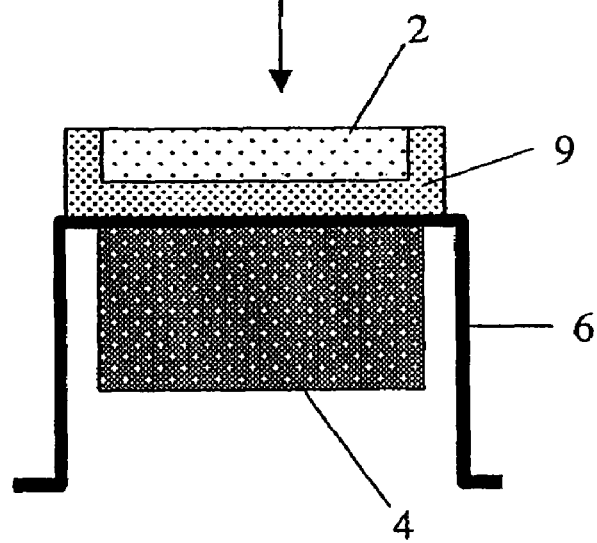

First, as shown in FIG. 16(*a*), a piezoelectric body 4 and a lower acoustic matching layer 9 are bonded onto a structure supporting member 6. The bonding process may be carried out with an adhesive. As described above, the piezoelectric body 4 is made of a piezoceramic and the structure supporting member 6 is made of a stainless steel. The lower acoustic matching layer 9 is made of a porous ceramic with a concave portion defined on the upper surface thereof. This concave portion may be formed by patterning the upper surface of a flat-plate porous ceramic with a lathe, for example.

Next, as shown in FIG. 16(*b*), the concave portion of the acoustic matching layer 9 that has already been bonded to the structure supporting member 6 is filled with a dry gel to be the upper acoustic matching layer. The dry gel may be formed by the method that has already been described for the first preferred embodiment.

To allow a gel material to sufficiently permeate the acoustic matching layer 9 made of the porous ceramic, the gel material poured is preferably placed within a vacuum or a reduced-pressure atmosphere. In this preferred embodiment, the gel material is allowed to permeate not only the portion of the acoustic matching layer 9 to function as the protective portion but also the other internal portions of the acoustic matching layer 9 as well. In this manner, the dry gel can be strongly bonded to the lower acoustic matching layer 9 and the property of the acoustic matching layer 9 can be made sufficiently uniform as shown in FIG. 16(*c*). Hereinafter, this point will be described with reference to FIG. 17.

Figure 17A:
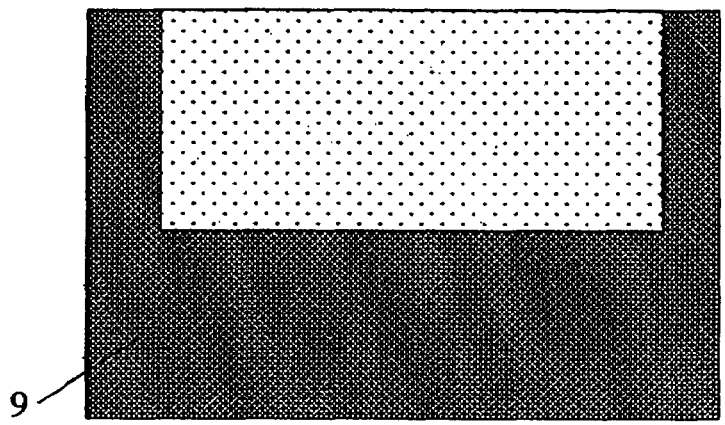
FIG. 17(a) is a cross-sectional view illustrating an acoustic matching layer that a gel permeated sufficiently in the manufacturing and processing step shown in FIG. 16(c).
Figure 17B:
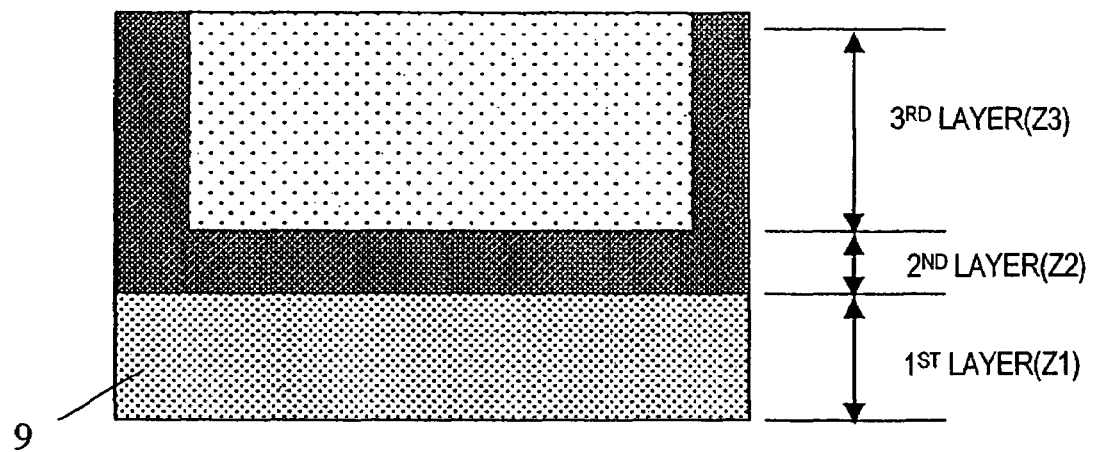
FIG. 17(b) is a cross-sectional view illustrating an acoustic matching layer that a gel permeated insufficiently in the same step.

FIG. 17(*a*) shows a state in which the gel material has sufficiently permeated the lower acoustic matching layer 9. Thus, the lower acoustic matching layer 9 functions as a single layer acoustically. As a result, the acoustic impedance decreases stepwise from the relatively high value of the acoustic matching layer 9 to the relatively low value of the upper acoustic matching layer.

On the other hand, if the gel material has permeated insufficiently, an acoustic matching layer having a substantially three-layered structure is formed as shown in FIG. 17(*b*). In that case, the lowest layer (i.e., the first layer) that has been permeated by the gel material insufficiently will have an acoustic impedance lower than the predetermined value. Thus, the middle layer (i.e., the second layer) will have the highest acoustic impedance. If the acoustic impedance is distributed as shown in FIG. 17(*b*), then the acoustic impedance does not decrease gradually (or stepwise) from the piezoelectric body (not shown), provided under the acoustic matching layer, toward the gas to be the ultrasonic wave propagating medium. Consequently, the performance of the ultrasonic transducer deteriorates unintentionally. For that reason, the gel material is preferably permeated sufficiently.

In the preferred embodiment described above, after the step of securing the lower acoustic matching layer 9 onto the structure supporting member 6 has been carried out, the step of forming the first acoustic matching layer 3 is performed as shown in FIG. 16. Alternatively, these process steps may be carried out in the reverse order. Hereinafter, another manufacturing process will be described with reference to FIGS. 18(*a*) through 18(*d*).

First, as shown in FIG. 18(*a*), an acoustic matching layer 9, including a portion to function as the protective portion, is prepared. Next, as shown in FIG. 18(*b*), a gel material is dripped into the concave portion of the acoustic matching layer 9 and the excessive gel material is shaken off such that the height of the gel material in the concave portion is equalized with that of the protective portion, thereby allowing the gel material to permeate the entire acoustic matching layer 9. Thereafter, the gel material is cured, hydrophobized, and then dried by a supercritical drying technique. In this manner, an acoustic matching layer 3 of a dry gel is formed on the lower acoustic matching layer 9 as shown in FIG. 18(*c*).

Finally, the acoustic matching layer is bonded onto the structure supporting member 6, to which the piezoelectric body 4 has already been secured, as shown in FIG. 18(*d*). Alternatively, the acoustic matching layer shown in FIG. 18(*c*) may be directly bonded onto the piezoelectric body 4 without using any structure supporting member 6.

It should be noted that the best pressing conditions are preferably selected such that the dry gel will not be damaged due to the pressure applied in the bonding process. The dry gel exhibits relatively high strength with respect to a stress applied in the compressing direction. For that reason, the production yield hardly decreases in this bonding process.

The materials of the upper and lower acoustic matching layers 3 and 9 are preferably selected such that the elastic moduli of the acoustic matching layers 3 and 9 will be close to each other. When their elastic moduli are close, uniform pressure can be applied to the entire bonding surface. Consequently, high-sensitivity ultrasonic transducers can be easily produced at a high yield.

According to the method shown in FIGS. 18(*a*) through 18(*d*), there is no need to handle the piezoelectric body or the structure supporting member in the process step of forming a dry gel on the acoustic matching layer 9. Thus, the equipment such as the drier can have a reduced size, and the ultrasonic transducers can be produced at a lower cost.

In the process step of forming the dry gel, a chemical load may be placed on an organic substance such as the adhesive layer. However, if the bonding process step is performed after the dry gel has been formed, then the bonding portion will never deteriorate.

EMBODIMENT 9

Hereinafter, another embodiment of the present invention will be described with reference to FIG. 19.

This preferred embodiment is characterized by providing the protective portions 2 not only around the outer periphery of the area in which the acoustic matching layer 3 is located but also inside of that area.

In making a dry gel layer from a gel material by way of a wet gel, the upper surface of the dry gel layer may sometimes have unevenness. Also, if the wet gel is dried by a normal drying technique, not by the supercritical drying technique, then the resultant dry gel shrinks. As a result, a concave portion such as that shown in FIG. 4 is easily formed on the dry gel.

If the ultrasonic wave transmitting/receiving surface is wide, then the unevenness will grow easily. In that case, even if the thickness of the acoustic matching layer is defined at the best value, the actual thickness of the acoustic matching layer might shift from the best value significantly here and there.

The sonic velocity in the dry gel layer is extremely low. Accordingly, to function as an acoustic matching layer properly, the dry gel layer needs to have a very small thickness with a narrow allowable error range.

Figure 19A:
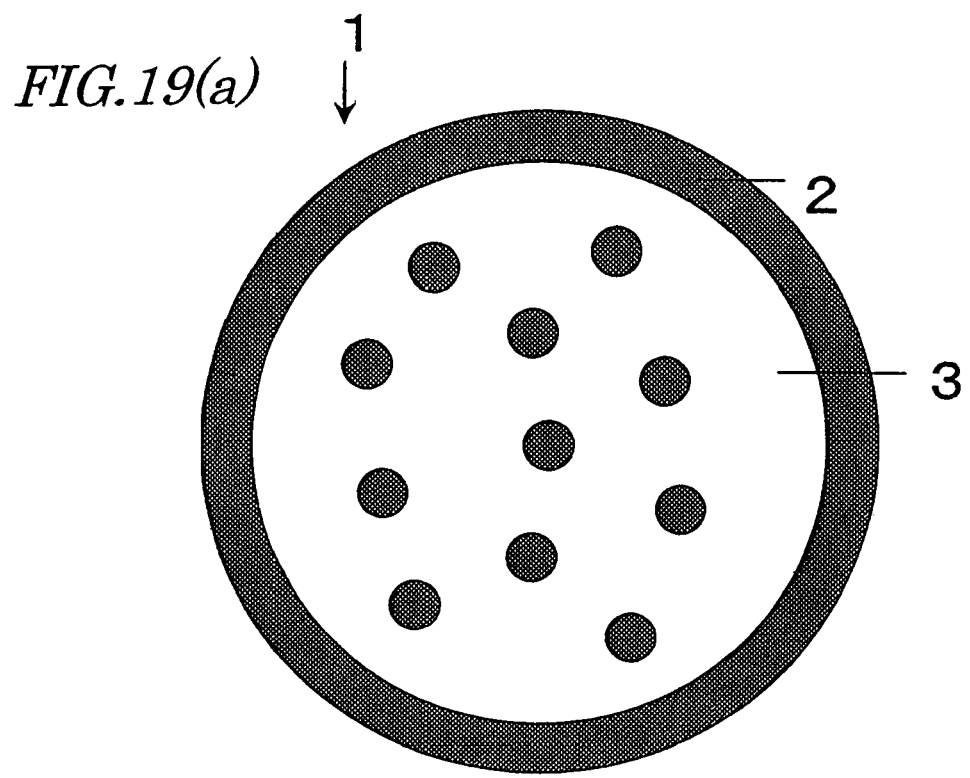
FIGS. 19(*a*) and 19(*b*) are top views showing other configurations for the protective portion.
Figure 19B:
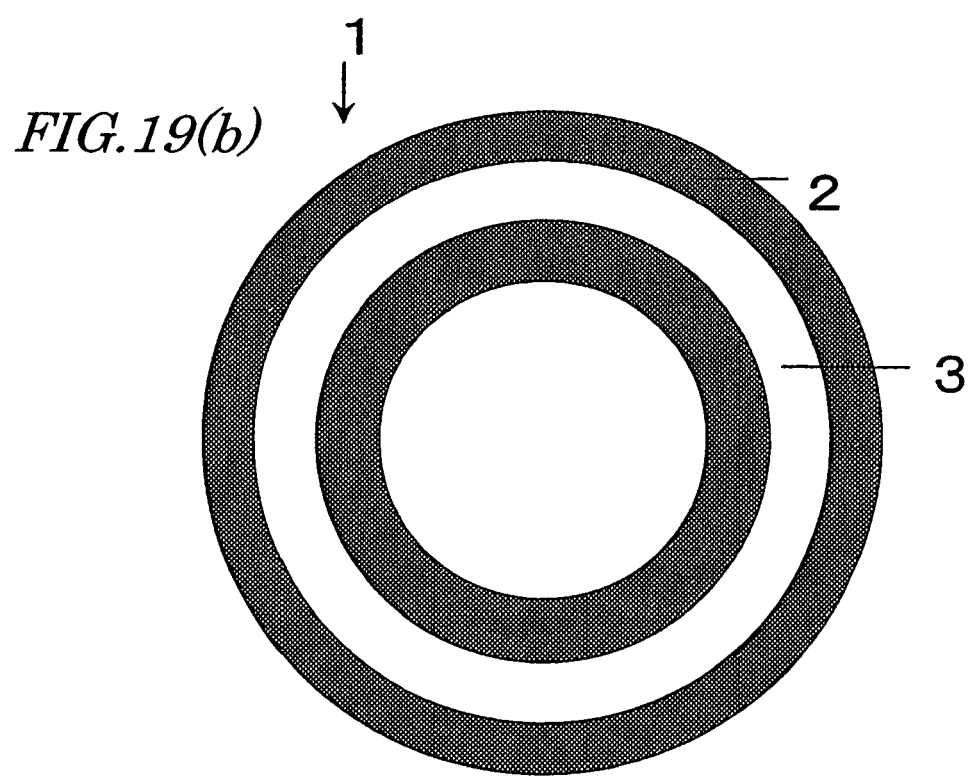

However, if protective portions having a layout such as that shown in FIG. 19(*a*) or 19(*b*) are provided, then the error in the thickness of the acoustic matching layer can be within about ±5% from its target value.

If the additional protective portions 2 are provided inside of the ultrasonic wave radiating surface of the ultrasonic transducer as shown in FIG. 19(*a*) or 19(*b*), then the variation in the thickness of the acoustic matching layer 3 can be minimized. However, those additional protective portions 2, provided inside of the ultrasonic wave radiating surface, may constitute some obstacles to transmitting or receiving an ultrasonic wave. To prevent the acoustic performance from being affected by those additional protective portions 2, the size of the additional protective portions 2 is preferably as small as possible as long as the protective portions 2 can perform their expected function.

In the exemplary arrangement illustrated in FIG. 19(*a*), a number of protective portions 2 with a circular cross section are arranged at random. However, the cross-sectional shape of the protective portions 2 does not have to be circular but may be rectangular or polygonal. Also, their arrangement is not limited to the random arrangement, either.

In the exemplary arrangement illustrated in FIG. 19(*b*), concentric protective portions 2 are provided. In this example, the additional protective portion 2 is also present inside of the ultrasonic wave radiating surface of the ultrasonic transducer but the deterioration in the performance of the ultrasonic transducer can be avoided. The arrangement shown in FIG. 19(*b*) can be used effectively to transmit an ultrasonic wave to a position which is separate from the ultrasonic wave radiating surface by a short distance L along the center axis of the ultrasonic transducer.

The distance r between the protective portion 2 and the center of the ultrasonic wave radiating surface preferably satisfies the following Equation (6):

$$\sqrt{\frac{n^2\lambda^2}{4} + n\lambda L} \le r \le \sqrt{\frac{(n+1)^2\lambda^2}{4} + (n+1)\lambda L} \quad (n = 1, 3, 5, 7 \cdots) \quad (6)$$

where $\lambda$ is the wavelength of the ultrasonic wave in the propagating gas and L is the distance as measured from the ultrasonic wave radiating surface of the ultrasonic transducer. For example, it can be seen that where the frequency is 500 kHz, the ultrasonic wave propagating medium is the air (with a sonic velocity of 340 m/s) and the measuring distance L is 10 mm, the protective portion. 2 is preferably provided so as to have a radius r of 2.6 to 3.7 mm, 4.6 to 5.4 mm or 6.1 to 6.7 mm from the center according to Equation (6). If the protective portions 2 are provided at such locations, the disturbance of the sound field due to the acoustic interference and the decrease in the ultrasonic wave transmission or reception sensitivity at a short distance can be prevented effectively.

Supposing respective points on the acoustic wave radiating surface of the ultrasonic transducer constitute point sound sources, the ultrasonic wave to be transmitted will be obtained by synthesizing together a plurality of spherical waves being radiated from those point sound sources. At some location that is separated from the ultrasonic wave radiating surface by just a short distance, multiple ultrasonic waves with mutually different phases will cancel each other. Accordingly, a high-output ultrasonic wave may not be transmitted to such a location. To get only ultrasonic waves of the same phase radiated from the ultrasonic wave radiating surface, it is effective to provide the protective portions 2 in the areas to which ultrasonic waves with different phases are radiated. When the protective portions 2 are provided in such areas, the radiation of the ultrasonic waves with different phases can be minimized. As a result, the disturbance of the sound field at a short distance can be reduced significantly and even a high-output ultrasonic wave can be transmitted.

EMBODIMENT 10

Figure 20:
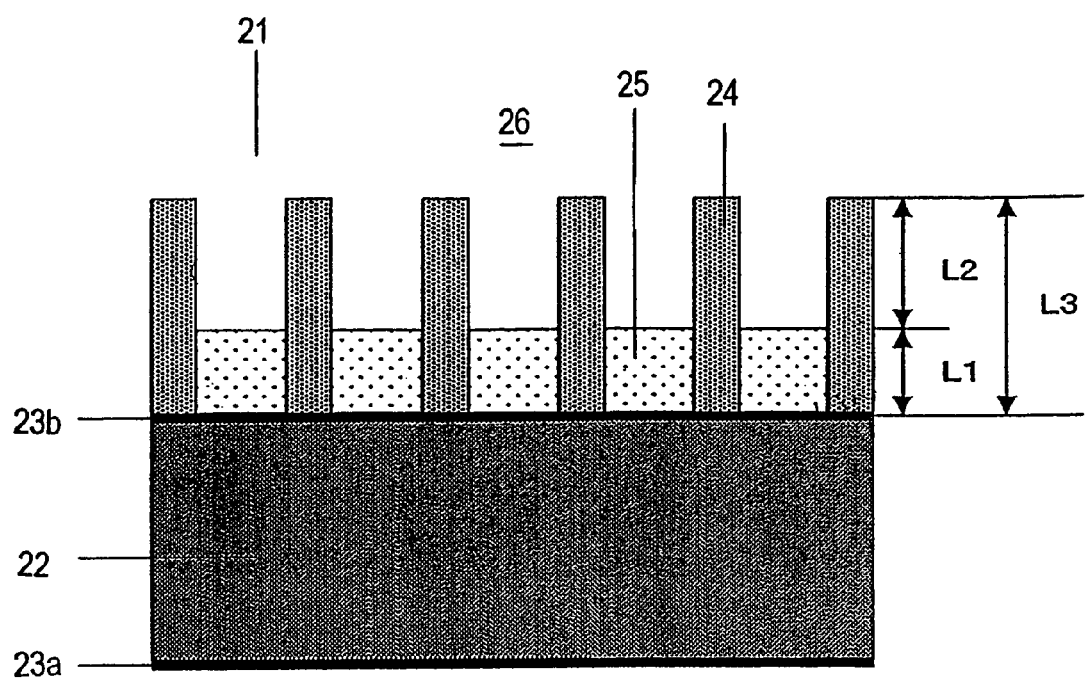
FIG. 20 is a cross-sectional view illustrating an ultrasonic transducer according to a tenth embodiment of the present invention.

FIG. 20 is a cross-sectional view illustrating an ultrasonic transducer according to a tenth embodiment of the present invention. The ultrasonic transducer 21 of this preferred embodiment includes a piezoelectric body 22, electrodes 23*a* and 23*b* provided on the lower and upper surfaces of the piezoelectric body 22, a protective matching layer (first acoustic matching portion) 4 provided on the piezoelectric body 22 with the electrode 23*a* interposed between them, and an acoustic matching layer (second acoustic matching portion) 25 provided on the piezoelectric body 22 with the electrode 23a interposed between them.

Figure 21:
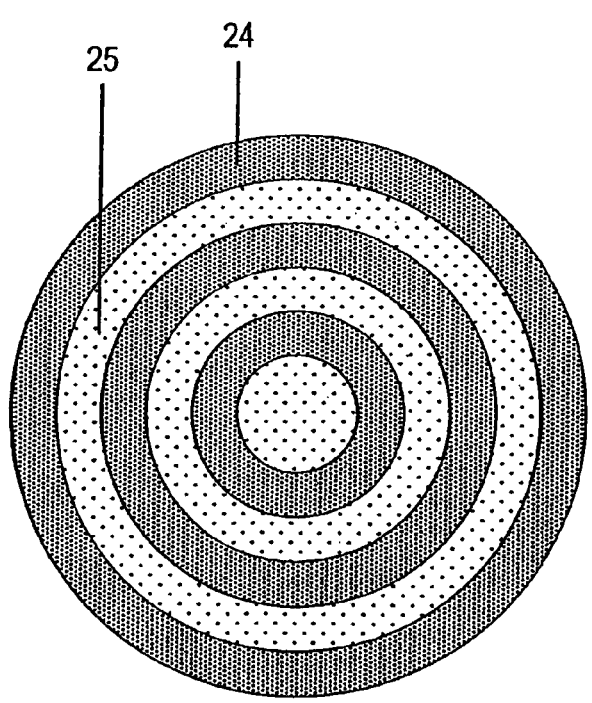
FIG. 21 is a top view of the ultrasonic transducer according to the tenth embodiment of the present invention.

FIG. 21 is a top view of the ultrasonic transducer 21 shown in FIG. 20. As can be seen from FIG. 21, the ultrasonic transducer of this preferred embodiment has a structure in which the protective matching layer 24 and acoustic matching layer 25 with mutually different thicknesses (or heights) are alternately arranged in a concentric pattern.

In this preferred embodiment, the piezoelectric body 22 is made of a material with piezoelectricity and is polarized in the thickness direction. When a voltage is applied to the electrodes 23a and 23b that are provided on the lower and upper surfaces of the piezoelectric body 22, an ultrasonic wave is generated in the piezoelectric body 22 in response to a voltage signal, and then radiated into an ultrasonic wave propagating medium (such as a gas) 26 by way of the protective matching layer 24 and the acoustic matching layer 25. On the other hand, another ultrasonic wave that has been propagated through the ultrasonic wave propagating medium 26 enters the piezoelectric body 22 by way of the protective matching layer 24 and the acoustic matching layer 25. The piezoelectric body 22 is deformed by the incident ultrasonic wave to generate a voltage signal between the electrodes 23a and 23b.

The piezoelectric body 22 may be made of any arbitrary material, which may be selected from various known materials. Optionally, the piezoelectric body. 22 may be replaced with a known electrostrictive material. The electrodes 23a and 23b are preferably made of a metal but may also be made of any other conductive material.

The protective matching layer 24 and the acoustic matching layer 25 perform the functions of propagating the ultrasonic vibrations, generated in the piezoelectric body 22, to the propagating medium 26 efficiently and passing the ultrasonic wave, which has been propagated through the ultrasonic wave propagating medium 26, to the piezoelectric body 22 efficiently.

The acoustic matching layer 25 of this embodiment is preferably made of a dry gel. The dry gel is a porous body obtained by a sol-gel process and is a material that can have very small acoustic impedance, which is defined as the product of density $\rho$ and sonic velocity C (i.e., $\rho \times C$). Thus, by using the acoustic matching layer 25 made of the dry gel, the ultrasonic wave can be transmitted or received through a gas such as the air with very high efficiency.

A dry gel is obtained by preparing a wet gel and then drying the wet gel. The wet gel can be produced by preparing a gel material solution and then subjecting the solution to some reaction. The wet gel has a solid skeleton, which has been solidified as a result of the reaction of the gel material solution and which includes a solvent.

The dry gel, obtained by drying the wet gel, is a porous body and has continuous pores in the gaps between the solid skeletons with sizes of several nm to several μm. The average size of the pores is as small as 1 nm to about several μm.

If the density of the dry gel is decreased by adjusting the manufacturing conditions, the velocity of sound being propagated through the solid portion of the dry gel becomes extremely low. In addition, the velocity of sound being propagated through the gas portion of the porous body also becomes extremely low due to the presence of those micropores. Accordingly, the dry gel in the low density state has as low a sonic velocity as 500 m/s or less, thus achieving extremely low acoustic impedance. Among other things, a dry gel, of which the solid skeleton and micropores have as small sizes as about several nanometers, exhibits a particularly low sonic velocity. Furthermore, the pressure loss of the gas is significant at the nanometer-scale micropores. For that reason, if the acoustic matching layer is made of a dry gel, the porous body can also radiate acoustic waves at a high sound pressure.

According to the manufacturing method to be described later, even when the same material is used, the acoustic impedance of the dry gel can still be controlled at any arbitrary value within a wide range by adjusting the manufacturing process conditions. In addition, by changing the manufacturing process conditions, an acoustic matching layer with substantially the same density but a significantly changed sonic velocity can also be obtained.

A dry gel has these advantageous features but the mechanical strength thereof is low. Thus, it was difficult to increase the production yield sufficiently and the reliability thereof during the actual use was low. However, the production yield and the reliability can be both increased by providing a member that protects the dry gel with such a low mechanical strength as already described for the first through ninth preferred embodiments.

The protective portion in any of the first through ninth preferred embodiments described above can be used very effectively to increase the production yield of the ultrasonic transducers or the reliability thereof during the actual use. In addition, the protective portion can also control the thickness of the acoustic matching layer highly precisely, thus effectively contributing to stabilizing the performance of the ultrasonic transducer. However, if the protective portion is provided on the principal surface from/at which the piezoelectric body radiates or receives the ultrasonic wave, then the protective portion may constitute an acoustic obstacle as described above. The reason is as follows. Specifically, in the first through ninth preferred embodiments described above, the protective portion, made of a different material from the acoustic matching layer, has its thickness substantially equalized with that of the acoustic matching layer. Thus, the sonic velocity differs between the protective portion and the acoustic matching layer, and the protective portion, which is almost as thick as the acoustic matching layer, does not play the role of the acoustic matching layer. For that reason, the protective portion of any of the first through ninth preferred embodiments described above may constitute an obstacle to an ultrasonic wave being transmitted or received, and is preferably provided outside of the principal surface of the piezoelectric body.

However, the protective portion may have to be provided over the piezoelectric body to ensure reliability against more severe environmental conditions or due to the upper limit of the outside diameter of the ultrasonic transducer.

In this preferred embodiment, a protective portion that performs the function of protecting the acoustic matching layer 25 (and that is made of a material with a relatively high density and a higher mechanical strength than the acoustic matching layer 25) is provided on the principal surface of the piezoelectric body but does not affect the performance of the ultrasonic transducer.

In this preferred embodiment, the thickness of the protective portion provided on the principal surface of the piezoelectric body 22 is defined to be about a quarter of the wavelength of the ultrasonic wave to be transmitted or received. Thus, the protective portion with the relatively high mechanical strength also functions as another acoustic matching layer. This is why such a protective portion will be sometimes referred to herein as a "protective matching layer". By adopting such a configuration, a high-sensitivity ultrasonic transducer is achieved because the protective portion, provided to protect the acoustic matching layer, also functions as another acoustic matching layer.

The thickness at which the protective portion functions as the acoustic matching layer most effectively is a quarter of the wavelength of the ultrasonic wave. On the other hand, the sonic velocity in the protective matching layer 24 is different from that in the acoustic matching layer 25. For that reason, the thickness L3 of the protective matching layer 24 and the thickness L1 of the acoustic matching layer 25 are different from each other as shown in FIG. 20 (i.e., L3>L1).

If the thicknesses of the protective matching layer 24 and acoustic matching layer 25 are both defined approximately equal to a quarter of their sonic velocities, then the thickness of the protective matching layer 24 is also different from that of the acoustic matching layer 25. Thus, the ultrasonic wave that has been radiated from the upper surface of the acoustic matching layer 25 and the ultrasonic wave that has been radiated from the upper surface of the protective matching layer 24 may interfere with each other. Accordingly, to achieve a high-sensitivity ultrasonic transducer, it is very important to define an appropriate phase relationship between the ultrasonic waves being radiated from the protective matching layer 24 and acoustic matching layer 25.

Figure 22C:
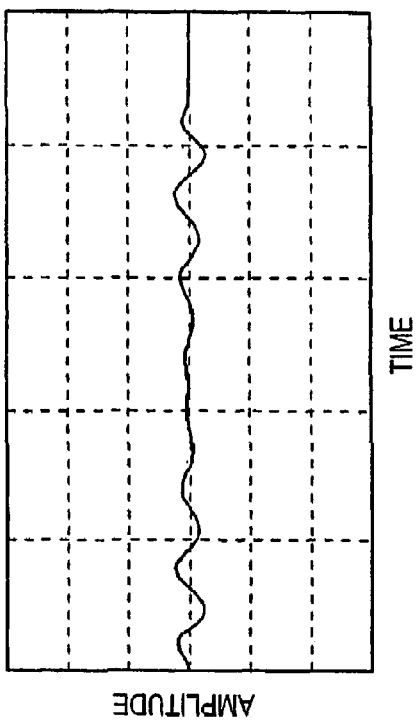
FIG. 22 schematically shows how the ultrasonic wave is interfered with in the ultrasonic transducer according to the tenth embodiment of the present invention.
Figure 22D:
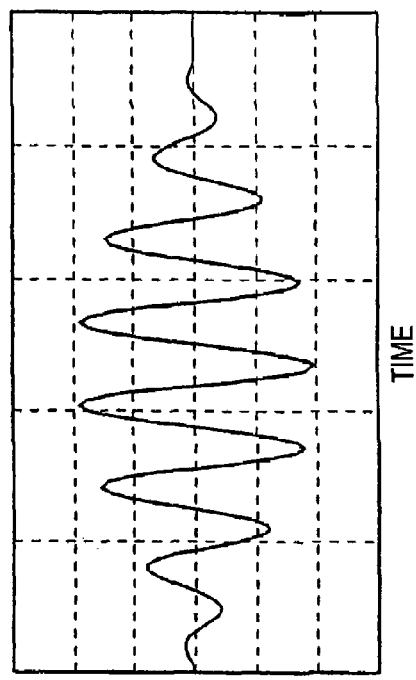
Figure 22A:
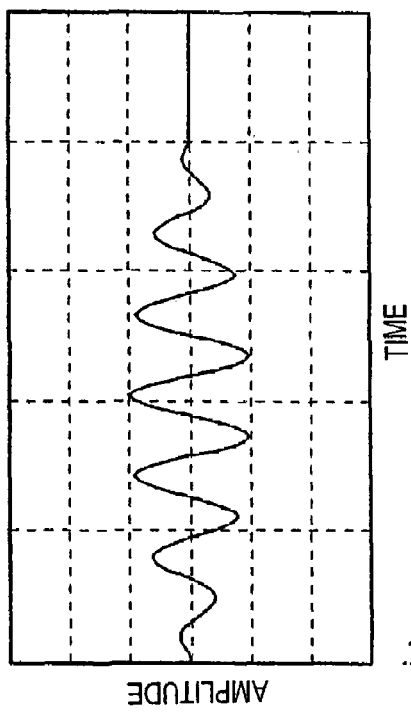
Figure 22B:
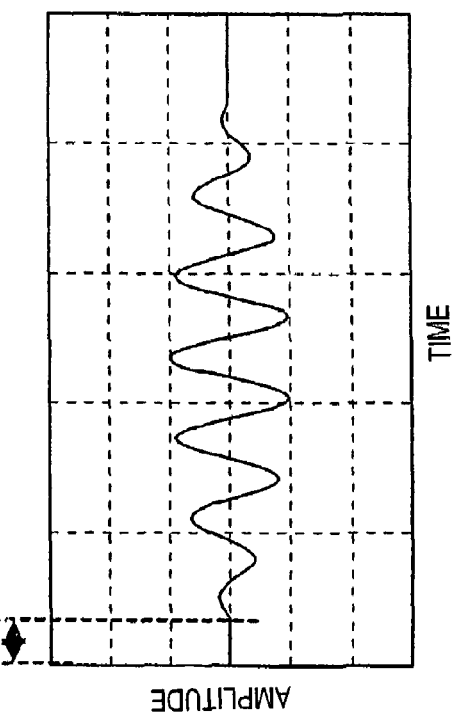

FIG. 22(a) shows the waveform of the ultrasonic wave on the upper surface of the protective matching layer 24, while FIG. 22(b) shows the waveform of the ultrasonic wave as measured over the acoustic matching layer 25 at the same level as the upper surface of the protective matching layer 24. In FIG. 22(b), the reference sign ta denotes the time it takes for the ultrasonic wave to be propagated through the ultrasonic wave propagating medium 26. In each of these graphs, one scale on the axis of abscissas is about 3 μs when the frequency of the ultrasonic wave is 500 kHz.

The ultrasonic wave that has been radiated from the upper surface of the acoustic matching layer 25 passes the ultrasonic wave propagating medium 26 such as a gas to reach the same level as the upper surface of the protective matching layer 24. Accordingly, depending on the sonic velocity in the propagating medium 26 and the size L2 of the propagating medium 26, the phase relationship between the ultrasonic waves as measured over the acoustic matching layer 25 at the same level as the upper surface of the protective matching layer 24 changes.

It should be noted that the signal waveforms shown in FIGS. 22(a) and 22(b) were obtained on the supposition that the ultrasonic waves radiated from the protective matching layer 24 and acoustic matching layer 25 had the same wavelength and amplitude.

If the thickness L3 of the protective matching layer 24 and the thickness L1 of the acoustic matching layer 25 are each equal to a quarter of the wavelength of the ultrasonic wave being propagated through that layer, then the time it takes for the ultrasonic wave to be propagated between the lower and upper surfaces of the protective matching layer 24 should be equal to the time it takes for the ultrasonic wave to be propagated between the lower and upper surfaces of the acoustic matching layer 25. Accordingly, the phase of the ultrasonic wave that has been radiated from the upper surface of the acoustic matching layer 25 and then has reached the same level as the upper surface of the protective matching layer 24 should be delayed behind that of the ultrasonic wave that has been propagated through the protective matching layer 24 and has reached the upper surface of the protective matching layer 24. This phase lag corresponds to the time it takes for the ultrasonic wave, radiated from the upper surface of the acoustic matching layer 25, to be propagated through the propagating medium 26 over the distance L2.

If the frequency of the ultrasonic wave to be transmitted or received is represented by f [seconds$^{-1}$], then the time it takes for the ultrasonic wave to go a distance that is equal to one wavelength of the ultrasonic wave will be 1/f second. The time t3 it takes for the ultrasonic wave to pass through the protective matching layer 24 of this preferred embodiment is ¼f second. In the same way, the time t2 it takes for the ultrasonic wave to pass through the acoustic matching layer 25 of this preferred embodiment is also ¼f second. In this case, supposing the time it takes for the ultrasonic wave to go the distance L2 through the propagating medium 26 is also t2 (=ta), it depends on the time t2 whether or not interference occurs between the ultrasonic wave that has been radiated from the upper surface of the protective matching layer 24 and the ultrasonic wave that has been radiated from the upper surface of the acoustic matching layer 25. The waveform and sensitivity of the ultrasonic wave change due to this interference.

FIG. 22(c) shows the waveform of an ultrasonic wave to be observed where the time t2 is ½f second. FIG. 22(d) shows the waveform of an ultrasonic wave to be observed where the time t2 is 1/f second. As can be seen from FIGS. 22(c) and 22(d), the sensitivity of the ultrasonic wave observed differs significantly depending on the amount of the time t2. Specifically, if the time t2 is equal to ½f second, then the phase shift is equal to a half wavelength of the ultrasonic wave and the ultrasonic wave observed has a low sensitivity. On the other hand, if the time t2 is equal to 1/f second, then the phase shift is an integral number of times as long as the wavelength of the ultrasonic vibrator and the ultrasonic wave observed has a high sensitivity. And if the time t2 is in the range between ½f second and 1/f second, the closer to 1/f second the time t2 becomes, the higher the ultrasonic wave transmission or reception sensitivity will be.

If the thicknesses of the acoustic matching layer 25 and protective matching layer 24 are adjusted such that when the ultrasonic wave, radiated from the acoustic matching layer 25 reaches the same level as the upper surface of the protective matching layer 24 after having been propagated through the propagating medium 26, the phase of that ultrasonic wave substantially matches the phase of the ultrasonic wave that has been propagated through the protective matching layer 24, then a high-sensitivity ultrasonic transducer can be provided. As used herein, the phrase "phases substantially match" means that the phase difference between two ultrasonic waves is at most equal to a quarter of the wavelength of the ultrasonic waves. The phase difference is preferably as small as possible.

Figure 23:
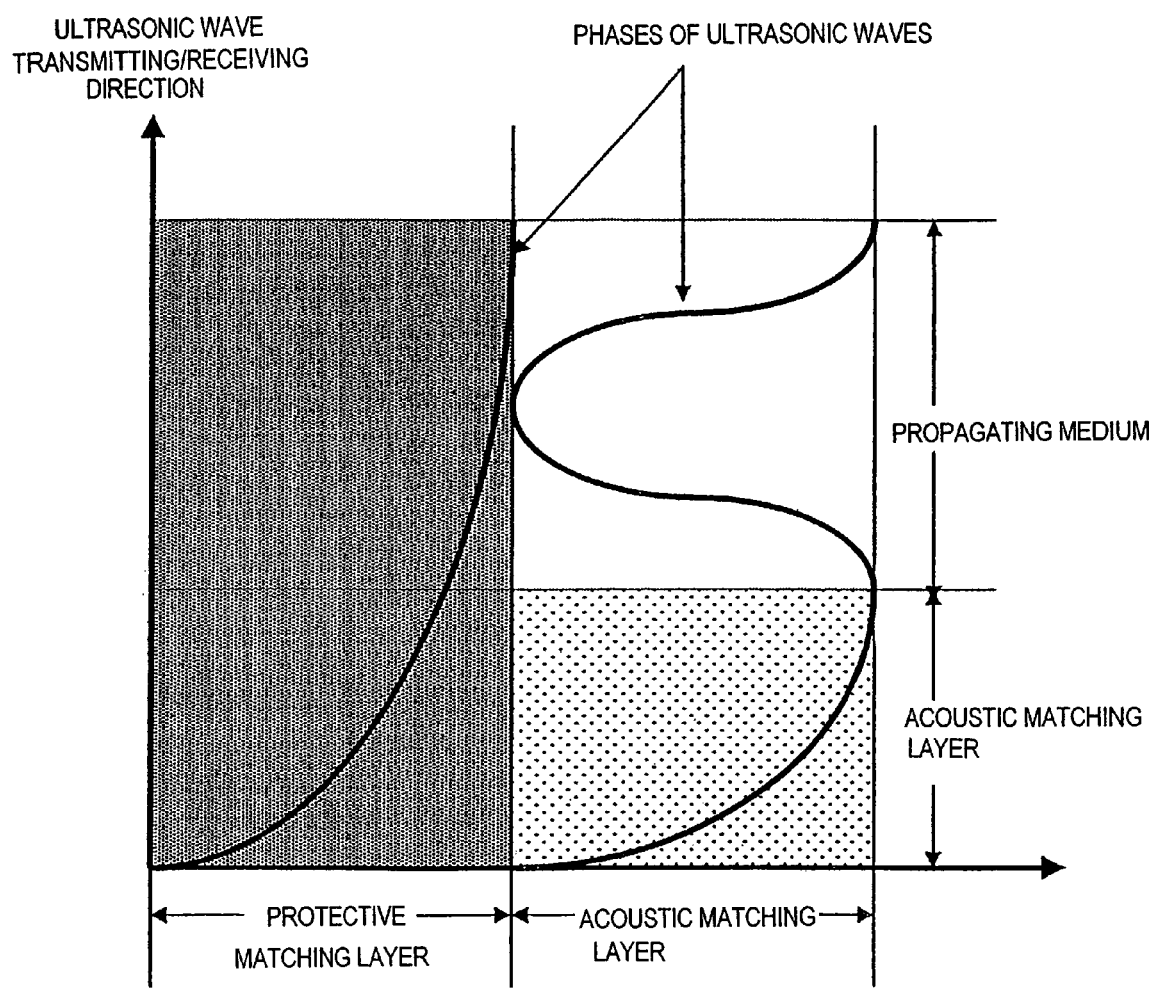
FIG. 23 is a cross-sectional view schematically showing the phase of an ultrasonic wave being propagated through a protective matching layer and an acoustic matching layer.

FIG. 23 is a cross-sectional view schematically showing the phases of ultrasonic waves in a situation where the time t2 is 1/f second. In FIG. 23, the phase of the ultrasonic wave on the upper surface of the protective matching layer 24 matches to the phase of the ultrasonic wave as measured over the acoustic matching layer 25 at the same level as the upper surface of the protective matching layer. When the phases match in this manner, the ultrasonic wave transmission or reception sensitivity is maximized. Also, even if the phases do not match completely in this manner but shift from each other just slightly, the ultrasonic wave transmission or reception sensitivity still would be sufficiently higher than the conventional one. The phase shift is preferably adjusted to at most a quarter of the wavelength of the ultrasonic wave being propagated through the ultrasonic wave propagating medium and is more preferably adjusted to one eighth or less of the wavelength of the ultrasonic wave.

If the thickness L1 of the acoustic matching layer 25 and the thickness L3 of the protective matching layer 24 are just controlled to about a quarter of the wavelength of the ultrasonic wave in the acoustic matching layer 25 and to about a quarter of the wavelength of the ultrasonic wave in the protective matching layer 24, respectively, then L2 will be automatically defined as (L3−L1). In that case, t2 cannot be changed arbitrarily. Accordingly, to define the time t2 at a desired value, not only the thicknesses of the acoustic matching layer 25 and protective matching layer 24 but also the sonic velocities in the acoustic matching layer 25 and protective matching layer 24 need to be controlled appropriately. In a preferred embodiment of the present invention, the acoustic matching layer 25 is made of a dry gel of which the sonic velocity is easily controllable.

Hereinafter, an embodiment of a method for fabricating the ultrasonic transducer 21 of this preferred embodiment will be described with reference to FIGS. 24(a) through 24(c). In this preferred embodiment, the ultrasonic wave propagating medium 26 is supposed to be the air with a density of 1.18 kg/m$^3$, a sonic velocity of about 340 m/s and an acoustic impedance of about $4.0 \times 10^2$ kg/m$^2$/s.

Figure 24A:
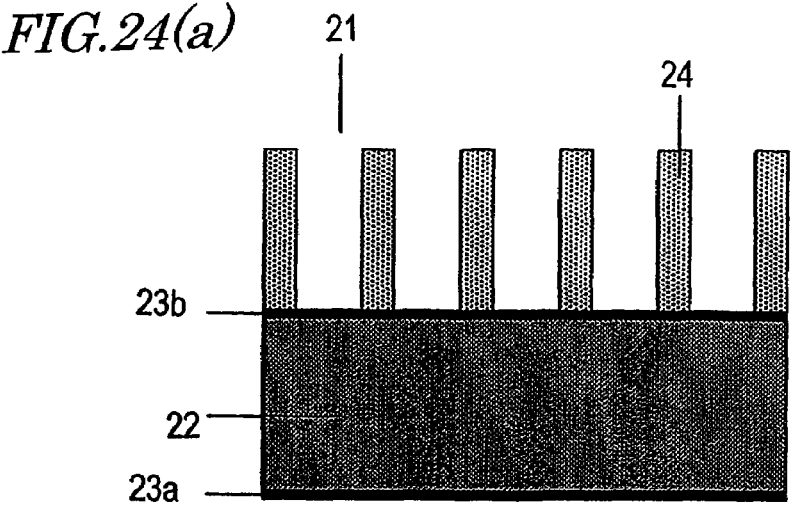
FIGS. 24(*a*) through 24(*c*) are cross-sectional views showing respective process steps for fabricating the ultrasonic transducer according to the tenth embodiment of the present invention.

First, as shown in FIG. 24(a), a piezoelectric body 22 is prepared according to the wavelength of the ultrasonic wave to be transmitted or received. At this point in time, the piezoelectric body 22 does not yet have the protective matching layer 24 shown in FIG. 24(a). The piezoelectric body 22 is preferably made of a material with high piezoelectricity such as a piezoceramic or a piezoelectric single crystalline material. Examples of preferred piezoceramics include lead zirconate titanate, barium titanate, lead titanate and lead niobate. Examples of preferred piezoelectric single crystalline materials include single crystals of lead zirconate titanate, lithium niobate and quartz.

In this embodiment, the piezoelectric body 22 is made of lead zirconate titanate as a piezoceramic and the frequency of the ultrasonic wave to be transmitted or received is defined at 500 kHz. The piezoelectric body 22 is designed to have a resonant frequency of 500 kHz so as to transmit or receive such an ultrasonic wave efficiently. For that purpose, in this embodiment, a cylindrical piezoceramic with a diameter of 12 mm and a thickness of about 3.8 mm is used as the piezoelectric body 22. Electrodes 23a and 23b are provided on the lower and upper surfaces of the piezoelectric body 22 by baking silver thereon and the piezoelectric body 22 is subjected to a polarization process in this direction.

Next, three ring members, functioning as the protective matching layer 24, are prepared and bonded onto the principal surface of the piezoelectric body 22 as shown in FIG. 24(a). In this process step, these ring members are arranged so as to have their centers aligned with that of the piezoelectric body 22 as shown in FIG. 21. Specifically, the three ring members functioning as the protective matching layer 24 are a first ring member with an outside diameter of 12 mm, an inside diameter of 11 mm and a thickness of 1.0 mm, a second ring member with an outside diameter of 8 mm, an inside diameter of 7 mm and a thickness of 1.0 mm, and a third ring member with an outside diameter of 4 mm, an inside diameter of 3 mm and a thickness of 1.0 mm.

The protective matching layer 24 of this preferred embodiment needs to exhibit not only a mechanical strength that is high enough to protect the acoustic matching layer but also an acoustic impedance that is low enough to function as another acoustic matching layer. In this embodiment, a porous ceramic is used as a material with such properties. This porous ceramic has an apparent density of $0.64 \times 10^3$ kg/m$^3$, a sonic velocity of 2,000 m/s and an acoustic impedance of about $1.28 \times 10^6$ kg/m$^2$/s. A barium titanate based material is used as the ceramic. The "apparent density" is calculated with respect to the entire porous body including the void portion thereof. About 80 vol % of the porous ceramic is the void portion and the substantive portion of the ceramic is just about 20 vol % thereof.

As described above, the protective matching layer 24 has a sonic velocity of about 2,000 m/s. Accordingly, the thickness corresponding to a quarter of the wavelength at 500 kHz is 1.0 mm. For that reason, the ring members, functioning as the protective matching layer 24, have a thickness of 1.0 mm in this preferred embodiment.

The porous ceramic for use in this preferred embodiment may be prepared in the following manner.

First, tiny balls of a resin and a ceramic powder are mixed, pressed and compacted. Thereafter, the ceramic is sintered. In this sintering process step, the resin balls are heated and burned away. If the resin balls were heated too rapidly during the sintering process, then the resin balls might expand or gasify so quickly as to destroy the ceramic structure. For that reason, the sintering process is preferably carried out by heating the resin balls gently.

In this preferred embodiment, the protective matching layer 24, made of such a porous ceramic, and the piezoelectric body 22 are bonded together with an adhesive. For example, an epoxy resin may be used as the adhesive. If the assembly is left in an isothermal vessel at 150° C. for approximately two hours with a pressure of about 0.1 MPa applied thereto, then the adhesive is cured, thereby bonding the protective matching layer 24 and piezoelectric body 22 together.

Figure 24B:
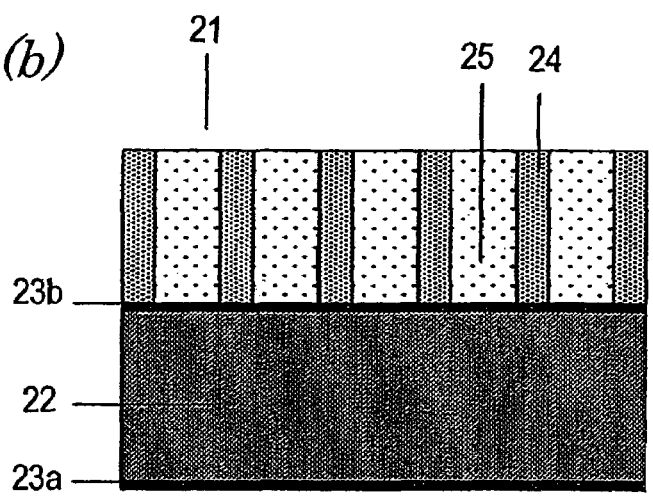

Next, an acoustic matching layer 25 is provided on the thus-obtained assembly including the piezoelectric body 22 and the protective matching layer 24 as shown in FIG. 24(b). In this preferred embodiment, the acoustic matching layer 25 is made of a dry gel.

Figure 24C:
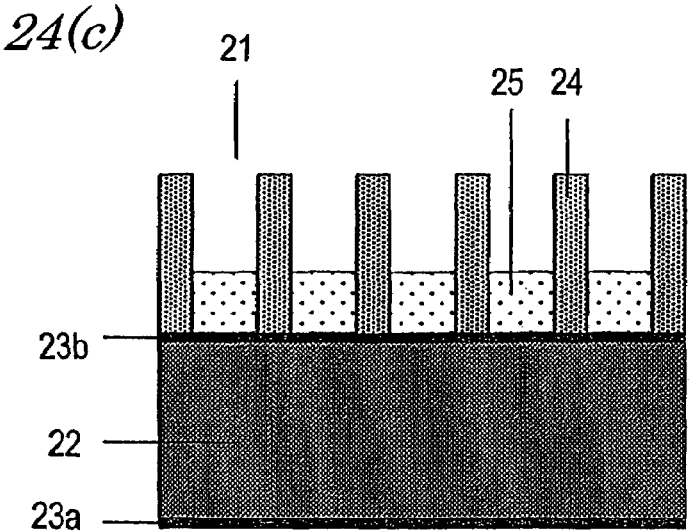

In this preferred embodiment, first, the acoustic matching layer 25 is deposited to the thickness shown in FIG. 24(b), and then has its thickness reduced as shown in FIG. 24(c). In this process step, the thicknesses L3 and L1 of the protective matching layer 24 and acoustic matching layer 25 are defined such that the distance L2 (=L3−L1) shown in FIG. 20 is equal to one wavelength of the ultrasonic wave in the air. Specifically, in this case, since the ultrasonic wave to be transmitted or received has a frequency of 500 kHz, one wavelength of this ultrasonic wave in the air is 0.62 mm. On the other hand, the thickness L3 of the protective matching layer 24 is 1.0 mm. Thus, the thickness L1 of the acoustic matching layer 25 should be 0.32 mm (=1.0 mm−0.62 mm). Also, to make the acoustic matching layer 25 function as an acoustic matching layer properly, it is most preferable that this thickness L1 (=0.32 mm) is equal to a quarter of the wavelength of the ultrasonic wave being propagated through the acoustic matching layer 25. Accordingly, the material used needs to have such a sonic velocity as to make 0.32 mm equal to a quarter of the wavelength of the ultrasonic wave to be transmitted or received. According to the calculations, the acoustic matching layer 25 with the thickness of 0.32 mm should be made of a dry gel with a sonic velocity of 640 m/s.

It should be noted that the thickness of the protective matching layer 24 is preferably equal to a quarter of the wavelength of the ultrasonic wave being propagated through the protective matching layer 24 but is not limited to that value. Alternatively, the thickness of the protective matching layer 24 may fall within the range of one eighth to one third of the wavelength of the ultrasonic wave and more preferably falls within the range of one sixth to a quarter of the wavelength of the ultrasonic wave. If the wavelength of the ultrasonic wave has a distribution, then the thickness is preferably determined with respect to the peak wavelength thereof. Thus, in a situation where the wavelength has a distribution, the "a quarter of the wavelength" means herein "a quarter of the peak wavelength".

If the acoustic matching layer 25 consists of just one layer, the thickness of the acoustic matching layer 25 is also preferably equal to a quarter of the wavelength of the ultrasonic wave being propagated through the acoustic matching layer 25 but is not limited to that value. Alternatively, the thickness of the acoustic matching layer 25 may fall within the range of one eighth to one third of the wavelength of the ultrasonic wave and more preferably falls within the range of one sixth to a quarter of the wavelength of the ultrasonic wave. On the other hand, if the acoustic matching layer has a multilayer structure, each of its constituent layers preferably has the thickness described above. An ultrasonic transducer, including such an acoustic matching layer with a multilayer structure, will be described later as a second embodiment of the present invention.

The dry gel that makes the acoustic matching layer 25 may be made of any of various materials including inorganic materials and organic polymer materials. The inorganic solid skeleton may be made of silicon dioxide (silica), aluminum oxide (alumina) or titanium oxide, for example. Also, the organic solid skeleton may be made of a normal thermosetting resin or thermoplastic resin such as polyurethane, polyurea and phenol resins, polyacrylamide and polymethyl methacrylate.

In this preferred embodiment, a dry gel including silicon dioxide (silica) as its solid skeleton is adopted as a material for the acoustic matching layer 25 in view of its cost, environmental stability and productivity and the stabilized temperature characteristic of the ultrasonic transducer.

The sonic velocity of 640 m/s is relatively high as a sonic velocity of a dry gel. For that reason, in this preferred embodiment, a dry gel layer is formed as the acoustic matching layer 25 by a method in which a gelling process step (which will be referred to herein as a "first gelling process step") is followed by a second gelling process step, not by the conventional manufacturing process in which the first gelling process step is followed by a drying process step.

If only the first gelling process step was performed without performing the second gelling process step, then it would be difficult to obtain a dry gel exhibiting a relatively high sonic velocity. It should be noted that the density of a dry gel increases substantially proportionally to the sonic velocity thereof. Thus, a "high sonic velocity" means a "high density". If the concentration of a gel material in a gel material solution is increased to raise the sonic velocity of the resultant gel, then the gelling reaction would not advance uniformly and a wet gel with a random sonic velocity distribution is obtained. In that case, a dry gel to be obtained by drying such a wet gel will also have a random density distribution. This is why if the concentration of a gel material in a gel material solution is increased, then it becomes very difficult to achieve a uniform sonic velocity.

In this preferred embodiment, in order not to make the resultant gel non-uniform, the dry gel to be obtained by the first gelling process step has its sonic velocity adjusted to about 200 m/s or less, and then has its density further raised and its sonic velocity increased uniformly through the second gelling process step. In the second gelling process step, the wet gel, obtained by the first gelling process step, is immersed in a gel material solution (i.e., second gelling material solution) again. Also, in the second gelling process step, the concentration of ammonia, which is the catalyst in the second gelling material solution, is adjusted to a low value. Accordingly, no gelling reaction occurs outside of the wet gel that has been obtained by the first gelling process step. Inside of the wet gel that has been obtained by the first gelling process step, however, the gel grows such that the second gelling material solution is deposited on the skeleton defined by the first gelling process step. Thus, this reaction advances even under a condition that the gel material solution itself is not gelled. In this manner, the sonic velocity and density of the gel can be changed.

Specifically, the acoustic matching layer 25 of a dry gel is defined by performing the following process steps:

Process Step No. 1

Preparing First Gelling Gel Material Solution

Tetraethoxysilane, ethanol, water and hydrogen chloride are mixed together at a mole ratio of 1 to 2 to 1 to 0.00078, and then tetraethoxysilane is subjected to a hydrolysis reaction in an isothermal vessel at 65 degrees for three hours. Water and $NH_3$ are further added thereto at a mole ratio of 2.5 to 0.0057 (with respect to tetraethoxysilane), thereby preparing a gel material solution;

Process Step No. 2: First Gelling Process Step

The gel material solution prepared in this manner (i.e., the first gelling material solution) is dripped into the space that has been defined by the piezoelectric body 22 and the protective matching layer 24. In this process step, the outer surface of the outermost portion of the protective matching layer 24 is wrapped with a Teflon™ sheet, thereby forming a frame that prevents the gel material solution from overflowing.

Next, the sample into which the gel material solution has been dripped is left in an isothermal vessel at 50° C. for approximately one day while maintaining its equilibrium horizontally. In this manner, the gel material solution, which was supplied into the space defined by the piezoelectric body 22 and the protective matching layer 24, is gelled, thereby producing a wet gel.

Process Step No. 3: Second Gelling Process Step

Adjusting Sonic Velocity and Density

If the acoustic matching layer obtained by the first gelling process step is directly subjected to a drying process step, then the density thereof will be about $2.0 \times 10^2$ $kg/m^3$ and the sonic velocity thereof will be about 200 m/s. In this preferred embodiment, the second gelling process step is carried out for the purpose of further increasing the sonic velocity and density.

Specifically, first, the wet gel obtained by the first gelling process step is washed with ethanol, thereby preparing a second gelling material solution. As the second gelling material solution, a mixture in which tetraethoxysilane, ethanol and ammonia water (with a normality of 0.1) are mixed together at a volume ratio of 60 to 35 to 5, is used.

The assembly including the piezoelectric body 22, wet gel and protective matching layer 24, obtained by the first gelling process step, is immersed in the second gelling material solution in a sealed container and left in an isothermal vessel at 70° C. for approximately 48 hours. As a result of this second gelling process step, the gel skeleton that was obtained by the first gelling process step grows and the density and sonic velocity thereof both increase.

Process Step No. 4: Hydrophobizing Process Step

The hydrophobizing process step is not always required but is preferably carried out because the performance is sometimes affected by moisture absorbed. The hydrophobizing process step may be carried out in the following manner. Specifically, after the second gelling process step has been carried out, the second gelling material solution, remaining in the wet gel, is replaced and washed with ethanol. Thereafter, the assembly is immersed in a hydrophobizing solution, obtained by mixing together dimethyldimethoxysilane, ethanol and 10 wt % of ammonia water at a weight ratio of 45 to 45 to 10, at 40° C. for approximately one day.

Process Step No. 5: Drying Process Step

To produce a dry gel from the wet gel obtained by these process steps, a drying process step is carried out. In this preferred embodiment, the supercritical drying technique is adopted as a drying method. As described above, the dry gel is a very small (e.g., nanometer scale) porous body. Thus, depending on the thickness of the skeleton, the bond strength, and the size of the pores, the dry gel may be broken due to the surface tension of the solvent while the solvent is being dried to turn the wet gel into the dry gel.

For that reason, the supercritical drying technique, which has nothing to do with the surface tension, can be used effectively. More specifically, after the hydrophobizing solution has been replaced with ethanol, the assembly including the piezoelectric body 22, wet gel, protective matching layer and acoustic matching layer 25, obtained by the process steps described above, is introduced into a pressure container, thereby replacing ethanol in the wet gel with liquefied carbon dioxide.

The liquefied carbon dioxide is further pumped into the container such that the pressure inside of the container is raised to 10 MPa. Thereafter, the temperature is increased to 50° C. to create a supercritical state in the container. Next, the pressure is gradually decreased with the temperature kept at 50° C., thereby completing the drying process.

Process Step No. 6: Thickness Adjusting Process Step

The dry gel layer obtained in this manner was ground with a lathe such that only a portion of the acoustic matching layer 25 was removed to a thickness of 0.32 mm.

The dry gel, which defines the acoustic matching layer 25 obtained in this manner, has a density of about $0.6 \times 10^3$ kg/m$^3$ and a sonic velocity of about 640 m/s. Also, a portion of the protective matching layer 24 is permeated with the dry gel to be the acoustic matching layer 25, which does not affect the sonic velocity of the protective matching layer 24.

Before the process step of making the acoustic matching layer of the dry gel, the surface of the electrode 23b is preferably treated such that the acoustic matching layer 25 can make good contact with the electrode 23b. If the degree of contact between the electrode 23b and the acoustic matching layer 25 can be increased by the surface treatment, then the reliability further increases. As such a surface treatment, a plasma process, which adds a hydroxide group to the electrode on the surface of the piezoelectric body that makes a chemical bond easily with the dry gel, may be adopted, for example. Alternatively, it is also effective to cause anchoring effects by creating physical unevenness on the surface of the electrode 23b. Specifically, a chemical and/or physical etching process is preferably adopted for that purpose.

In this preferred embodiment, after the gel to be the acoustic matching layer 25 has been formed, the gel is ground with a lathe, thereby adjusting the thickness of the dry gel. The thickness may also be controlled by adjusting the amount (i.e., height) of the first gelling material solution to be dripped in the first gelling process step. In that case, 33.9 μL of gel material solution is measured exactly with a micropipet such that the resultant acoustic matching layer has a thickness of about 0.32 mm and then dripped onto the piezoelectric body 22. The protective matching layer 24 is a porous body with 80% of void portion. Thus, the amount to be dripped needs to be calculated with the volume to be absorbed into the porous body taken into account.

Figure 25:
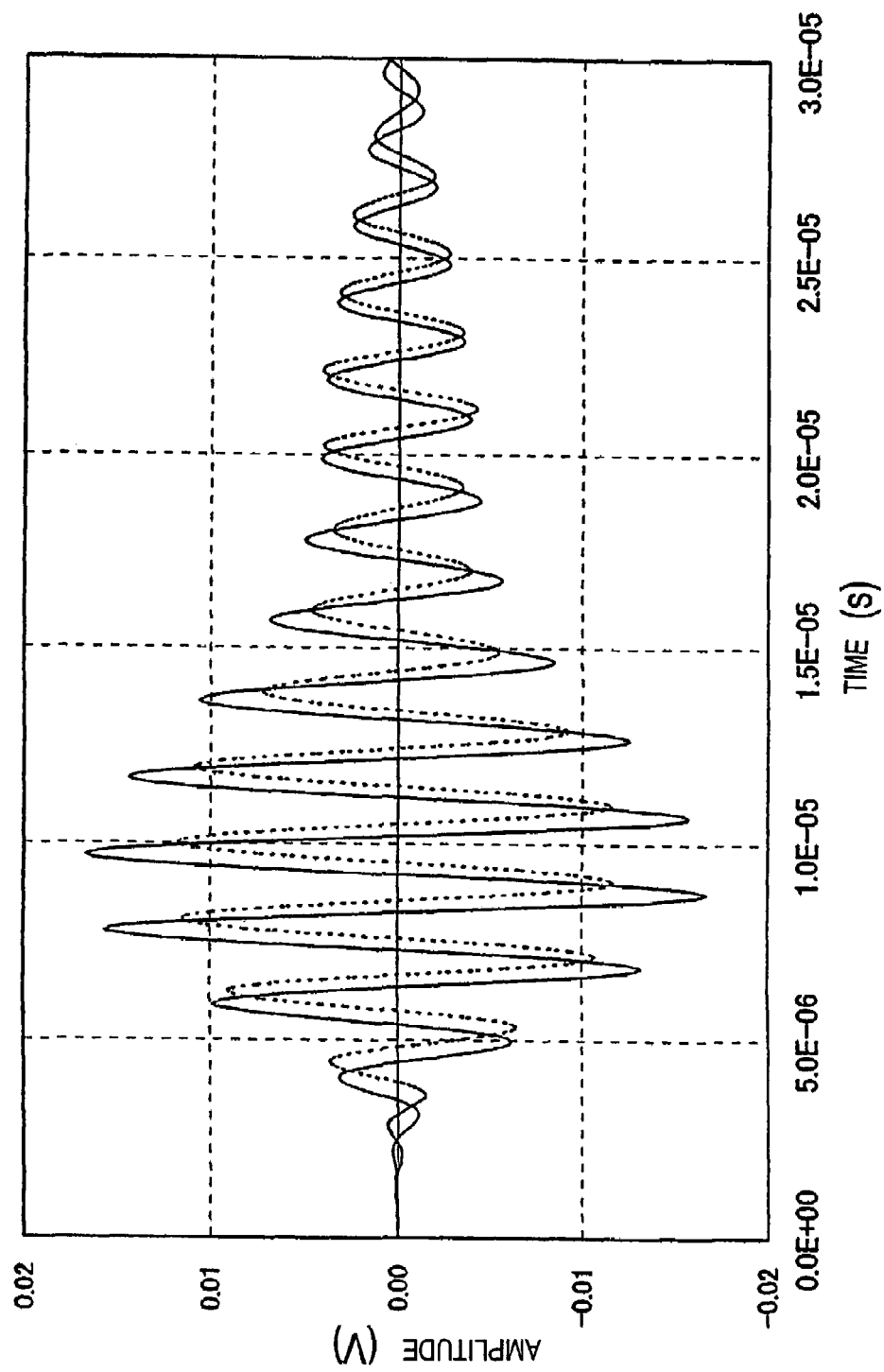
FIG. 25 is a graph showing a waveform to be transmitted from, or received at, the ultrasonic transducer according to the tenth embodiment of the present invention.

FIG. 25 shows the waveform of an ultrasonic wave to be transmitted from, or received at, the ultrasonic transducer obtained in this manner. In FIG. 25, the waveform of the ultrasonic wave transmitted or received in this preferred embodiment is represented by the solid curve, while the waveform of an ultrasonic wave to be transmitted from, or received at, a comparative ultrasonic transducer, of which the protective portion and acoustic matching layer 25 have the same thickness, is represented by the dotted curve. As can be seen from FIG. 25, the signal amplitude is increased by this preferred embodiment. Accordingly, a high sensitivity is achieved by using the structure of the present invention.

In the preferred embodiment described above, to match the phases of ultrasonic waves at the same level as the upper surface of the protective matching layer 24, the phase of the ultrasonic wave that has been propagated through the acoustic matching layer 25 and propagating medium 26 is delayed just by one wavelength from that of the ultrasonic wave that has been propagated through the protective matching layer 24. However, if the protective matching layer 24 is made of a material with an even higher sonic velocity or has a greater thickness L3, then the phase delay to be caused by the propagating medium 26 may be two wavelengths or more of the ultrasonic wave.

EMBODIMENT 11

Hereinafter, an ultrasonic transducer according to an eleventh embodiment of the present invention will be described with reference to FIG. 26. The main feature of this preferred embodiment is that the acoustic matching layer has a multilayer structure including a first acoustic matching layer 25a as a lower layer and a second acoustic matching layer 25b as an upper layer.

Even when the acoustic matching layer 25 has such a two-layer structure, the thickness of each of the two acoustic matching layers 25a and 25b is preferably approximately equal to a quarter of the wavelength of the ultrasonic wave being propagated through that layer.

As in the tenth embodiment described above, to match the phases of ultrasonic waves at the same level as the upper surface of the protective matching layer 24, the phase of the ultrasonic wave that has been propagated through the acoustic matching layer 25 and propagating medium 26 is also delayed in this preferred embodiment from that of the ultrasonic wave that has been propagated through the protective matching layer 24. The phase delay to be caused is approximately an integral number of times as long as the wavelength of the ultrasonic wave.

Figure 26:
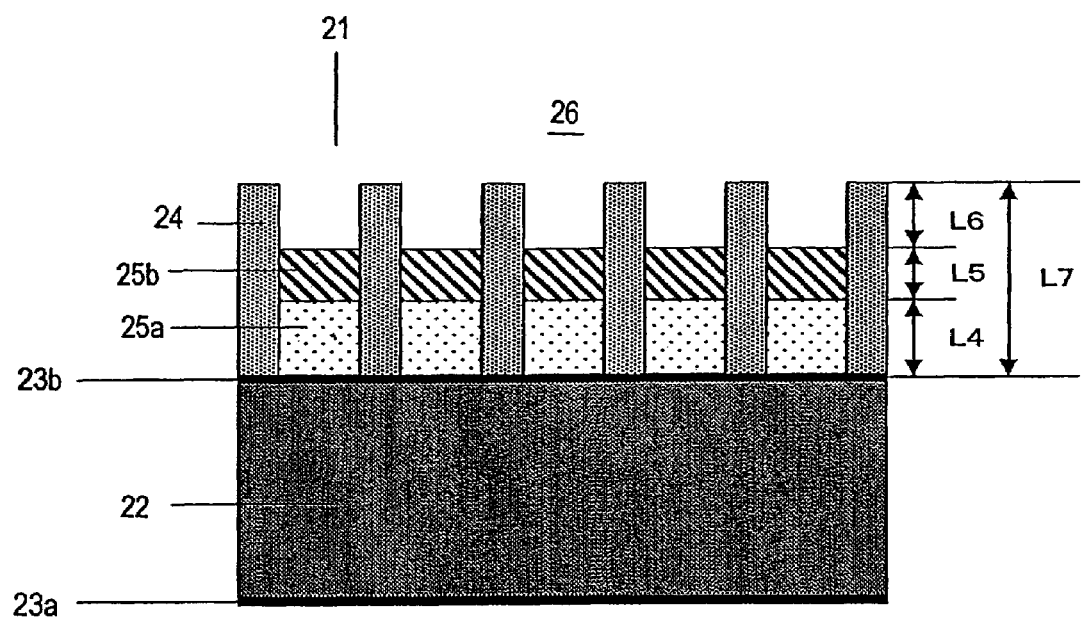
FIG. 26 is a cross-sectional view illustrating an ultrasonic transducer according to an eleventh embodiment of the present invention.

In the arrangement shown in FIG. 26, when the ultrasonic wave that has been propagated through the protective matching layer 24 reaches the upper surface of the protective matching layer 24, another ultrasonic wave, which is in phase with the former ultrasonic wave, has reached the boundary between the first and second acoustic matching layers 25a and 25b. This is because the sonic velocity in the first acoustic matching layer 25a is lower than that in the protective matching layer 24. It takes an additional time of ¼f second for the ultrasonic wave to be propagated from the upper surface of the first acoustic matching layer 25a to that of the second acoustic matching layer 25b. Accordingly, if the time it takes for the ultrasonic wave to be propagated from the upper surface of the acoustic matching layer 25b to the same level as the upper surface of the protective matching layer 24 by way of the propagating medium 26 is ¾f second, then the phases of the two ultrasonic waves can be matched at the same level as the upper surface of the protective matching layer 24. If such an arrangement is adopted, a phase delay corresponding to one wavelength will be caused between the ultrasonic wave that has been transmitted through, and radiated from, the acoustic matching layers 25a and 25b and the ultrasonic wave that has been transmitted through, and radiated from, the protective matching layer 24. In that case, these two ultrasonic waves interfere with, and intensify, each other, thereby increasing their amplitudes.

Hereinafter, it will be described how to make the acoustic matching layers 25a and 25b of this preferred embodiment.

First, as in the method of forming the acoustic matching layer 25 according to the tenth preferred embodiment, the protective matching layer 24 is formed. A porous ceramic is used as a material for the protective matching layer 24 and the thickness L7 thereof is defined at 1.0 mm.

In this preferred embodiment, the distance L6 from the upper surface of the second acoustic matching layer 25b to the upper surface level of the protective matching layer 24 is defined at 0.51 mm such that the ultrasonic wave is propagated through the propagating medium 26 (e.g., the air) in ¾f second. As a result, the total thickness L4+L5 of the first and second acoustic matching layers 25a and 25b should be equal to 0.49 mm.

In this preferred embodiment, if the sonic velocity in the second acoustic matching layer 25b is defined at 200 m/s, then the thickness L5 of the second acoustic matching layer 25b is preferably defined at 0.10 mm. When L5=0.10 mm, the thickness L4 of the first acoustic matching layer 25a will be 0.39 mm (=0.49 mm−0.10 mm). To make the thickness of the first acoustic matching layer 25a correspond to a quarter of the wavelength of the ultrasonic wave being propagated through the first acoustic matching layer 25a, the sonic velocity in the first acoustic matching layer 25a needs to be 780 m/s.

Next, it will be described exactly how to make these two acoustic matching layers 25a and 25b. The method of this preferred embodiment is characterized by performing the second gelling process step of the tenth preferred embodiment twice. Specifically, in this preferred embodiment, after the second gelling process step has been carried out such that no gelling occurs outside of the wet gel obtained by the first gelling process step (which will be referred to herein as a "first half of the second gelling process step"), the same second gelling process step is performed again such that gelling does occur outside of the wet gel this time (which will be referred to herein as a "second half of the second gelling process step").

In this preferred embodiment, first, process steps similar to the process steps Nos. 1 through 6 of the tenth preferred embodiment described above are carried out, thereby forming the first acoustic matching layer 25a. In this case, however, the second gelling process step is the first half of the second gelling process step.

With the acoustic impedance expected to increase in the second half of the second gelling process step to be performed next, the process time of the first half of the second gelling process step is adjusted such that the first acoustic matching layer 25a will have a density of about $0.5 \times 10^3$ kg/m$^3$ and a sonic velocity of about 500 m/s. In this preferred embodiment, the process time is defined at about 36 hours, which is shorter than the process time of the second gelling process step of the tenth preferred embodiment described above.

Next, the second half of the second gelling process step is carried out, thereby increasing the acoustic impedance of the first acoustic matching layer 25a and forming the second acoustic matching layer 25b on the first acoustic matching layer 25a. Specifically, the second half of the second gelling process step was carried out as follows.

Second Half of Second Gelling Process Step

First, a solution, in which tetraethoxysilane, ethanol and ammonia water (with a normality of 0.05) are mixed together at a mole ratio of 1 to 4 to 3, is prepared as a material solution for the second half of the second gelling process step. The space that has been defined by the first acoustic matching layer 25a and the protective matching layer 24 is filled with this material solution for the second half of the second gelling process step. Next, the assembly is left as it is at room temperature for approximately 24 hours, thereby completing the gelling reaction. In this manner, the acoustic impedance of the first acoustic matching layer 25a is adjusted and a wet gel to be the second acoustic matching layer 25b is formed.

Thereafter, the hydrophobizing, drying and thickness adjusting process steps are carried out as in the tenth preferred embodiment described above, thereby completing the acoustic matching layers 25a and 25b. The acoustic matching layers 25a and 25b of this preferred embodiment are characterized as follows.

Figure 27:
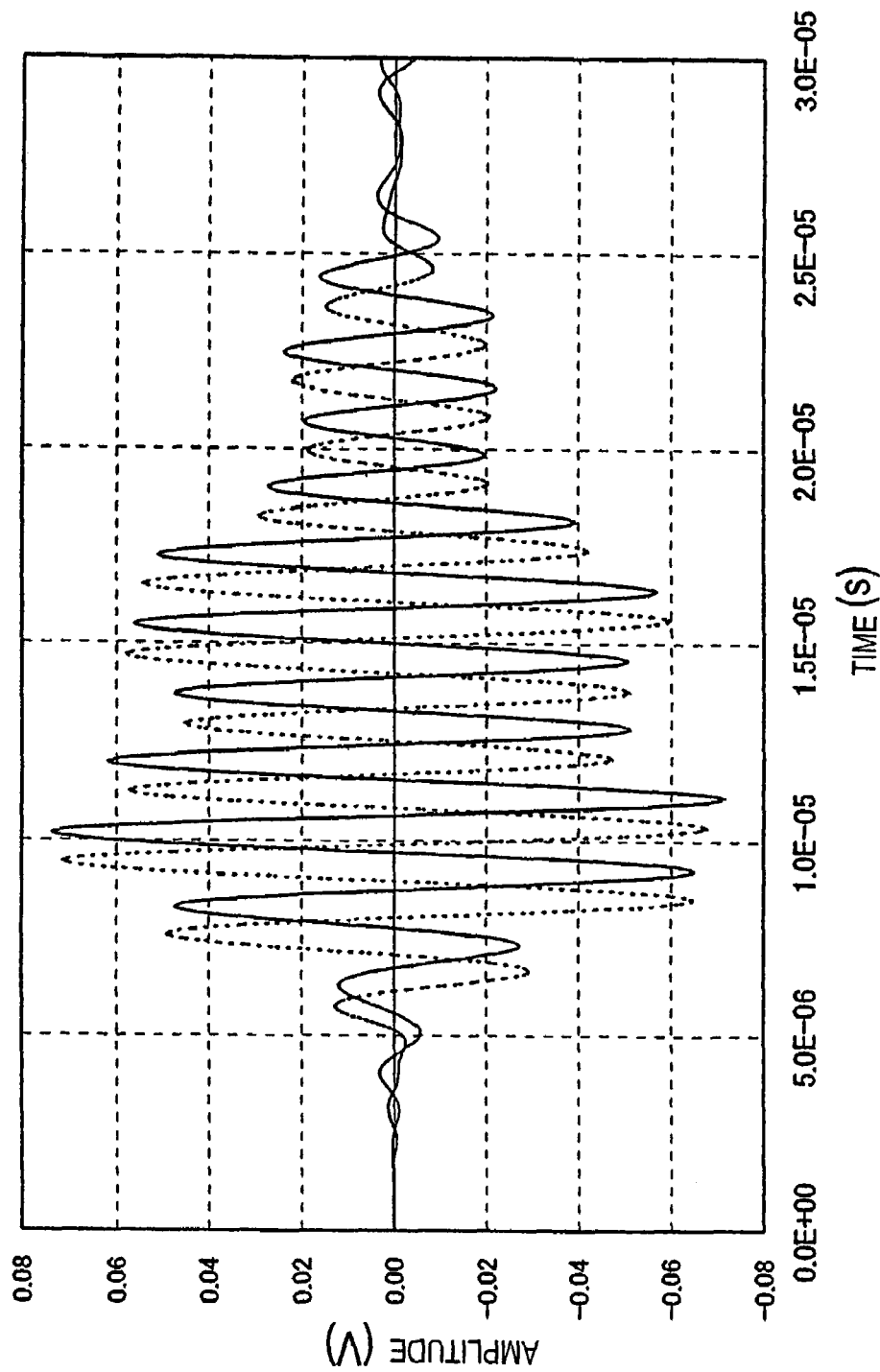
FIG. 27 is a graph showing a waveform to be transmitted from, or received at, the ultrasonic transducer according to the eleventh embodiment of the present invention.

First acoustic matching layer 25a
density: $0.7 \times 10^3$ kg/m$^3$,
sonic velocity: 780 m/s,
acoustic impedance: $5.46 \times 10^5$ kg/m$^2$/s and
thickness: 0.39 mm
Second acoustic matching layer 25b
density: $0.2 \times 10^3$ kg/m$^3$,
sonic velocity: 200 m/s,
acoustic impedance: $4.0 \times 10^4$ kg/m$^2$/s and
thickness: 0.10 mm FIG. 27 shows the waveform of an ultrasonic wave to be transmitted from, or received at, the ultrasonic transducer of this preferred embodiment. In FIG. 27, the waveform of the ultrasonic wave transmitted from, or received at, the ultrasonic transducer of this preferred embodiment is represented by the solid curve, while the waveform of an ultrasonic wave to be transmitted from, or received at, a comparative ultrasonic transducer, of which the acoustic matching layer and protective matching layer have the same thickness, is represented by the dotted curve. As can be seen from FIG. 27, the ultrasonic transducer of this preferred embodiment achieves a high sensitivity.

In the preferred embodiment described above, the acoustic matching layer 25 has a two layered structure. However, even if the acoustic matching layer 25 consists of three or more layers, the same effects are also achieved by designing the ultrasonic transducer such that the phases of the ultrasonic waves match at the upper surface level of the protective matching layer 24.

EMBODIMENT 12

Figure 28:
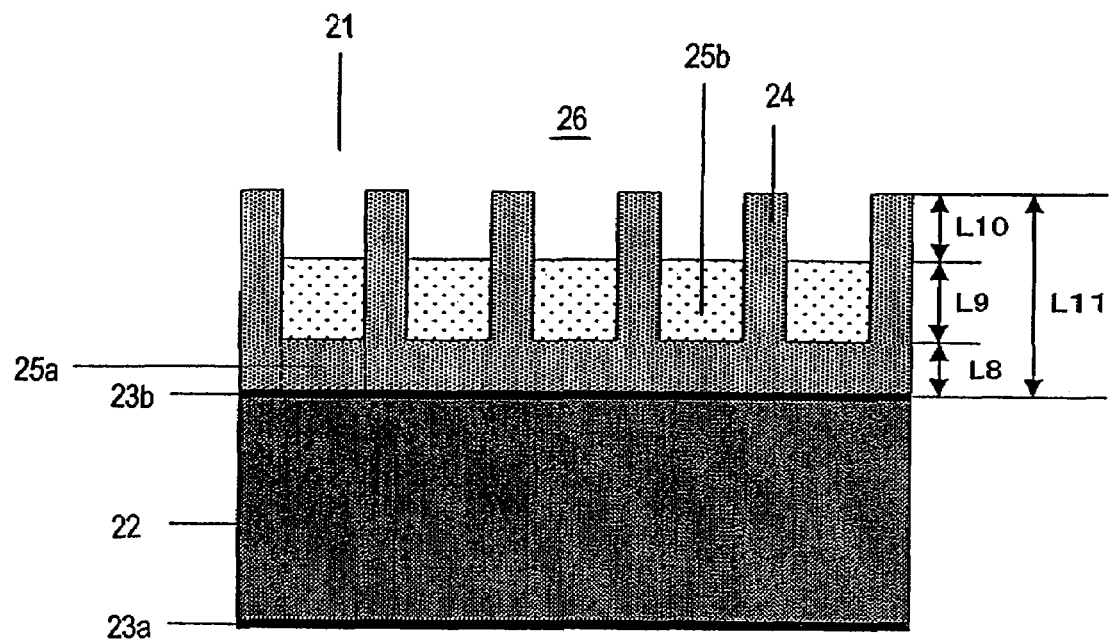
FIG. 28 is a cross-sectional view illustrating an ultrasonic transducer according to a twelfth embodiment of the present invention.

Hereinafter, an ultrasonic transducer according to a twelfth embodiment of the present invention will be described with reference to FIG. 28. The feature of this preferred embodiment is that the first acoustic matching layer 25a and the protective matching layer 24 are made of the same material and integrated together. The second acoustic matching layer 25b of a dry gel is provided on the first acoustic matching layer 25a.

In this preferred embodiment, the ultrasonic waves being propagated through the first acoustic matching layer 25a and protective matching layer 24 have the same sonic velocity and the same wavelength, and the thickness L11 of the protective matching layer 24 is set equal to a quarter of the wavelength of the ultrasonic wave. Accordingly, the thickness L8 of the first acoustic matching layer 25a is smaller than a quarter of the wavelength of the ultrasonic wave. The thickness L8 of the first acoustic matching layer 25a is determined by the thickness L9 of the second acoustic matching layer 25b and the distance L10 from the upper surface of the second acoustic matching layer 25b to the upper surface level of the protective matching layer 24.

In this preferred embodiment, a phase delay, which is an integral number of times as long as the wavelength of the ultrasonic wave, is also caused between the ultrasonic wave that has been transmitted through, and radiated from, the acoustic matching layers 25a and 5b and the ultrasonic wave that has been transmitted through, and radiated from, the protective matching layer 24. Thus, at the upper surface level of the protective matching layer 24, the phase of the ultrasonic wave that has been propagated through the acoustic matching layers 25a and 25b and the propagating medium 26 matches to that of the ultrasonic wave that has been propagated through the protective matching layer 24.

To increase the sensitivity to the ultrasonic wave that has been transmitted through the acoustic matching layers 25a and 25b, not so much the thickness of the first acoustic matching layer 25a as that of the second acoustic matching layer 25b is important. In this preferred embodiment, the thickness of the second acoustic matching layer 25b is set equal to a quarter of the wavelength of the ultrasonic wave to be transmitted or received. The thickness of the first acoustic matching layer 25a also affects the sensitivity but most of the influence covers just a portion of the frequency range.

For that reason, in this preferred embodiment, the property of the dry gel layer to be the second acoustic matching layer 25b is determined in terms of the mechanical strength of the material, for example. Next, the thickness L8 of the first acoustic matching layer 25a made of the same material as the protective matching layer 24 and the thickness L10 of the acoustic wave propagating medium are defined.

In this preferred embodiment, a porous ceramic is used as the material of the protective matching layer 24, and the thickness L11 thereof is set equal to a quarter of the wavelength of the ultrasonic wave as in the preferred embodiments described above. That is to say, L11 is defined at 1.0 mm. In that case, the first acoustic matching layer 25b made of the porous ceramic has a sonic velocity of 200 m/s and a density of $0.2 \times 10^3$ kg/m$^3$. To set the thickness of the second acoustic matching layer 25b made of the dry gel equal to a quarter of the wavelength of the ultrasonic wave, L9 is defined at 0.10 mm.

In this case, the following Equation (6) is satisfied:

$$L8 + L10 = 0.9 \text{ mm} \tag{6}$$

Equation (6) is derived by setting L11 and L9 equal to 1.0 mm and 0.1 mm, respectively.

To achieve excellent performance, the following Equation (7) is preferably satisfied:

$$L8/1 + L10/(17/25) = 1 \text{ wavelength} \tag{7}$$

In this preferred embodiment, an ultrasonic wave with a frequency of 500 kHz is transmitted or received. Accordingly, one wavelength of the ultrasonic wave in the acoustic matching layer 25a is 1.0 mm and one wavelength of the ultrasonic wave in the acoustic wave propagating medium 26 is 17/25 mm. That is to say, Equation (7) represents the sum of the ratio of the thickness L8 of the first acoustic matching layer 25a to one wavelength of the ultrasonic wave and the ratio of the thickness L10 of the propagating medium 26 to one wavelength of the ultrasonic wave. To satisfy Equation (8) means that the ultrasonic wave that has been transmitted through the first acoustic matching layer 25a and the acoustic wave propagating medium 26 has gone a distance corresponding to one wavelength. In other words, it means that the effective thickness of the first acoustic matching layer 25a and acoustic wave propagating medium 26 that have transmitted the ultrasonic wave is equivalent to one wavelength.

L8 and L10 satisfying Equations (6) and (7) are calculated as about 0.69 mm and 0.21 mm, respectively.

Hereinafter, a method for fabricating the ultrasonic transducer of this preferred embodiment will be described with reference to FIGS. 29(a) through 29(d).

Figure 29A:
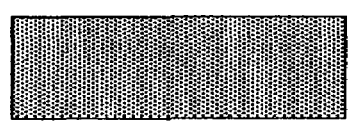
FIGS. 29(*a*) through 29(*d*) are cross-sectional views showing respective process steps for fabricating the ultrasonic transducer according to the twelfth embodiment of the present invention.
Figure 29B:

First, as shown in FIG. 29(a), a pellet of a porous ceramic with a thickness of 1.0 mm is prepared. This pellet is patterned as shown in FIG. 29(b). In this preferred embodiment, grooves are defined on the upper surface of the pellet and the thickness as measured from the bottom of the grooves is adjusted to 0.69 mm. The bottom of these grooves will function as the first acoustic matching layer 25a. The grooves are formed in the shape of rings as shown in FIG. 21.

Figure 29C:
Figure 29D:
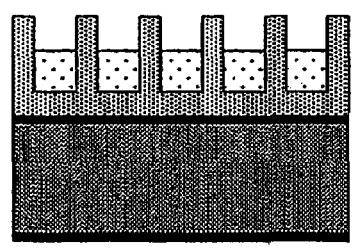

Next, as shown in FIG. 29(c), the second acoustic matching layer 25b is formed inside of the grooves so as to have a thickness of 0.1 mm. Thereafter, as shown in FIG. 29(d), the assembly including the protective matching layer 24 and acoustic matching layers 25a and 25b is bonded onto the piezoelectric body 22, thereby forming the ultrasonic transducer 21.

The first acoustic matching layer 25b is obtained by performing the first gelling process step as in the first preferred embodiment described above on a mixture in which tetramethoxysilane, ethanol and ammonia water (with a normality of 0.05) are mixed together at a mole ratio of 1 to 7 to 4.

Also, as in the first preferred embodiment described above, the assembly including the protective matching layer 24 and acoustic matching layers 25*a* and 25*b* may be bonded onto the piezoelectric body with an epoxy resin adhesive.

According to this preferred embodiment, the protective matching layer 24 and acoustic matching layer 25*a* can be formed at the same time, thus simplifying the manufacturing process and reducing the manufacturing cost.

EMBODIMENT 13

Figure 30:
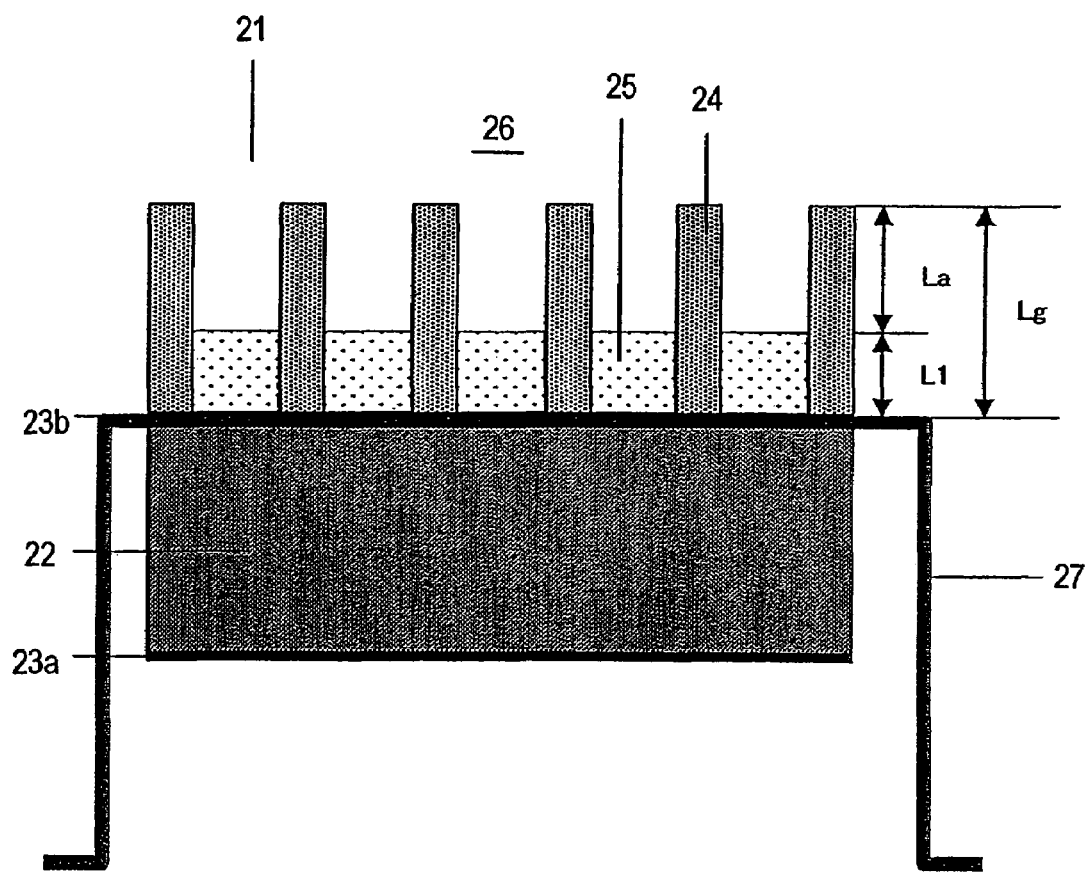
FIG. 30 is a cross-sectional view illustrating an ultrasonic transducer according to a thirteenth embodiment of the present invention.

Hereinafter, an ultrasonic transducer according to a thirteenth embodiment of the present invention will be described with reference to FIG. 30. This preferred embodiment is characterized by further including a structure supporting member.

The ultrasonic transducer of this preferred embodiment has the same configuration as the ultrasonic transducer of the first preferred embodiment described above except that the structure supporting member 7 is provided between the piezoelectric body 22 and the first acoustic matching layer 25 or the protective matching layer 24.

The structure supporting member 7 includes a disklike supporting portion, on which the acoustic matching layer 25 and so on are fixed, and a cylindrical portion that extends continuously from the disklike supporting portion in the axial direction. The end of the cylindrical portion has an L-cross section such that the structure supporting member can be easily secured to a shielding plate (not shown) for the piezoelectric body 22 or to another apparatus.

The acoustic matching layer 25 and the protective matching layer 24 are arranged on the surface of the structure supporting member 7, while the piezoelectric body 22 is provided on the back surface of the supporting portion. By using such a structure supporting member 13, the ultrasonic transducer can be handled very easily.

The structure supporting member may be a sealable container (e.g., sensor case). In that case, if the open end of the cylindrical portion of the structure supporting member 27 is closed with the shielding plate or any other suitable member and if the inner space of the structure supporting member 27 is filled with an inert gas, then the piezoelectric body 22 can be shielded from the fluid of which the flow rate should be measured.

A voltage is applied to the piezoelectric body 22. Accordingly, if the piezoelectric body is exposed to a combustible gas, for example, then the combustible gas might fire. However, such firing can be avoided by using a sealed container as the structure supporting member 27 such that the inside space thereof, including the piezoelectric body 22, is shielded from the external fluid. Then, the ultrasonic wave can also be transmitted or received safely even through a combustible gas, for example.

Also, even if the external gas, through which the ultrasonic wave is transmitted or received, is not combustible, the piezoelectric body 22 is also preferably shielded from such an external gas, because the gas may react with the piezoelectric body 22 and deteriorate the property of the piezoelectric body 22. Then, the deterioration of the piezoelectric body 22 can be minimized and highly reliable operation can be maintained for a sufficiently long time.

The portion of the structure supporting member 27, which is located between the piezoelectric body 22 and the acoustic matching layer 25 or the protective matching layer 24, does not function as the acoustic matching layer. Accordingly, to prevent the structure supporting member 27 from constituting any acoustic obstacle, the thickness of that portion of the structure supporting member 27, located between the piezoelectric body 22 and the acoustic matching layer 25 or the protective matching layer 24, is preferably at most equal to about one eighth of the wavelength of the ultrasonic wave to be transmitted or received.

In this preferred embodiment, the structure supporting member 27 is made of a stainless steel and that portion has a thickness of 0.2 mm.

The sonic velocity in the stainless steel is about 5,500 m/s and the wavelength of the ultrasonic wave at 500 kHz is about 11 mm. Accordingly, the thickness of 0.2 mm is equivalent to about one fifty-fifth of the wavelength of an ultrasonic wave, and therefore, the presence of the structure supporting member 7 would constitute almost no acoustic obstacle.

The material of the structure supporting member 27 does not have to be a metal such as a stainless steel but may also be selected from the group consisting of ceramics, glasses and resins according to the specific purpose. In this preferred embodiment, to isolate the piezoelectric body from the external fluid just as intended and to make the structure supporting member strong enough to prevent the piezoelectric body and the external fluid from contacting with each other even when the structure supporting member is subject to any mechanical shock, the structure supporting member 27 is made of a metal material. Thus, even if the ultrasonic wave is transmitted or received through a gas with combustibility or explosiveness, a high degree of safety is still ensured.

However, if the ultrasonic wave is transmitted or received through a safe gas, the structure supporting member may also be made of a resin or any other material to cut down the cost.

EMBODIMENT 14

Hereinafter, an ultrasonic transducer according to a fourteenth embodiment of the present invention will be described with reference to FIGS. 31(*a*) and 31(*b*). FIGS. 31(*a*) and 31(*b*) are plan views of this preferred embodiment.

In the example illustrated in FIG. 21, porous ceramic rings functioning as the protective matching layer 24 (e.g., three ring members with the same width but different diameters) are used and arranged on the principal surface of the piezoelectric body so as to have their centers aligned with each other. Alternatively, the protective matching layer 24 may also consist of multiple rings with mutually different widths as shown in FIG. 31(*a*). As another alternative, the protective matching layer 24 may also consist of multiple randomly arranged islands as shown in FIG. 31(*b*).

If the protective matching layer 24 and acoustic matching layer 25 are regularly arranged on the principal surface of the ultrasonic transducer, then the ultrasonic waves will have their phases matched in a direction that defines a certain angle with respect to the principal surface and have their amplitudes increased. This is what is called a "sidelobe", which may constitute an obstacle to measuring ultrasonic waves. However, if a configuration such as that shown in FIG. 31, in which the protective matching layer 24 has no periodic arrangement, is adopted, then the sidelobe can be reduced significantly and ultrasonic waves can be measured with high precision and high reliability.

EMBODIMENT 15

Figure 32:
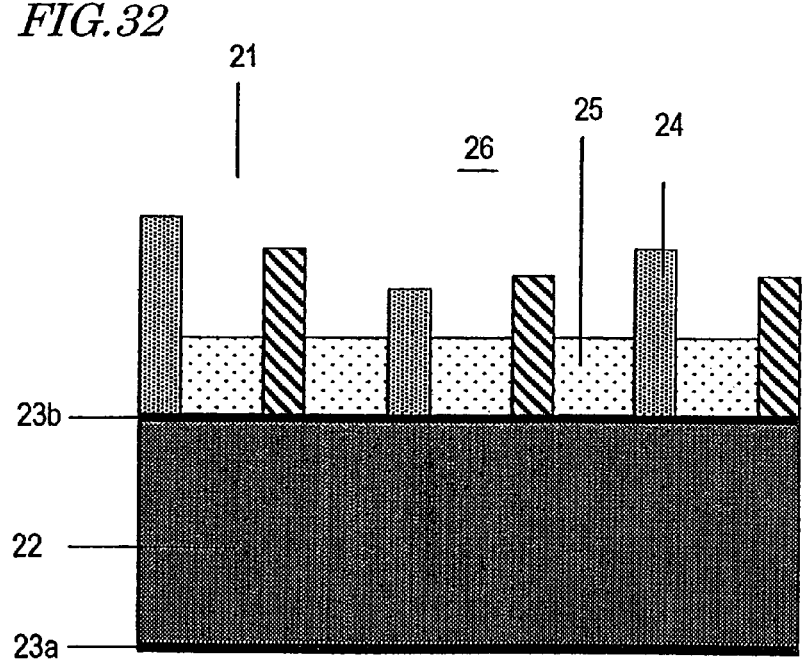
FIG. 32 is a cross-sectional view illustrating an ultrasonic transducer according to a fifteenth embodiment of the present invention.

Hereinafter, an ultrasonic transducer according to a fifteenth embodiment of the present invention will be described with reference to FIG. 32.

The prime feature of the ultrasonic transducer of this preferred embodiment is that the thickness of the protective matching layer 24 has an in-plane distribution. In the preferred embodiments described above, the thickness of the protective matching layer 24 is defined to be uniform on the same plane. In contrast, in this preferred embodiment, the thickness of the protective matching layer 24 is provided with an in-plane distribution intentionally. The secondary feature of this preferred embodiment is that the protective matching layer 24 provided on the piezoelectric body 22 is made of two different materials.

According to the arrangement of this preferred embodiment, different materials are adopted and/or the thicknesses have different in-plane distributions, thereby reducing the sidelobe significantly, changing the frequencies of the ultrasonic wave to be transmitted or received and broadening the frequency range thereof.

It should be noted that the thickness of each of the protective matching layers 24 preferably falls within the range of one eighth to one third of the wavelength of the ultrasonic wave, and more preferably falls within the range of one sixth to one quarter of the wavelength of the ultrasonic wave. However, a portion of the protective matching layers 24 with mutually different thicknesses may have a thickness that falls out of these ranges. That portion of the protective matching layer 24, of which the thickness falls out of those ranges, does not function as the acoustic matching layer, thus decreasing the sensitivity to the ultrasonic wave to be transmitted or received. Nevertheless, by arranging that protective layer not functioning as the acoustic matching layer (which cannot be called a "protective matching layer" anymore) at an appropriate location on the piezoelectric body, the disturbance of a short-range ultrasonic wave field can be minimized and ultrasonic waves can be measured accurately.

EMBODIMENT 16

Figure 33:
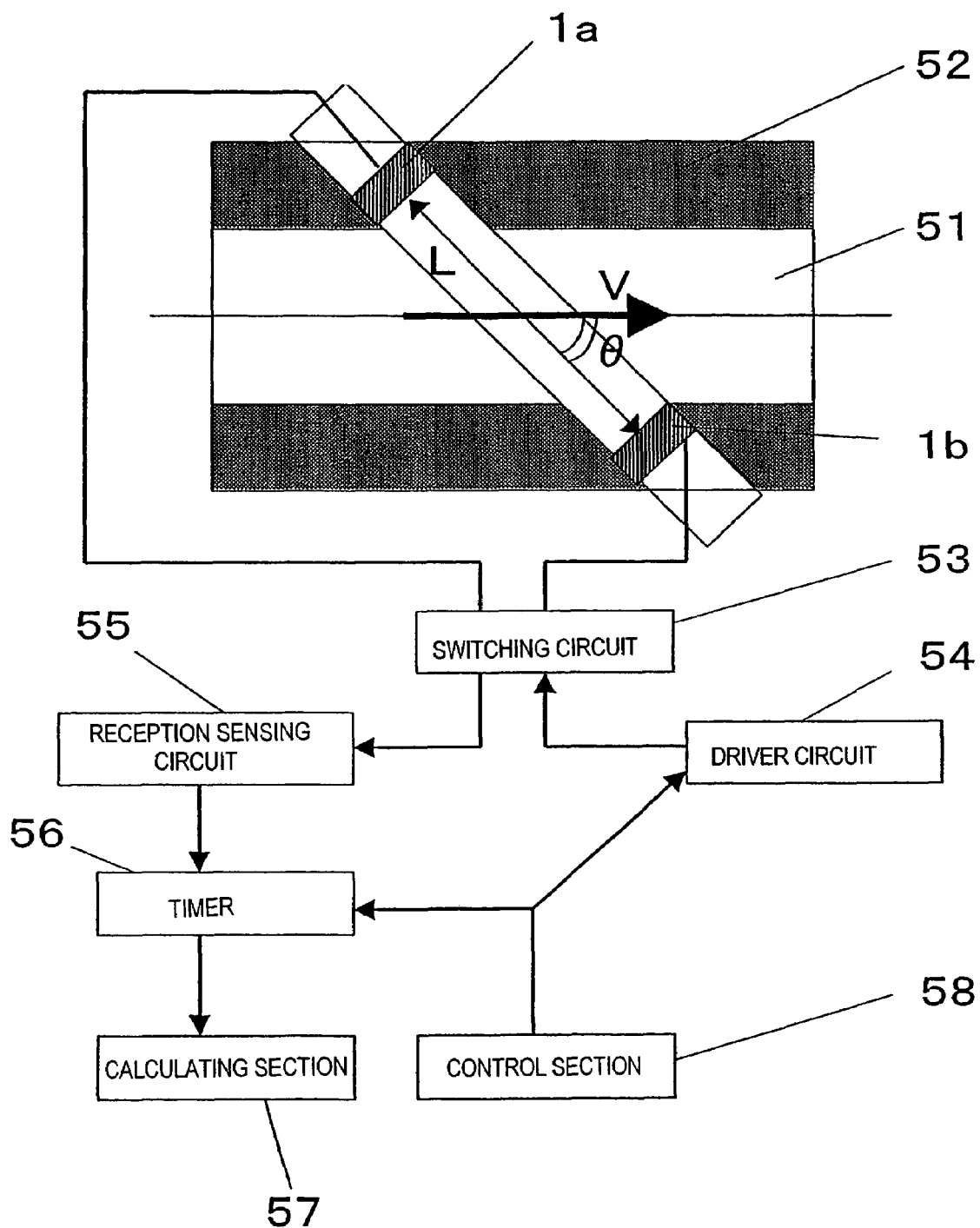
FIG. 33 is a block diagram showing an ultrasonic flowmeter according to a sixteenth embodiment of the present invention.
Figure 34A:
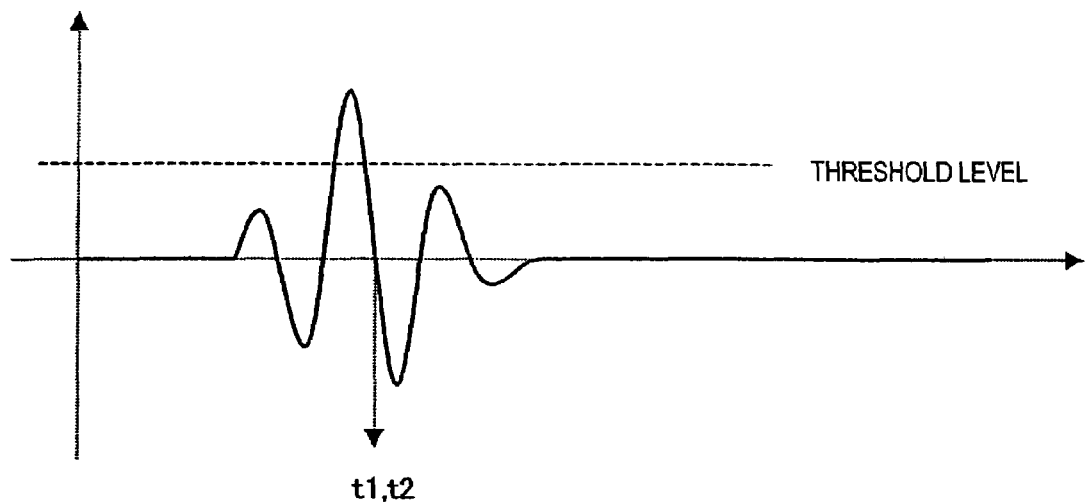
FIGS. 34(*a*) and 21(*b*) are graphs showing waveforms to be measured by the ultrasonic flowmeter of the present invention.
Figure 34B:
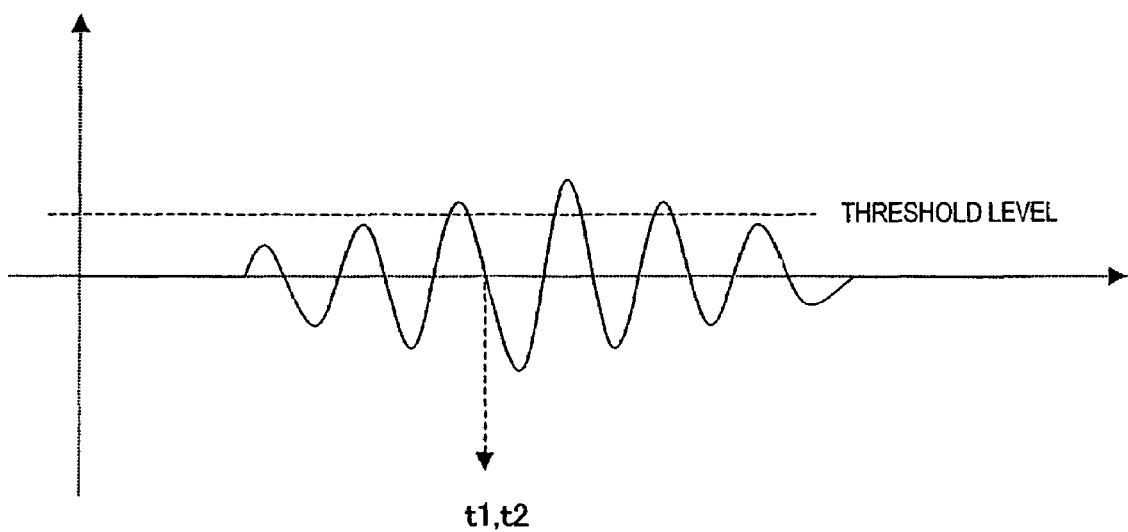
Figure 35:
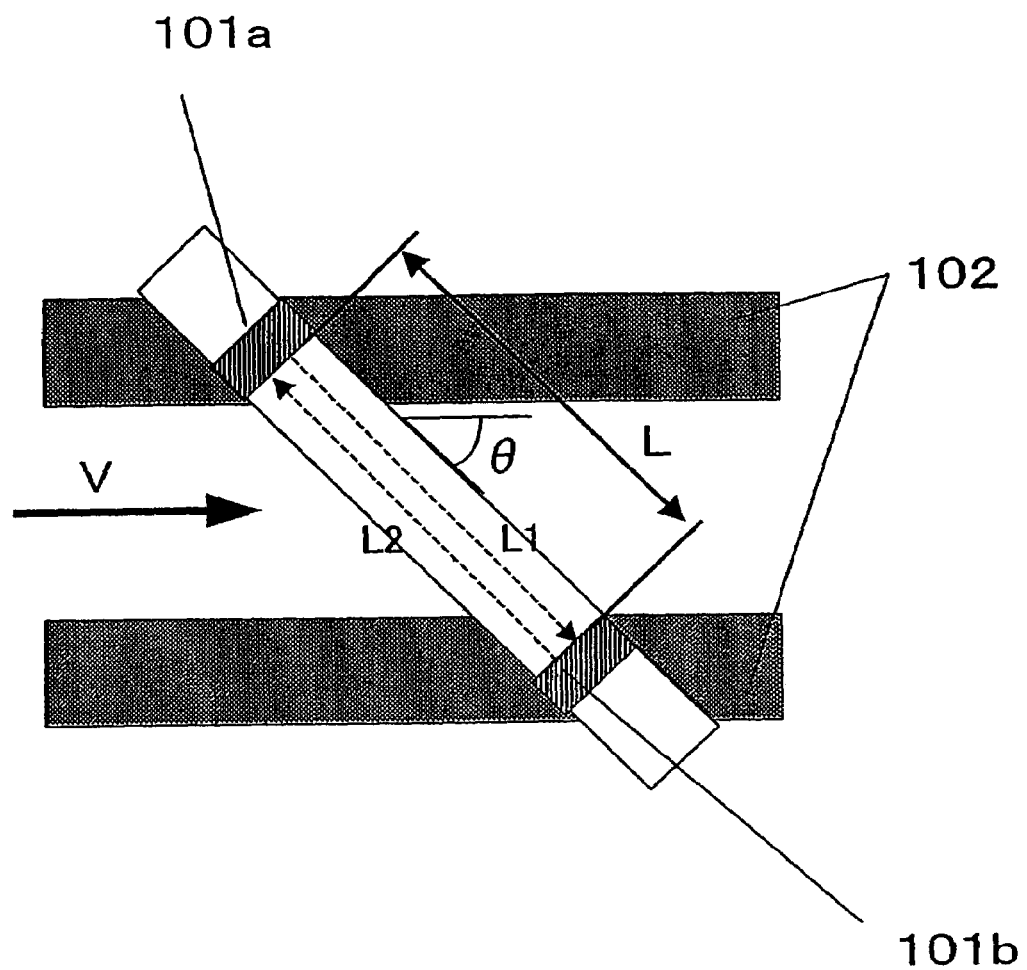
FIG. 35 is a cross-sectional view illustrating a conventional ultrasonic flowmeter.
Figure 36:
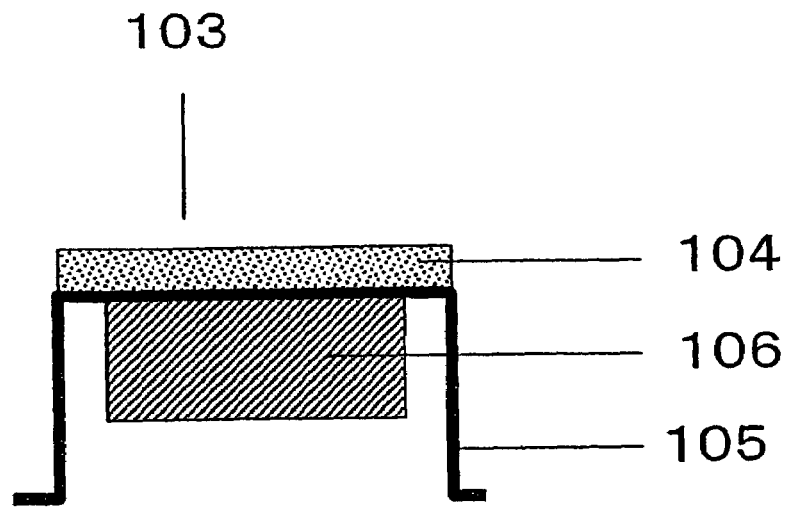
FIG. 36 is a cross-sectional view of a conventional ultrasonic transducer.

Hereinafter, an ultrasonic flowmeter according to an embodiment of the present invention will be described with reference to FIG. 33.

The ultrasonic flowmeter of this preferred embodiment is arranged such that a fluid under measurement flows at a velocity V inside of a tube that functions as a flow rate measuring portion 51. The ultrasonic transducers 1a and 1b of the present invention are provided on the tube wall 52 of the flow rate measuring portion 51 so as to face each other.

At a point in time, the ultrasonic transducer 1a functions as an ultrasonic transmitter and the ultrasonic transducer 1b functions as an ultrasonic receiver. At another point in time, however, the ultrasonic transducer 1a functions as an ultrasonic receiver and the ultrasonic transducer 1b functions as an ultrasonic transmitter. This switching is done by a switching circuit 53.

The ultrasonic transducers 1a and 1b are connected to a driver circuit 54 and a reception sensing circuit 55 by way of the switching circuit 53. The driver circuit 54 drives the ultrasonic transducers 1a and 1b. The reception sensing circuit 55 senses an ultrasonic pulse received. The output of the reception sensing circuit 55 is supplied to a timer 56, which measures the propagation time of the ultrasonic pulse. The output of the timer 56 is passed to a calculating section 57 for calculating the flow rate. The calculating section 57 calculates the velocity V of the fluid, flowing through the flow rate measuring portion 51, based on the ultrasonic pulse propagation time obtained, thereby deriving the flow rate. The driver circuit 54 and timer 56 are connected to a control section 58, and are controlled in response to a control signal supplied from the control section 58.

Hereinafter, it will be described in further detail how this ultrasonic flowmeter operates.

Suppose an LP gas is allowed to flow as a fluid under measurement through the flow rate measuring portion 51. The ultrasonic transducers 1a and 1b are supposed to have a drive frequency of about 500 kHz. The control section 58 outputs a transmission start signal to the driver circuit 54 and, at the same time, instructs the timer 56 to start measuring time. On receiving the transmission start signal, the driver circuit 54 drives the ultrasonic transducer 1a such that the ultrasonic transducer 1a transmits an ultrasonic pulse. The ultrasonic pulse transmitted is propagated through the flow rate measuring portion 51 and received at the ultrasonic transducer 1b. The ultrasonic pulse received is transformed by the ultrasonic transducer 1b into an electric signal, which is then output to the reception sensing circuit 55.

The reception sensing circuit 55 determines the time at which the signal was received and stops the timer 56. Then, the calculating section 57 calculates the propagation time t1.

Next, the switching circuit 53 switches the ultrasonic transducers 1a and 1b to be connected to the driver circuit 54 and the reception sensing circuit 55. Thereafter, the control section 58 outputs a transmission start signal to the driver circuit 54 again and, at the same time, instructs the timer 56 to start measuring time. However, as opposed to the situation where the propagation time t1 was measured, an ultrasonic pulse is transmitted from the ultrasonic transducer 1b and then received at the ultrasonic transducer 1a and the calculating section 57 calculates the propagation time t2.

Suppose the distance between the centers of the ultrasonic transducers 1a and 1b is L, the sonic velocity in the LP gas in no wind condition is C, the flow velocity in the flow rate measuring portion 51 is V, and the angle defined between the direction in which the fluid under measurement flows and the line that connects together the centers of the ultrasonic transducers 1a and 1b is θ.

The propagation times t1 and t2 are obtained by actual measurement and the distance L is already known. Accordingly, the flow velocity V can be obtained by measuring the times t1 and t2, and the flow rate can be determined by the flow velocity V.

In such an ultrasonic flowmeter, the propagation times t1 and t2 are measured by a so-called "zero-cross method". In this method, an appropriate threshold level is defined with respect to a received waveform such as that shown in FIG. 21(a), and the amount of time it takes for the waveform to cross the zero level after having exceeded the threshold level is measured. If the received signal has a bad SNR, the point in time at which the waveform crosses the zero level shifts depending on the noise level. In that case, t1 and t2 may not be measured accurately and it may be difficult to obtain an accurate flow rate.

However, by using the ultrasonic transducers of the present invention as ultrasonic transducers for such an ultrasonic flowmeter, the SNR of the received signal can be increased and t1 and t2 can be measured highly accurately.

Figure 31A:
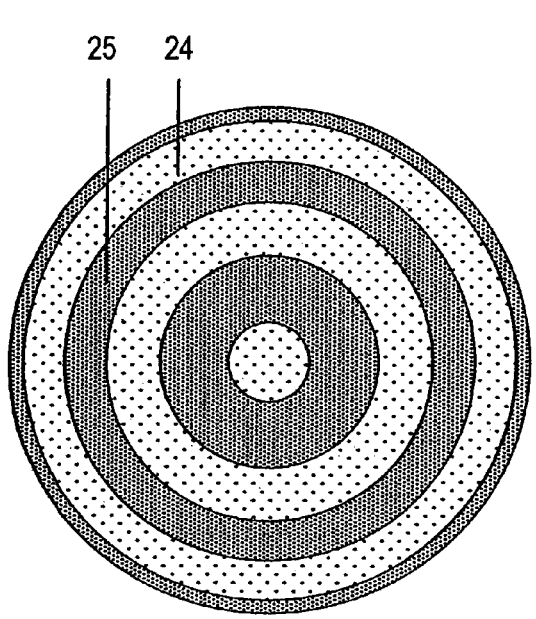
FIGS. 31(*a*) and 31(*b*) are top views illustrating ultrasonic transducers according to a fourteenth embodiment of the present invention.
Figure 31B:
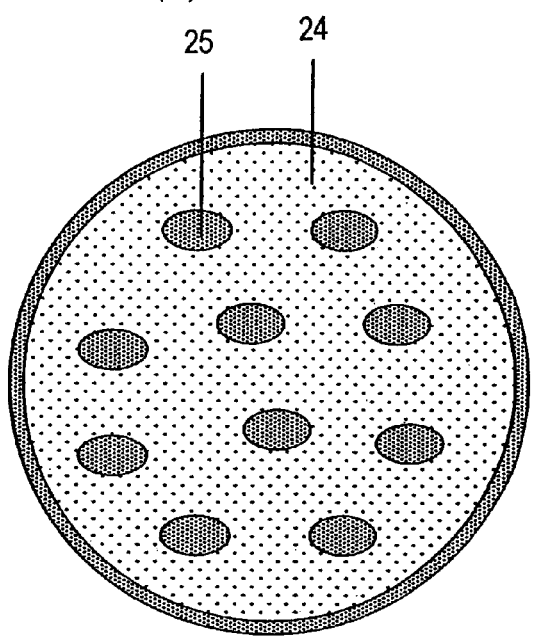

If the received signal rises more slowly (i.e., has a narrower band width) as shown in FIG. 31(b) than the received signal shown in FIG. 31(a), then the peaks of the waveform of the received signal, for which t1 and t2 are measured, change with respect to the predetermined threshold level, thus possibly causing errors in measurement. However, the ultrasonic transducer of the present invention can operate appropriately in a broad frequency range. Thus, the received signal rises steely enough and the flow rate can be measured accurately and constantly. It should be noted that each of the t1 and t2 values is preferably the average of a number of values measured.

To be able to transmit or receive an ultrasonic wave in a broad frequency range means that the signal also falls quickly. Accordingly, even if measurements are repeatedly carried out at short intervals, no transmitted or received signal will be affected by the previous transmitted or received signal. As a result, even if the measurements are carried out at a high iterative frequency, the measurements can still be done instantaneously. Thus, the leakage of a gas, for example, can be sensed immediately.

In the preferred embodiments described above, the upper surface of the uppermost acoustic matching layer (i.e., first acoustic matching layer) is exposed. Optionally, this surface may be covered with a protective coating with a thickness of 10 µm or less. Such a protective coating contributes to avoiding direct exposure of the acoustic matching layer to the air and keeping the property of the acoustic matching layer good for a long time. The protective coating may be a (single or multilayer) film of aluminum, silicon dioxide, a low-melting glass or a polymer. The protective coating may be deposited by a sputtering process or a CVD process.

INDUSTRIAL APPLICABILITY

According to the present invention, a high-performance ultrasonic transducer, including a thin acoustic matching layer that is made of a material with extremely low acoustic impedance and low mechanical strength, can be provided as a commercially viable product. The ultrasonic transducer can also exhibit increased reliability during the actual use. In a first preferred embodiment of the present invention, a protective portion is provided so as to not only protect the acoustic matching layer but also define the thickness of the acoustic matching layer. Accordingly, the thin acoustic matching layer with the low mechanical strength can be formed with high precision and good reproducibility. As a result, a high-reliability ultrasonic transducer, which can transmit or receive a broad-range ultrasonic wave at a high sensitivity, is provided. In a second preferred embodiment of the present invention, a protective portion that also functions as an additional acoustic matching layer (i.e., protective matching layer, that is, a protective portion functioning as an acoustic matching layer) is provided at an arbitrary location on the principal surface of a piezoelectric body. By adjusting the sonic velocities and thicknesses of the two types of acoustic matching layers, the phases of ultrasonic waves, radiated from the two types of acoustic matching layers with different thicknesses, can be matched and the ultrasonic waves can be transmitted or received at an increased sensitivity.

The invention claimed is:

1. An ultrasonic transducer comprising:
a piezoelectric body;
an acoustic matching layer, which is provided on the piezoelectric body; and
a protective portion, which contacts with at least a portion of a side surface of the acoustic matching layer and which is provided at a fixed position with respect to the piezoelectric body;
a lower acoustic matching layer between the principal surface of the piezoelectric body and the acoustic matching layer,
wherein the protective portion is raised from the principal surface of the lower acoustic matching layer, and wherein the height of the protective portion as measured from the principal surface of the lower acoustic matching layer defines the thickness of the uppermost acoustic matching layer; and
wherein the protective portion is defined by a portion of the lower acoustic matching layer and forms an integral part of the lower acoustic matching layer.

2. An ultrasonic transducer comprising:
a piezoelectric body;
an acoustic matching layer, which is provided on the piezoelectric body; and
a protective portion, which contacts with at least a portion of a side surface of the acoustic matching layer and which is provided at a fixed position with respect to the piezoelectric body; wherein the protective portion is defined by a portion of the piezoelectric body and forms an integral part of the piezoelectric body.

3. An ultrasonic transducer comprising:
a piezoelectric body, which sets up ultrasonic vibrations;
an upper acoustic matching layer, which is made of a material with a density of 50 kg/m$^3$ to 1,000 kg/m$^3$ and with an acoustic impedance 2.5×10$^3$ kg/m$^2$/s to 1.0×10$^6$ kg/m$^2$/s;
a lower acoustic matching layer, which is provided between the piezoelectric body and the upper acoustic matching layer; and
a structure supporting member, which supports the lower acoustic matching layer and the piezoelectric body thereon and which shields the piezoelectric body from a fluid that propagates the ultrasonic vibrations,
wherein the ultrasonic transducer includes a protective portion, which contacts with at least a portion of a side surface of the upper acoustic matching layer; and
wherein the protective portion is defined by a portion of the lower acoustic matching layer and forms an integral part of the lower acoustic matching layer.

4. An ultrasonic flowmeter comprising:
a flow rate measuring portion, through which a fluid under measurement flows;
a pair of ultrasonic transducers, which is provided for the flow rate measuring portion and which transmits and receives an ultrasonic signal;
time-measurement means for measuring time that it takes to propagate an ultrasonic wave between the pair of ultrasonic transducers; and
flow rate calculating means for calculating the flow rate of the fluid based on a signal supplied from the time-measurement means,
wherein each of the ultrasonic transducers is the ultrasonic transducer of claim 1.

5. The ultrasonic flowmeter of claim 4, wherein the piezoelectric bodies of the ultrasonic transducers are shielded from the fluid under measurement.

6. An apparatus comprising the ultrasonic transducer of claim 1.

7. An ultrasonic flowmeter comprising:
a flow rate measuring portion, through which a fluid under measurement flows;

a pair of ultrasonic transducers, which is provided for the flow rate measuring portion and which transmits and receives an ultrasonic signal;

time-measurement means for measuring time that it takes to propagate an ultrasonic wave between the pair of ultrasonic transducers; and flow rate calculating means for calculating the flow rate of the fluid based on a signal supplied from the time-measurement means, wherein each of the ultrasonic transducers is the ultrasonic transducer of claim 2.

8. The ultrasonic flowmeter of claim 7, wherein the piezoelectric bodies of the ultrasonic transducers are shielded from the fluid under measurement.

9. An apparatus comprising the ultrasonic transducer of claim 2.

10. An ultrasonic flowmeter comprising:

a flow rate measuring portion, through which a fluid under measurement flows;

a pair of ultrasonic transducers, which is provided for the flow rate measuring portion and which transmits and receives an ultrasonic signal;

time-measurement means for measuring time that it takes to propagate an ultrasonic wave between the pair of ultrasonic transducers; and flow rate calculating means for calculating the flow rate of the fluid based on a signal supplied from the time-measurement means, wherein each of the ultrasonic transducers is the ultrasonic transducer of claim 3.

11. The ultrasonic flowmeter of claim 10, wherein the piezoelectric bodies of the ultrasonic transducers are shielded from the fluid under measurement.

12. An apparatus comprising the ultrasonic transducer of claim 3.

* * * * *